April 29, 1958 R. B. TROUSDALE 2,832,832

TELEPHONE SYSTEM

Filed Dec. 17, 1952 18 Sheets-Sheet 1

INVENTOR.
Robert B. Trousdale
BY T. L. Bowes
Att'y

INVENTOR.
Robert B. Trousdale
BY
T. L. Bowes
Att'y

INVENTOR.
Robert B. Trousdale
BY T. L. Bowes
Attorney

April 29, 1958 R. B. TROUSDALE 2,832,832

TELEPHONE SYSTEM

Filed Dec. 17, 1952 18 Sheets-Sheet 4

INVENTOR.
Robert B. Trousdale
BY
T. L. Bowes
Attorney

April 29, 1958 R. B. TROUSDALE 2,832,832

TELEPHONE SYSTEM

Filed Dec. 17, 1952 18 Sheets-Sheet 5

INVENTOR.

Robert B. Trousdale

BY T. L. Bowes

Attorney

INVENTOR.
Robert B. Trousdale
BY T. L. Bowes
Att'y

INVENTOR.
Robert B. Trousdale
BY T. L. Bowes
Att'y

CONNECTOR - 12b

INVENTOR.
Robert B. Trousdale
BY T. L. Bowes
Att'y

April 29, 1958 R. B. TROUSDALE 2,832,832

TELEPHONE SYSTEM

Filed Dec. 17, 1952 18 Sheets-Sheet 9

Line Circuit-16

INVENTOR.
Robert B. Trousdale
BY T. L. Bowes
Att'y

INVENTOR.
Robert B. Trousdale
BY T. L. Bowes
Att'y

April 29, 1958 R. B. TROUSDALE 2,832,832

TELEPHONE SYSTEM

Filed Dec. 17, 1952 18 Sheets-Sheet 11

Distributor-15

INVENTOR.
Robert B. Trousdale
BY
J. L. Bowes
Att'y

April 29, 1958 R. B. TROUSDALE 2,832,832

TELEPHONE SYSTEM

Filed Dec. 17, 1952 18 Sheets-Sheet 12

INVENTOR.
Robert B. Trousdale
BY
J. L. Bowes
Attorney

April 29, 1958 R. B. TROUSDALE 2,832,832

TELEPHONE SYSTEM

Filed Dec. 17, 1952 18 Sheets-Sheet 13

INVENTOR.
Robert B. Trousdale
BY
T. L. Bowes
Attorney

April 29, 1958 R. B. TROUSDALE 2,832,832

TELEPHONE SYSTEM

Filed Dec. 17, 1952 18 Sheets-Sheet 14

INVENTOR.
Robert B. Trousdale
BY
T. L. Bowes
Attorney

INVENTOR.
Robert B. Trousdale
BY T. L. Bowes
Attorney

April 29, 1958 R. B. TROUSDALE 2,832,832

TELEPHONE SYSTEM

Filed Dec. 17, 1952 18 Sheets-Sheet 16

INVENTOR.
Robert B. Trousdale
BY
T. L. Bowes
Attorney

April 29, 1958 R. B. TROUSDALE 2,832,832

TELEPHONE SYSTEM

Filed Dec. 17, 1952 18 Sheets-Sheet 17

INVENTOR.
Robert B. Trousdale
BY
T. L. Bowes
Attorney

INVENTOR.
Robert B. Trousdale
BY
T. L. Bowes
Att'y

United States Patent Office 2,832,832

Patented Apr. 29, 1958

2,832,832

TELEPHONE SYSTEM

Robert B. Trousdale, Webster, N. Y., assignor, by mesne assignments, to General Dynamics Corporation, a corporation of Delaware Application December 17, 1952, Serial No. 326,453

16 Claims. (Cl. 179—15)

The present invention relates to improved methods and apparatus for selectively setting up signal transmission connections between the lines of a signalling system, and, more particularly, to improved methods and apparatus for transmitting supervisory signals to the lines of an automatic telephone system incident to the setting up of two-way communication connections between different pairs of lines. Specifically, the present invention is directed to certain improvements in fully automatic electrical telephone systems of the improved form disclosed and claimed in a co-pending application of Robert B. Trousdale and Frank A. Morris, Serial No. 134,974, filed December 24, 1949, and my co-pending application Serial No. 301,215, filed on July 28, 1952, which are assigned to the same assignee as the present invention.

In the systems disclosed in the applications identified above, a system of multiplexing is employed, namely, pulse sampling effectively at an ultrasonic rate of the control and intelligence signals produced at each substation of the system to provide signal channel separation. In order to provide for the transmission of supervisory signals to the lines of the system, such, for example, as the transmission of a ringing signal over the called line to summon the called subscriber, it is necessary to employ the signal samples as the transmission medium through the switching apparatus to effect selective ringing of the desired called line. However, with such an arrangement, great care must be taken to avoid intermodulation between pulses and cross talk between lines. This will be readily understood when it is realized that supervisory signals, such as ringing signals, may be transmitted while other conversations are taking place even though the particular call involved has not yet been set up. Furthermore, it is necessary to provide a supervisory signal transmission system which is capable of transmitting a ringing signal which is coded either on a time basis or a frequency basis, or both, so that either a private line ringing cycle of four seconds on and one second off, or any one of the conventional party line code ringing cycles, or a frequency selective party line ringing signal may be carried through the switching equipment without deterioration and the called line may be selectively signalled on any given basis. Also, since the power available from the modulated signal samples is relatively small, some additional control means of relatively high power must be provided to actuate the ringing facilities of the called substation in response to the transmitted ringing signal after it has been separated from the signal samples.

Accordingly, it is an object of the present invention to provide a new and improved supervisory signalling system for a fully automatic electronic telephone system.

It is another object of the invention to provide a new and improved ringing system for a fully automatic electronic telephone system wherein the called lines may be selectively rung without interfering with the transmission of speech signals or other lines of the system.

It is a further object of the present invention to provide a new and improved ringing system for a fully automatic electronic telephone system whereby different types of ringing signals may be selectively transmitted to the called lines and the line ringing facilities are actuated in response thereto in a simple and reliable manner.

It is a still further object of the present invention to provide a new and improved ringing system for an electronic telephone system wherein signal samples are employed to carry the ringing signal and all modulation components of said modulated signal samples are prevented from interfering with speech transmission between the lines of the system.

The invention, both as to its organization and method of operation, together with further objects and advantages thereof, will best be understood by reference to the following specification taken in connection with the accompanying drawings, in which:

Figs. 1 to 4, inclusive, when arranged in the manner shown in Fig. 5, diagrammatically illustrate a telephone system embodying the features of the present invention;

Figs. 2A, 2B and 2C, when laid side by side in the order named, diagrammatically illustrate the circuits of one of the finder-connector links of the system of Figs. 1 to 4, inclusive;

Fig. 6 is a schematic diagram of a portion of one of the connectors shown diagrammatically in Figs. 2B and 2C, and illustrating the details of the supervisory signalling system of the present invention;

Figs. 7 and 8, when placed one above the other, schematically illustrate the details of one of the line circuits of the system of Figs. 1 to 4, inclusive, showing a portion of the improved ringing system of the present invention;

Figure 15:
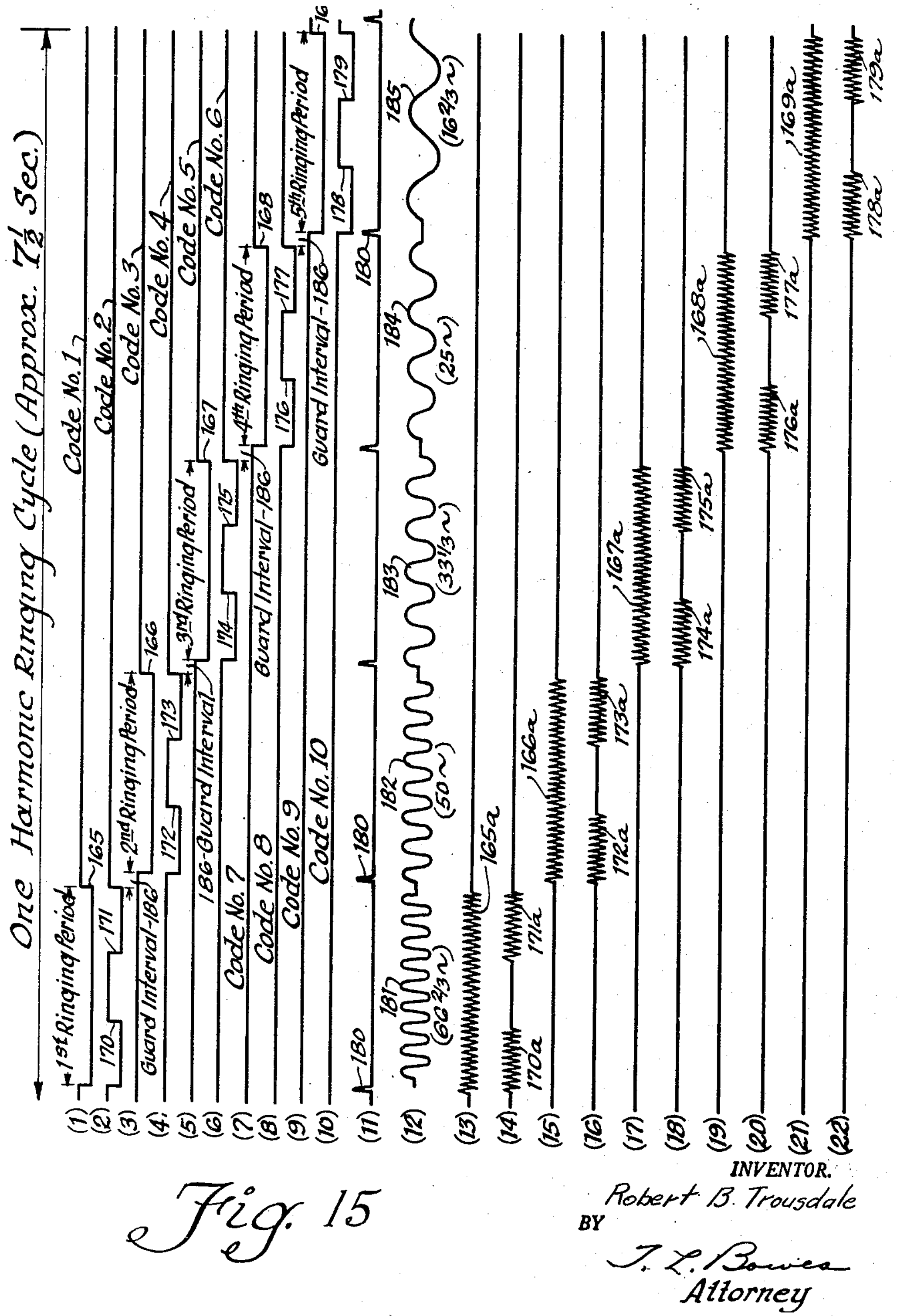
Figure 16:
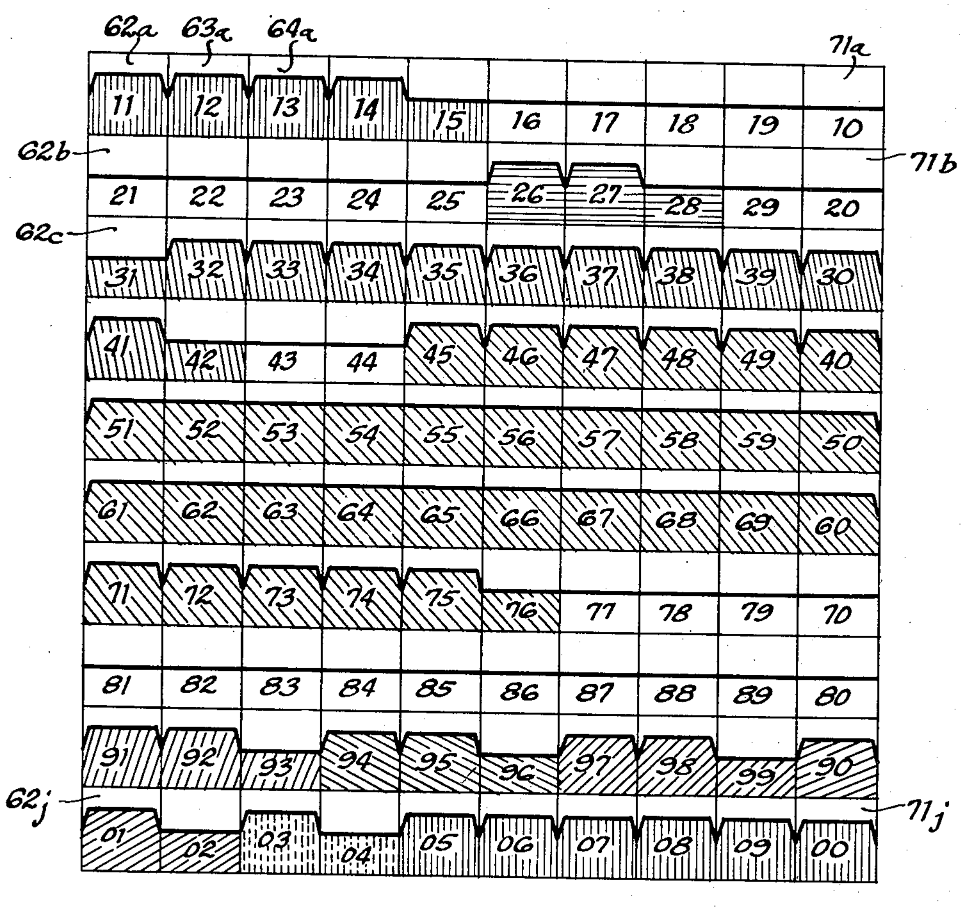
Figure 17:
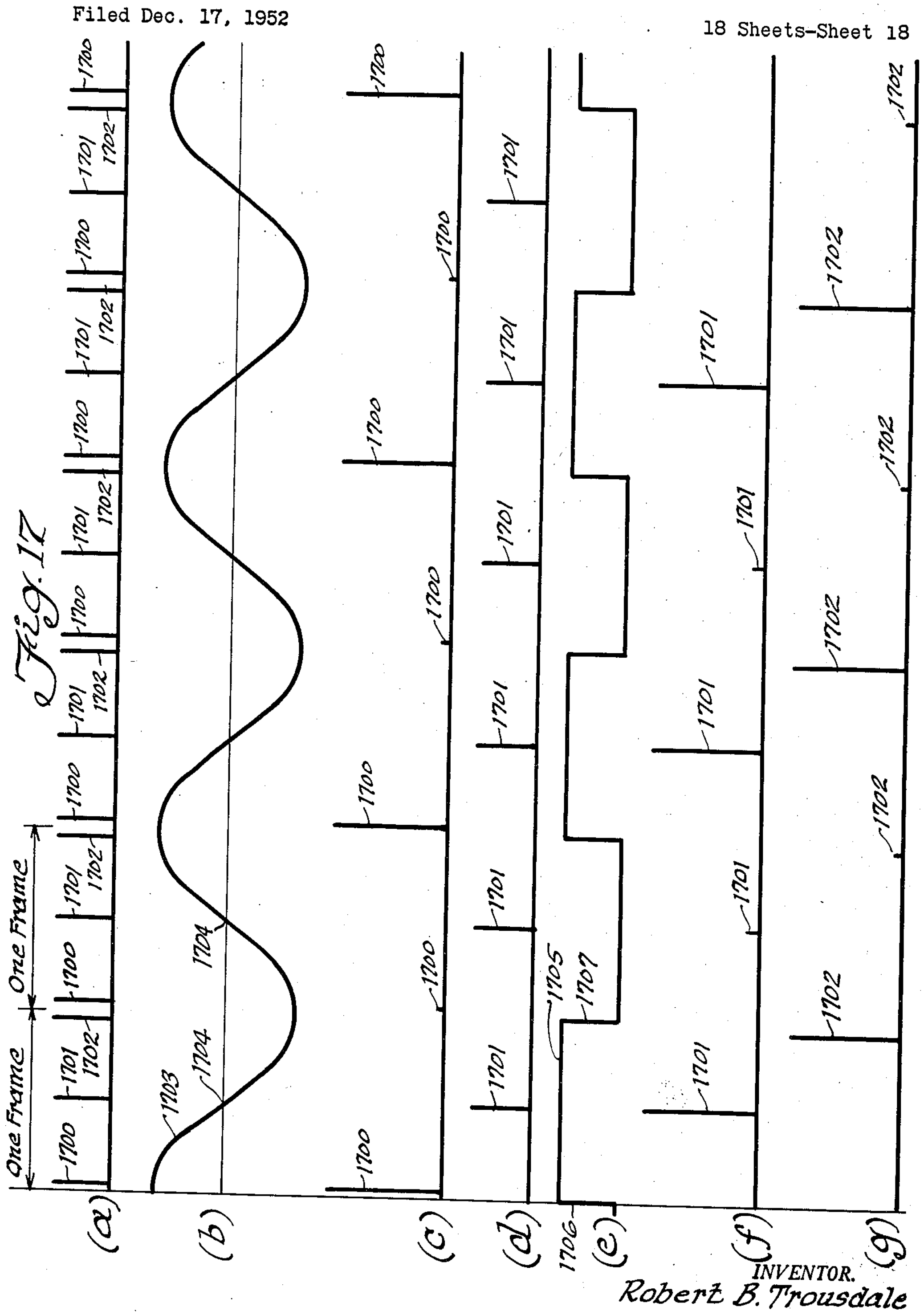

Figs. 11 to 14, inclusive, when laid side by side in the order named, graphically illustrate the time relationships of certain of the waveforms produced in the system of Figs. 1 to 4, inclusive; and Figs. 15 to 17, inclusive, graphically illustrate other waveforms developed in the system shown in Figs. 1 to 4, inclusive.

In general the electronic telephone system herein disclosed is capable of serving 100 lines, each of which lines may have associated therewith a number of party line substations up to a maximum of ten such party line substations for each line. More specifically, the system is capable of providing two-way communication between any two lines of a 100 line group and on either a private or party line basis, and includes facilities for performing the special service functions of:

(1) Trunk hunting in response to a call directed to a called line trunk group until an idle trunk within the called trunk group is found and the transmission of a busy tone signal to the calling substation in the event all of the trunks in the called trunk group test busy.

(2) Fully selective or semi-selective harmonic ringing of the party line substations connected to the called line in accordance with the ringing frequency and code assigned to the called party line substation.

(3) Initiation of a conversation timing period of predetermined duration as soon as the called line subscriber answers, the transmission of a warning tone signal over the calling and called lines after approximately 90% of the conversation period has elapsed to inform the calling and called line subscribers that the call is about to be terminated, and the automatic termination of the call at the end of the conversation timing period irrespective of any action on the part of the calling and called line subscribers.

All of the above functions are accomplished on a fully automatic basis without the use of any relays, stepping switches, or other equivalent mechanical devices having moving parts. With the exception of the line circuits, all equipment provided in the system to perform the described functions is common to the lines of the system, whether private or party, thus minimizing duplication of system components.

Basically the present improved system utilizes a system of multiplexing, namely pulse sampling effectively at an ultrasonic rate of the control and intelligence signals produced at each substation of the system, to provide signal channel separation. Specifically, each line of the system is assigned a particular pulse time position in each of repetitive pulse frames each comprising one hundred pulse time positions. Intelligence and control signals developed on any one line of the system are sampled only in the particular pulse time position assigned to the particular line and the samples are carried through the signal transmitting components of the system as far as the connector stage on multiplexer signal pulses occurring in this particular time position. In the connector stage the control and intelligence signals carried by the multiplexer signal pulses are detected and either used for control purposes, such as called line selection, or are superimposed on connector signal pulses occurring in a new and different pulse time position of successive pulse frames for redistribution to the particular line and substation assigned the new time position. The same process is employed in transmitting intelligence from the called substation back to the calling substation.

In order to minimize the amount of equipment used in certain components of the system, a decimal system of multiplexing is employed which entails arbitrary division of the lines of the system into subgroups. More specifically, the one hundred lines of the system are divided into ten subgroups of ten lines each, and tens multiplexing or gating pulses are developed at the rate of ten pulses for each pulse frame. Each tens pulse individually corresponds to a particular subgroup of ten lines and occurs during the time interval of each pulse frame which exactly spans the ten pulse time positions individually assigned to the lines of the particular subgroup. With this system of multiplexing, transmission of multiplexer signal pulses through certain of the signal transmission components of the system is dependent upon time coincidence of these signal pulses with particular tens pulses of successive pulse frames as well as coincidence of these pulses with particular pulse time positions within successive pulse frames.

In order to provide for harmonic ringing of different ones of the substations associated with any one of the lines of the system in accordance with party line ringing signals of different frequencies which are assigned to these substations on a decimal basis, a party line ringing signal cycle having a duration of approximately 7½ seconds is established during which five different pairs of coded party line ringing signals of different frequencies are produced and may be selected in the connector on a third or party line digit basis to effect ringing of different pairs of substations associated with the called line in accordance with the particular party line code ring assigned to the particular called substation.

In order to provide an improved signalling system for transmitting a ringing signal over the called line in accordance with the identity of the called party line substation, a ringing carrier wave, which is modulated in accordance with the on-off intervals of the desired ringing signal is itself modulated on the connector signal pulses produced in the time position assigned to the called line. The intermodulation components which result therefrom are employed to actuate the ringing control facilities associated with the called line so as to transmit a ringing current of desired frequency over the called line during the on intervals of the selected ringing signal.

GENERAL DESCRIPTION OF THE SYSTEM

Figure 4:
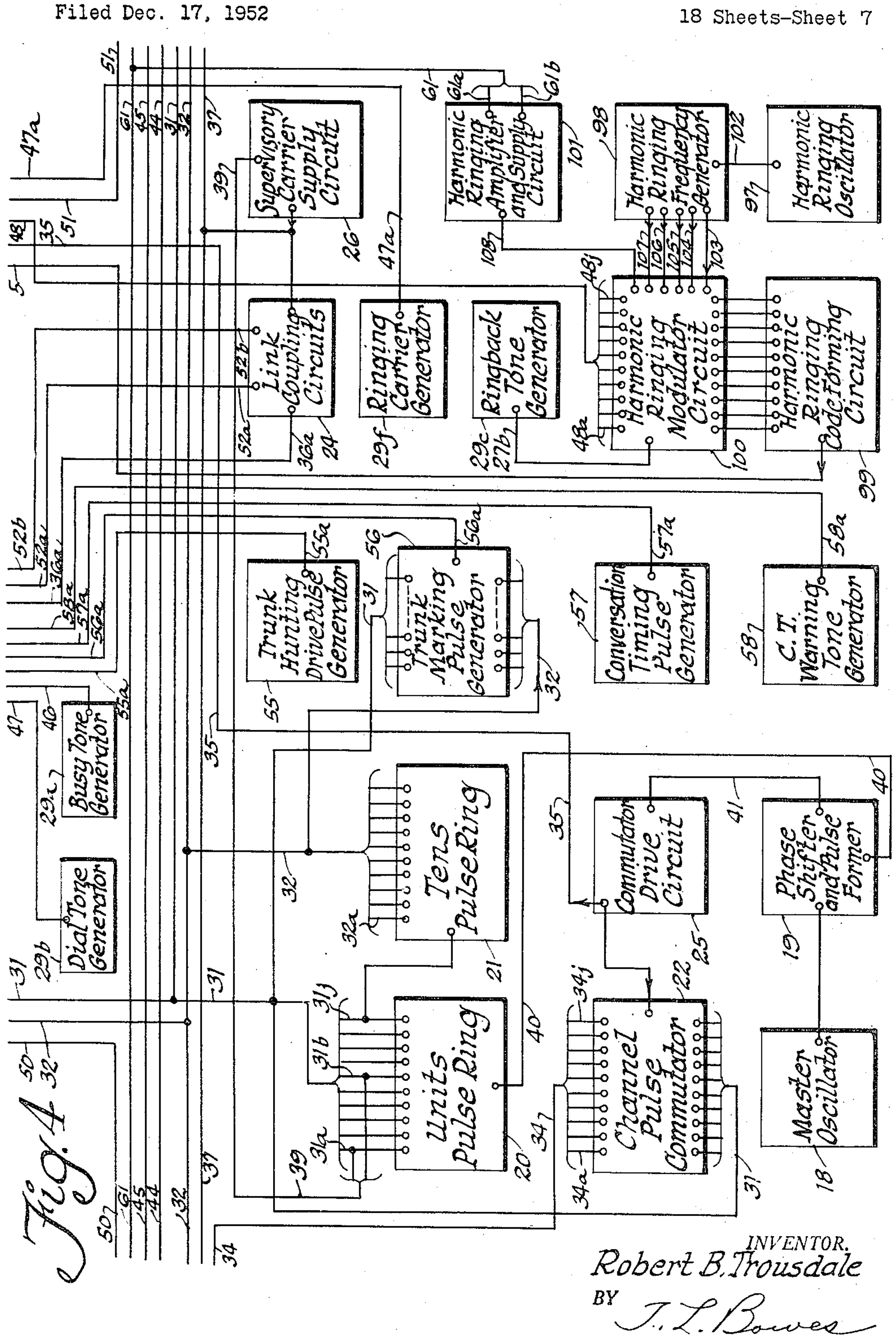

Referring now to the drawings and more particularly to Figs. 1, 2, 3, and 4 thereof, the present fully automatic electronic telephone system is there illustrated as comprising line circuits 10, 16, etc., individual to the one hundred lines of the system, a multiplexer 11 of which only one is required in the system, a plurality of identical finder-connector links 12, 13, and 14, a distributor 15 of which only one is required in the system and the common equipment indicated generally at 17 in Fig. 4 of the drawings. Each of the finder-connector links is comprised of a finder and a connector, the illustrated links respectively comprising finders **12*a*, 13*a* and 14*a* and connectors 12*b*, 13*b* and 14*b*. It will be understood that the number of finder-connector links employed in the system may be chosen as required to handle the traffic. Although only three links 12, 13 and 14** have been illustrated, from seven to ten links will normally be required in actual practice to handle the traffic of a one hundred line exchange. Inclusion of the additional links in the system may easily be accomplished by connecting appropriate terminals of additional links to the indicated multiple points.

As shown, the line circuits 10 and 16 respectively terminate two two-conductor lines which are respectively identified by the designations 23 and 32. The lines 23 and 32 may be used for either private or party line service. In the illustrated embodiment the line 23 is shown as a private line and accordingly extends only to the single substation A having the directory number designation No. 231, the last digit "1" being added to provide uniform directory numbering. On the other hand, the line 32 is shown as a party line and extends to a series of ten parallel connected substations A', B', C'–J', inclusive, having respectively assigned thereto the directory number designations No. 321, No. 322, No. 323–No. 320, inclusive.

In the disclosed system facilities are provided for party line ringing on either a fully selective or semi-selective harmonic ringing basis. Thus, if a maximum of five substations are connected to one of the lines of the system, a fully selective harmonic party line ringing system is employed wherein each of the substations is provided with ringing facilities which respond to different ringing frequencies. Each of the five substations is assigned a different ringing period of 1½ seconds' duration, which ringing periods recur in successive ringing cycles of 7½ seconds' duration. Thus, any one of the five substations is rung for a period of 1½ seconds followed by a period of 6 seconds of silence and only the particular substation which responds to the ringing frequency transmitted during a particular ringing period is rung.

If more than five substations, up to a maximum of ten substations, are associated with one of the lines of the system, a semi-selective harmonic ringing service is provided wherein pairs of substations are provided with ringing facilities which respond to the same ringing frequency and each ringing period is coded to provide either one long ring or two short rings during the particular ringing period assigned to each pair of substations. With this arrangement two substations are rung simultaneously with either a long ring of 1½ seconds or two short rings of ½ second duration separated by ½ second of silence, and the called line subscribers distinguish between their own calls and that of the other subscriber assigned the same ringing frequency by determining whether it is one long or two short rings.

Also, in the disclosed system facilities are provided for private branch exchange operation wherein a plurality of lines are designated as private branch exchange trunks and a trunk hunting operation is performed in response to a call directed to one of the private branch exchange trunks to select an idle line within the called trunk group. To this end different groups of lines of the system may be designated as private branch exchange trunk groups and all but the last line in each trunk group is marked as a private branch exchange trunk by means of the common trunk marking pulse generator 56 shown in Fig. 4, as will be described in more detail hereinafter.

Each line circuit performs the functions of repeating intelligence or control signals from its associated substation or substations to a corresponding one of the gate circuits in the multiplexer 11, repeating intelligence signals derived from a particular gate circuit of the distributor 15 to its associated substation or substations, and of responding to a ringing carrier wave signal derived from one of the connectors 12*b*, 13*b* or 14*b* by way of the distributor 15 to transmit ringing current at a particular selected frequency to the associated substation or substations on a call incoming thereto. To perform these functions, the line circuit 10 is connected by way of the conductors 53*a* and 53*b* to one of the gate circuits provided in the multiplexer 11, and is connected by way of the conductor 44 to the corresponding gate circuit provided in the distributor 15. The line circuit 10 is also connected to certain components of the common equipment 17 in the manner described below. Similarly, the line circuit 16 is connected by way of the conductor 54 to one of the gate circuits in the distributor 15 and by way of the conductors 45*a* and 45*b*, which form the illustrated cable 45 to one of the gate circuits in the multiplexer 11. This line circuit is also connected to certain components of the common equipment 17 in the manner pointed out below. The other ninety-eight line circuits of the system are likewise connected on an individual basis to corresponding gate circuits of the multiplexer 11 and the distributor 15 and on a common basis to certain components of the common equipment 17.

Generally speaking, the multiplexer 11 performs the functions of sampling the intelligence and control signals derived from the one hundred line circuits of the system only in the pulse time positions of each pulse frame individually assigned to the lines served by these line circuits, and of modulating the sampled intelligence or control signals on the multiplexer signal pulses occurring in these pulse time positions for transmission to the finders and connectors of the plurality of links 12, 13 and 14. To this end, the output terminals of the multiplexer 11 are connected by way of the common conductor 50 to the multiplexer input terminals of each of the finders 12*a*, 13*a* and 14*a* and also to the multiplexer input terminals of each of the connectors 12*b*, 13*b* and 14*b*. In reverse manner, the distributor 15 performs the function of repeating intelligence signals derived from the connectors 12*b*, 13*b* and 14*b* in pulse time positions corresponding to particular calling and called lines to the line circuits respectively terminating the lines. To this end, the input terminals of the distributor 15 are connected by way of the common conductor 51 to the output terminals of each of the connectors 12*b* 13*b* and 14*b*. In performing the described functions, the multiplexer 11 and the distributor 15 are controlled by certain components of the common equipment 17 in the manner hereinafter explained.

The finders of the various links, such, for example, as the finder 12*a*, do not perform any intelligence transmission functions. On the contrary, they function strictly as control units. Specifically, the finder 12*a* is provided to perform the function of determining when the link 12 shall be taken into use, determining the calling line with which the link is to be associated in handling a call, and determining the particular pulse time position of successive pulse frames which is assigned to the calling line and during which signal bearing pulses derived from the multiplexer 11 shall be effective to produce a response in the finder and in the associated connector 12*b*. To advise the connector of the pulse time position assigned to the calling line, the finder 12*a* transmits finder gate pulses to the connector in this pulse time position over the conductor 12*d*. The finder 12*a* also performs the function of conditioning its associated connector 12*b* for operation when the link 12 is definitely associated with a calling line to handle the call initiated on the line. This is accomplished through operation of the finder 12*a* to impress operating anode potential upon a plurality of the tubes in the connector 12*b* over the +B switch conductor 12*c*. When operatively associated with a particular calling line, the finder 12*a* also performs the function of guarding the calling line against intrusion on an incoming call to the line. This is accomplished through operation of the finder 12*a* to feed busy pulses occurring in the particular pulse time position assigned to the calling line with which the finder is operatively associated over the common busy pulse out conductor 52*a* to the link coupling circuits 24 in the common equipment 17. From the link coupling circuits 24 the busy pulses are fed to the common busy pulse in conductor 52*b* which is multipled to each of the finders and connectors of the system. The finder 12*a* further performs the function of supplying an allotting signal to the finder 13*a* of the next succeeding link 13 when the finder 12*a* is taken into use so as to provide a self-allotting system for the finder-connector links of the system.

Figures 1, 5:
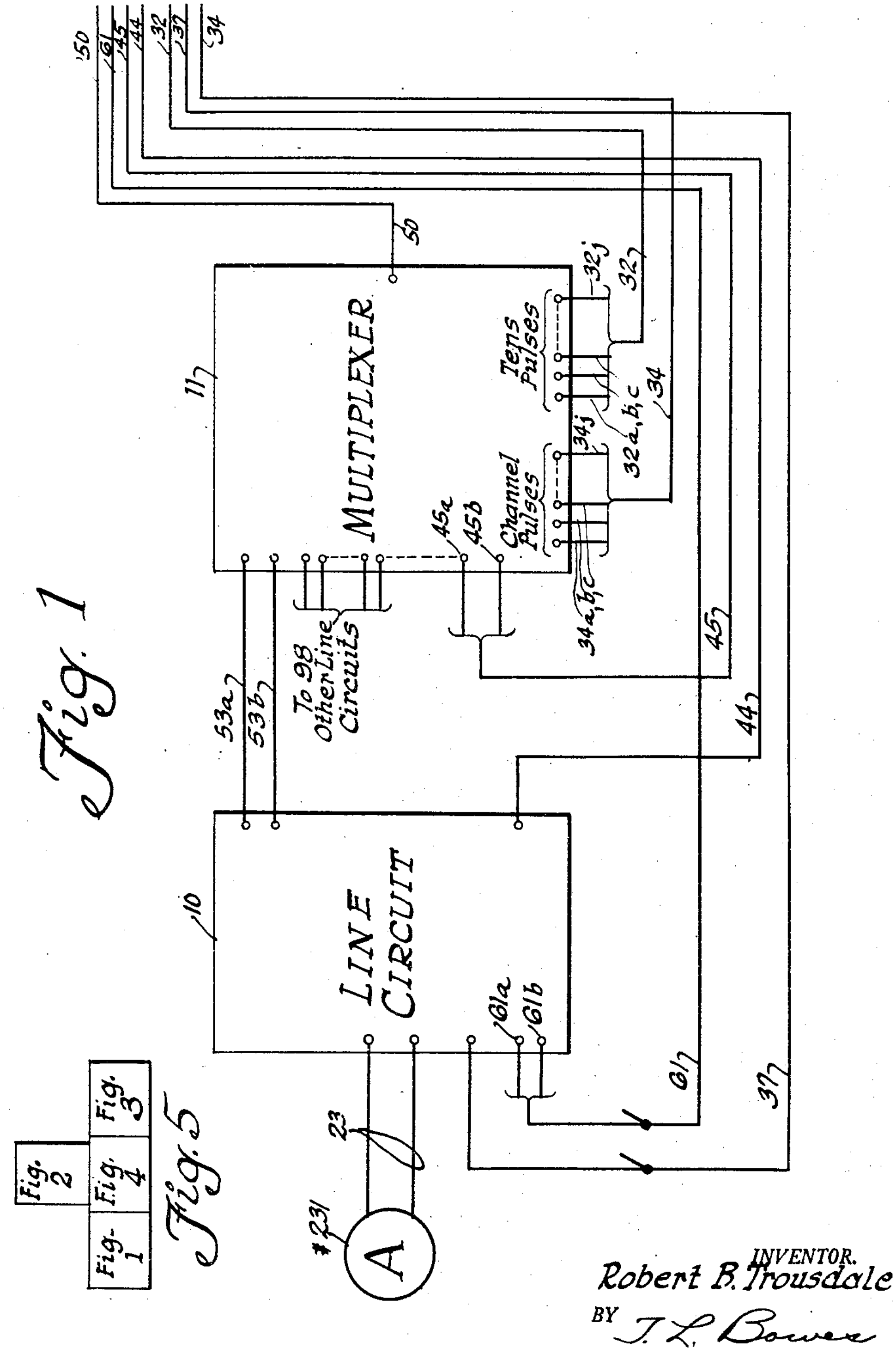
Figure 2:
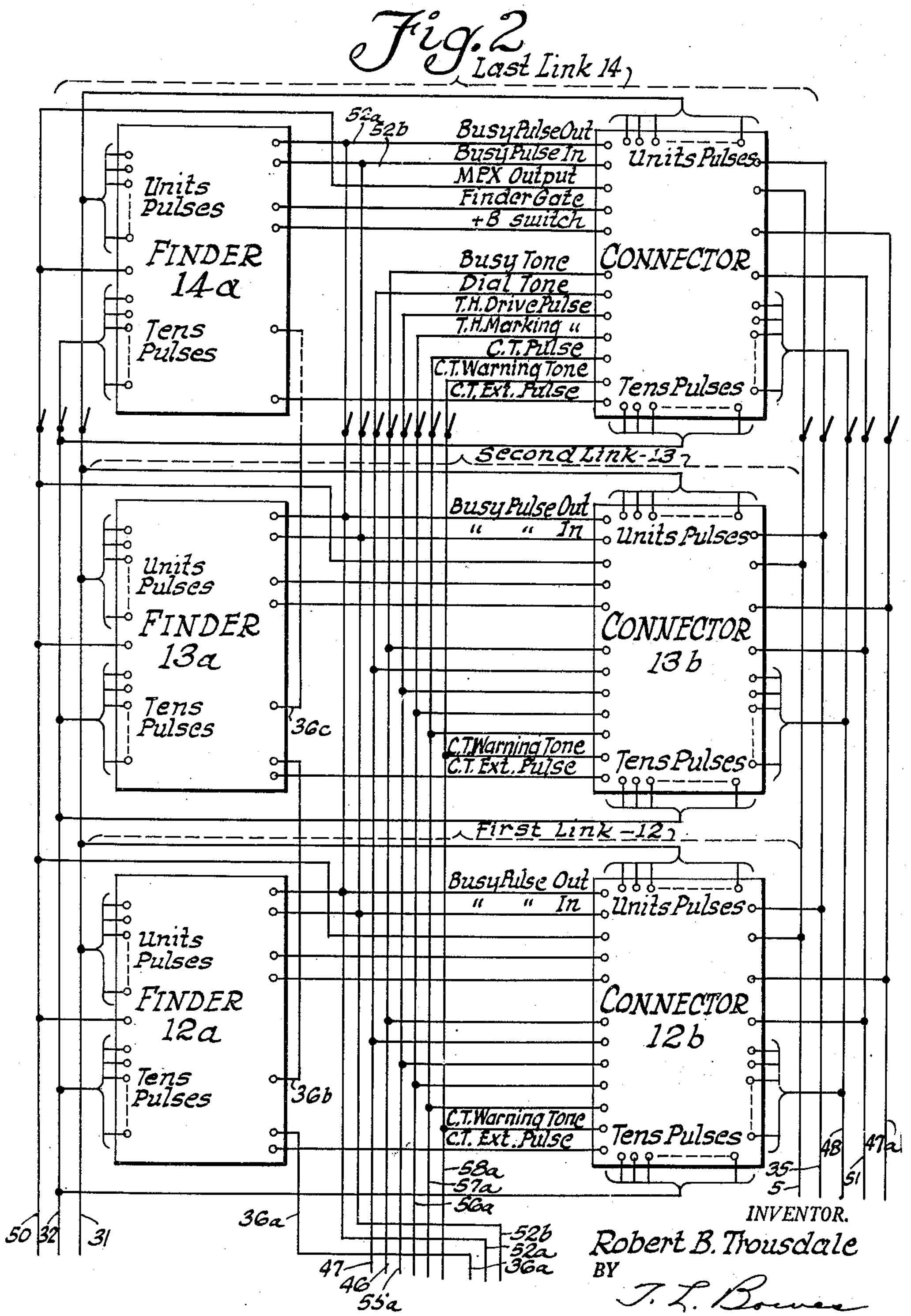
Figure 2A:
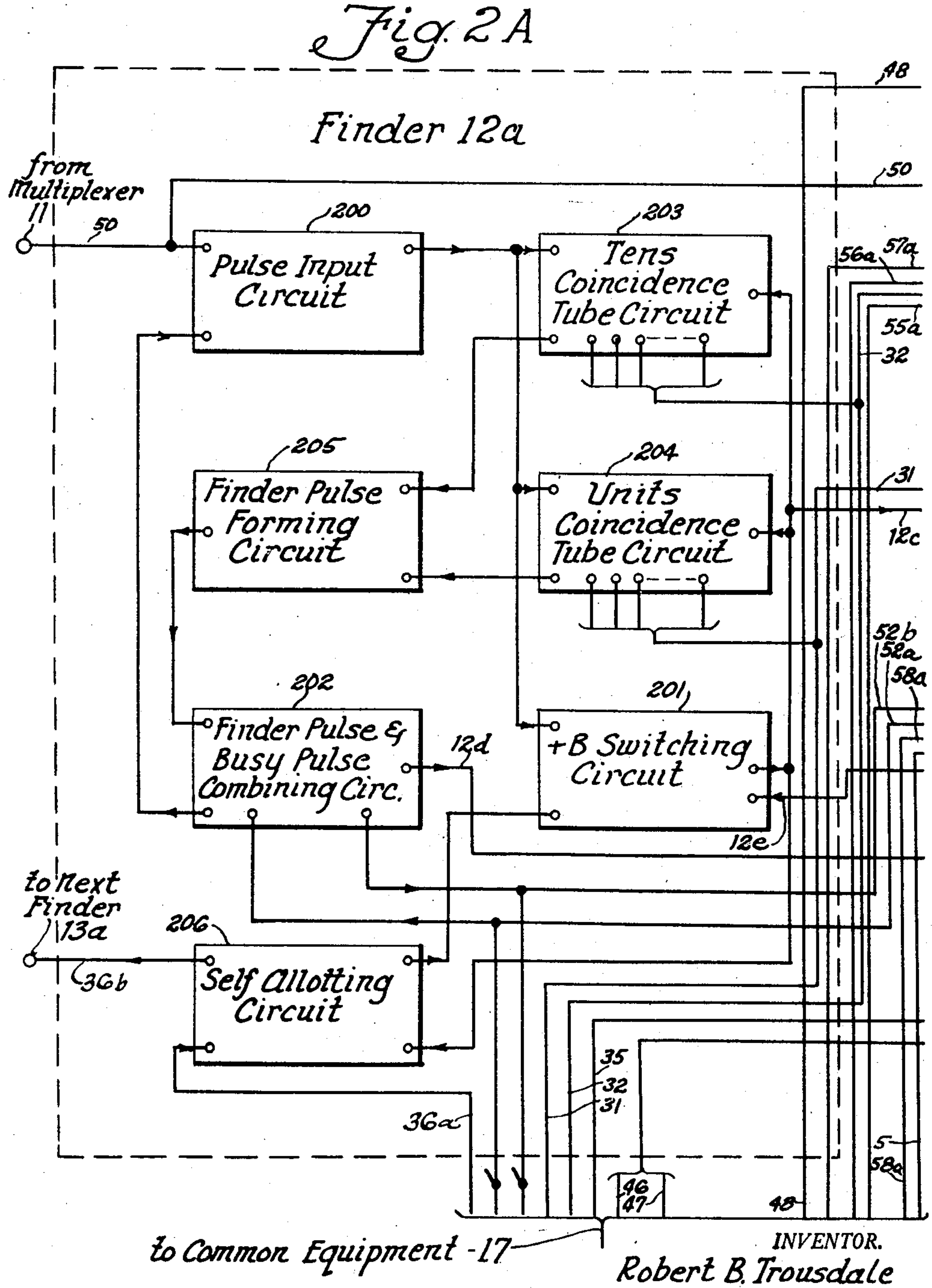

To perform the above functions in the manner fully explained below, the finder 12*a* comprises (see Fig. 2A), a pulse input circuit 200, a +B switching circuit 201, a pulse combining circuit 202, tens and units coincidence tube circuits 203 and 204, a finder pulse forming circuit 205 and a self-allotting circuit 206. It will be noted that the finder 12*a* and connector 12*b* are connected on an individual link basis by only three conductors, namely the +B switch conductor 12*c*, the finder gate pulse conductor 12*d*, and the conversation timing control pulse conductor 12*e*. The finder 13*a* and connector 13*b* of the link 13 are similarly connected on an individual link basis by means of the conductors 13*c*, 13*d*, and 13*e* which respectively correspond to the conductors 12*c*, 12*d*, and 12*e* of the link 12. Similarly, the conductors 14*c*, 14*d*, and 14*e* are provided to connect the finder 14*a* and connector 14*b* of the link 14.

Each of the connectors 12*b*, 13*b*, and 14*b*, performs a plurality of different functions, including those functions related to the special service features of trunk hunting, conversation timing, and fully selective or semi-selective harmonic ringing. Thus the connector 12*b*, for example, is controlled by finder gate pulses delivered thereto over the conductor 12*d* to accept and respond to signal bearing multiplexer pulses occurring in the pulse time position corresponding to the calling line with which the link is associated. It also responds to the application of operating anode potential to the conductor 12*c* and to finder gate pulses appearing on the conductor 12*d* to feed a dial tone signal to the distributor 15 on connector signal pulses occurring in the pulse time position assigned to the calling line with which it is operatively associated, thereby to return the usual dial tone signal to the calling subscriber.

As discussed previously above, the connector 12*b* includes facilities for trunk hunting to select an idle line within a called trunk group in response to a call directed to one of the lines in this trunk group. Thus, the connector 12*b* responds to dial pulses occurring during a first, or tens, digit and a second or units, digit which originate at the calling line with which the link 12 is operatively associated to select the particular pulse time position assigned to the called line. The connector then tests the pulse time position assigned to the called line to determine the idle or busy condition of that line and transmits busy tone carrying pulses to the distributor 15 in the pulse time position assigned to the calling line in the event the called line tests busy. If the called line tests busy and is a member of a private branch exchange trunk group, the connector 12*b* selects the pulse time position next adjacent the time position assigned to the called line, i. e., the time position assigned to the next line of the system and tests successive adjacent pulse time positions until either an idle line is found or the last line in the called trunk group is reached. In the event that all of the lines in the called trunk group test busy, the connector 12*b* transmits busy tone carrying pulses to the distributor 15 in the pulse time position assigned to the calling line.

Incident to the selection of an idle time position the connector 12*b* conditions itself to accept signal carrying pulses from the multiplexer 11 which occur in the pulse time position corresponding to the selected idle called line, to store the intelligence carried by these pulses and to transmit the intelligence to the distributor 15 on connector signal pulses occurring in the time position corresponding to the calling line with which the link 12 is operatively associated. In effect, therefore, the connector functions to shift signal carrying pulses from the pulse time position assigned to the calling line to the pulse time position assigned to the called line and also to shift return signal pulses carrying intelligence derived from the called line from the particular pulse time position assigned to the called line to the particular pulse time position corresponding to the calling line.

In addition, the connector 12*b* performs the auxiliary functions of terminating dial tone transmission to the calling substation when the first line selecting impulse is dialed into the connector and feeding busy pulses occurring in the pulse time position assigned to the dile called line over the common busy pulse out conductor 52*a* to the link coupling circuits 24 and from the link coupling circuits 24 over the common busy pulse in conductor 52*b* to the other links of the system thereby to guard the called line against seizure through another link.

The connector 12*b* responds to dial pulses which occur during a third, or party line ringing, digit originating at the calling line with which the link 12 is operatively associated, by selecting a party line ringing signal which corresponds to the ringing frequency code assigned to the called substation associated with the called line in the event the called line tests idle and transmitting a ringing carrier wave modulated in accordance with the selected ringing signal in the connector signal pulses developed by the connector 12*b* to the distributor 15. Concurrently therewith the connector 12*b* transmits pulses which are modulated with a corresponding ringback tone signal to the distributor 15 in the pulse time position assigned to the calling line thereby to signal the calling subscriber that the called substation associated with the called line is being rung. The connector 12*b* terminates transmission of the party line ringing signal to the distributor 15 and concurrently terminates ringback tone signal transmission to the calling substation in response to answering of the call at the called party line substation.

When the called subscriber answers, the connector 12*b* initiates a conversation timing cycle and at the end of the conversation timing period the connector 12*b* is arranged either to release the link 12 completely from the calling and called lines or to return a busy tone to the calling subscriber irrespective of any action of the calling and called subscribers participating therein. The connector 12*b* is also arranged to transmit warning tone carrying pulses to the distributor 15 in the pulse time positions assigned to the calling and called lines a predetermined interval before the end of the conversation timing period to inform the calling and called line subscribers that the call will be terminated automatically a short interval thereafter.

Figure 2B:
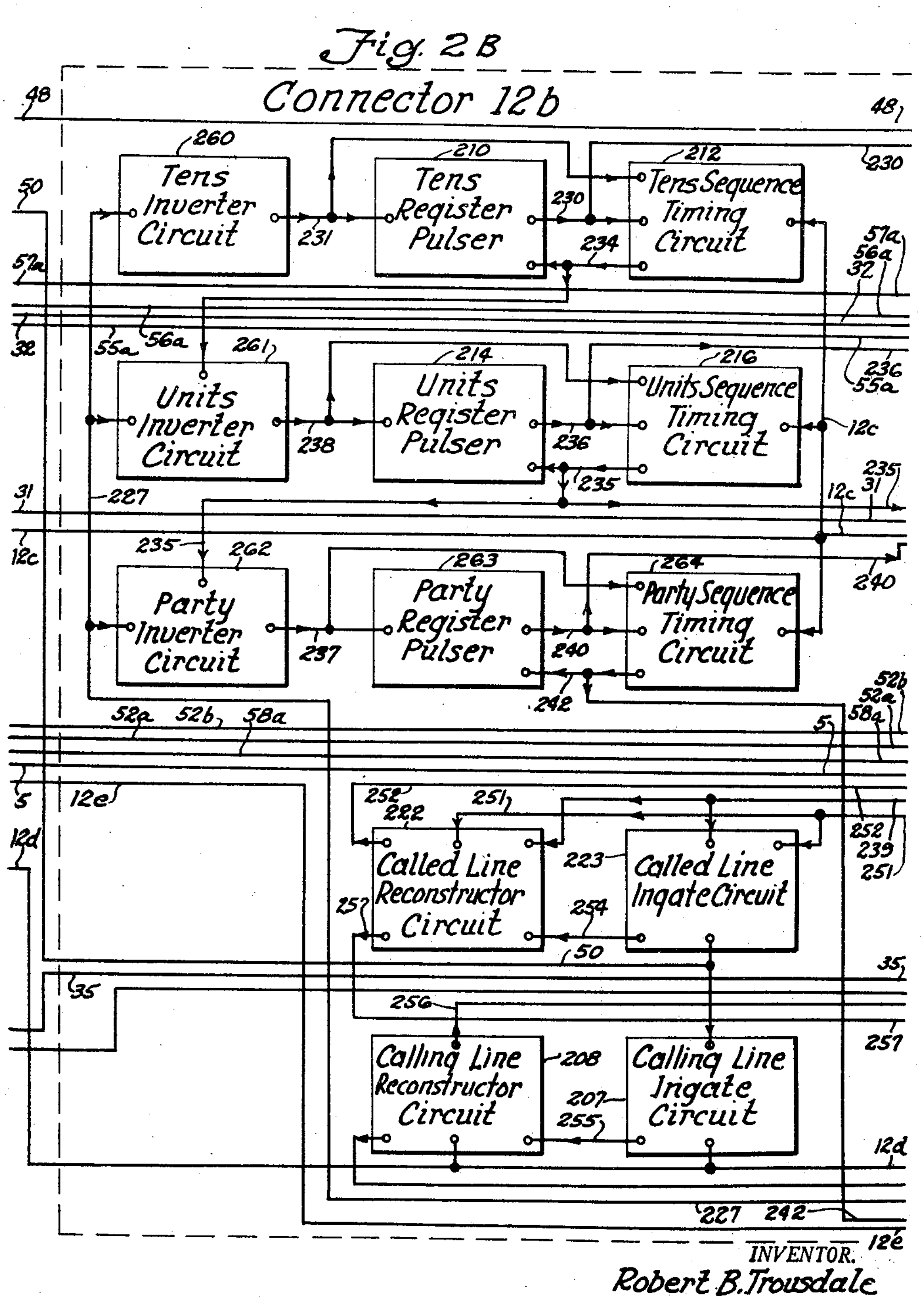
Figure 2C:
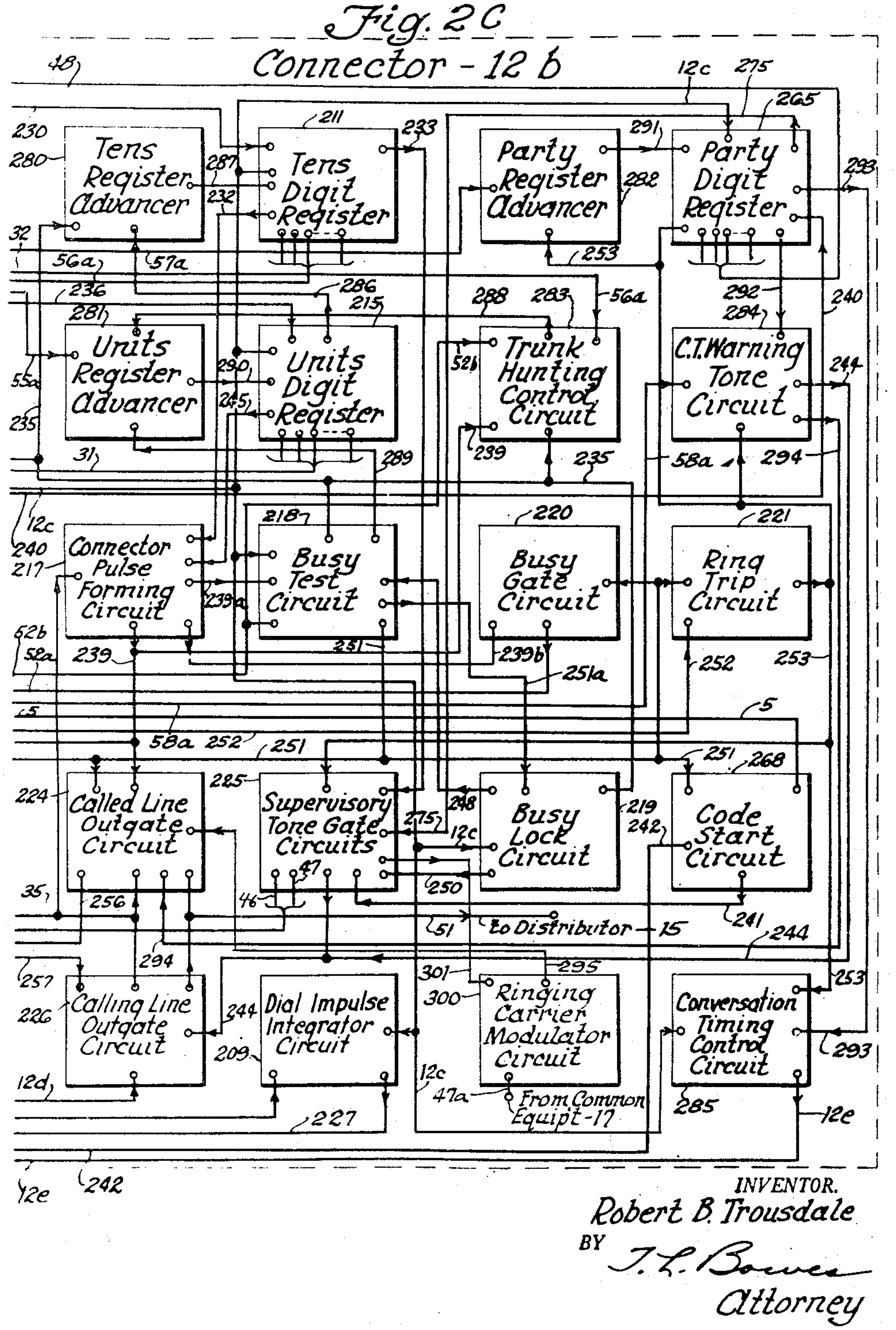
Figure 3:
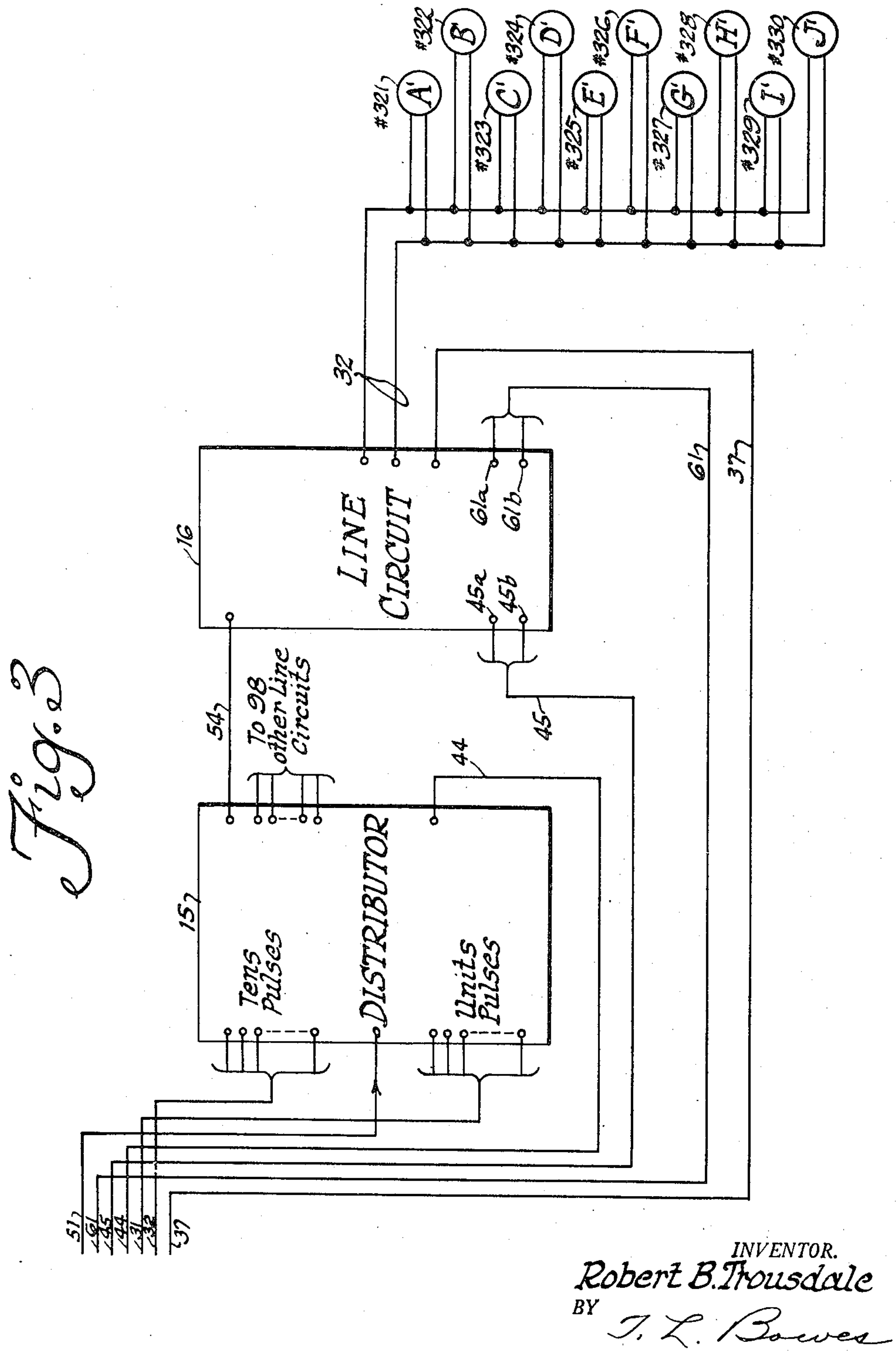

To perform the above-mentioned functions in the manner fully explained below, the connector 12*b*, as diagrammatically illustrated in Figs. 2B and 2C, is provided with a calling line in gate circuit 207 which responds to finder gate pulses transmitted to the connector over the conductor 12*d* to repeat signal bearing pulses delivered thereto from the multiplexer 11 in the pulse time position assigned to the calling line, and a calling line reconstructor circuit 208 having the function of detecting or reconstructing and storing the intelligence carried by signal bearing pulses transmitted to the connector from the multiplexer 11 in the pulse time position assigned to the calling line. The connector 12*b* further comprises a called line out gate circuit 224 for gating to the distributor 15 connector signal pulses carrying the intelligence reconstructed by the circuit 208 in the time position assigned to a particular called line. In addition, the connector 12*b* includes a called line in gate circuit 223 for repeating multiplexer pulses in the pulse time position assigned to the called line which bear intelligence or control signals derived from the called line, a called line reconstructor circuit 222 for detecting or reconstructing the intelligence or control signals gated by the called line in gate circuit 223, and a calling line out gate circuit 226 which is controlled in accordance with the detected intelligence stored in the circuit 222 and by the finder gate pulses delivered to the connector over the conductor 12*d* to gate to the distributor 15 signal bearing connector pulses which occur in the pulse time position assigned to the calling line. More generally, the three circuits 207, 208 and 224 function to repeat intelligence from the calling line to the called line, whereas the three corresponding circuits 223, 222 and 226 function to repeat to the calling line intelligence derived from the called line.

The connector 12*b* additionally comprises a plurality of components for responding to three digits of dial impulses repeated to the connector on multiplexer pulses occurring in the pulse time position assigned to the calling line, the third digit identifying the particular party line ringing signal assigned to the called party line substation. In general, the dial impulse responsive equipment of the connector 12*b* comprises a dial impulse integrator circuit 209 which receives dial impulses from the reconstructor circuit 208, tens, units and party inverter circuits 260, 261 and 262, respectively, to which impulses are repeated by the dial impulse integrator circuit 209, the units and party inverter circuits 261 and 262 also acting as start gate circuits for the units and party digit channels, respectively; tens, units and party digit registers 211, 215 and 265 which are respectively controlled in accordance with the numerical values of the tens, units and party digits repeated to the circuits 260, 261 and 262 from the integrator circuit 209; tens, units and party register pulsers 210, 214 and 263 which are respectively interposed between the inverter circuit and the digit register of the tens, units and party digit channels, and tens, units and party sequence timing circuits 212, 216 and 264 which in effect function as the digit counting components of the connector, i. e., initiate certain operations at the ends of the first second and third digits dialed into the connector.

The connector 12*b* further comprises a connector pulse forming circuit 217 which is controlled in accordance with the settings imparted to the tens and units digit registers 211 and 215 at the end of the second digit to produce connector pulses which are employed to control the circuits 222, 223 and 224 in the transmission of intelligence and control signal information from the connector to the distributor 15 in the pulse time position assigned to the called line. The busy test facilities of the connector comprise a busy test circuit 218 jointly controlled by the connector pulse forming circuit 217 and busy pulses transmitted to the connector over the common busy pulse in conductor 52*b*, a busy lock circuit 219 and a busy gate circuit 220.

The trunk hunting facilities of the connector 12*b* comprise a trunk hunting control circuit 283 jointly controlled by the connector pulse forming circuit 217, the units sequence timing circuit 216, busy pulses transmitted to the connector over the common busy pulse in conductor 52*b*, and trunk marking pulses transmitted to the connector over the common trunk marking pulse conductor 56*a*; a units register advancer 281 and a tens register advancer 280.

The conversation timing facilities of the connector 12*b* comprise a conversation timing warning tone circuit 284 jointly controlled by the party digit register 265, the ring trip circuit 221 and a warning tone signal transmitted to the connector over the common conductor 58*a*; a party register advancer 282 and a conversation timing control circuit 285, the circuit 285 operating to produce a control pulse at the end of a predetermined conversation period which in one embodiment is transmitted to the +B switching tube in the circuit 201 in the finder 12*a* to effect release of the link 12 by extinguishing this tube. In the alternative, this control pulse may be used to make the connector busy and return busy tone to the subscriber to inform him that the conversation timing period is over as described in detail in my copending application, Serial No. 301,205 identified above.

In addition, the connector 12*b* comprises supervisory tone gate circuits 225 having the function of gating dial and busy tones to the calling line and including a ringback tone gate circuit having the functions of gating a particular party line ringback tone signal selected by the party digit register 265 in accordance with the identity of the called substation to the calling line and transmitting a corresponding ringing signal to a ringing carrier modulator circuit 300 wherein this ringing signal is modulated on a ringing carrier wave and is transmitted to the called line out gate circuit 224; a code start circuit 268 which performs the function of delaying the transmission of the selected party line ringback tone signal through the ringback tone gate circuit until the start of each party line ringing period, and a ring trip circuit 221 which is assigned the function of terminating ringing current transmission to the called substation, concurrently initiating the conversation timing period when a call answering operation is performed at the called substation.

Generally considered, the common equipment 17 comprises a master oscillator 18 designed to operate at a fixed radio frequency (preferably one megacycle) and having its output terminals connected to control a phase shifter and pulse former network 19. If desired or necessary, the master oscillator 18 may be common to a plurality of exchanges, in which case it is connected to feed its output signal to the several exchanges over coaxial cables. As controlled by the master oscillator 18, the phase shifter and pulse former network 19 functions continuously to develop two identical trains of shaped pulses having a common pulse frequency of one megacycle, which are transmitted over the channels 40 and 41, respectively, to a units pulse ring circuit 20 and a commutator drive circuit 25. The phase relationship between the pulses respectively produced in the channels 40 and 41 by the network 19 may be shifted as desired through adjustment of certain of the components of this network. As controlled by the phase shifter and pulse former network 19, the units pulse ring circuit 20 functions sequentially to develop the positive unit pulses which define the pulse time positions of the pulse frames, appear on the conductors within the cable 31, and are fed by way of these conductors to the various intelligence transmitting and control components of the system. More specifically, the cable 31 comprises ten units pulse conductors 31*a*, 31*b*–31*j* over which positive unit pulses are sequentially transmitted in the order named to the units coincidence tube circuits 204 of the finders 12*a*, 13*a* and 14*a*, the units digit registers 215 of the connectors 12*b*, 13*b* and 14*b*, and the units gate circuits of the trunk marking pulse generator 56, as described in more detail hereinafter. The positive units pulses developed upon the two conductors 31*a* and 31*f* are also employed to control a supervisory carrier supply circuit 26.

The positive units pulses are sequentially developed on the units conductors 31 at a frequency rate of 100 kilocycles and each tenth positive units pulse, i. e., each pulse appearing on the units pulse conductor 31*j*, is used to step, or trigger, a tens pulse ring circuit 21 having the function of developing the positive tens pulses, each of which spans the time interval of ten units pulses. The positive tens pulses as sequentially produced by the ring circuit 21 on the tens pulse conductors 32*a*, 32*b*–32*j*, forming the illustrated cable 32, are impressed upon the gate circuits of the multiplixer 11, the tens pulse gate circuits of the distributor 15, the tens coincidence tube circuits 203 of the finders 12*a*, 13*a* and 14*a*, and the tens pulse gate circuits of the trunk marking pulse generator 56, in the manner more fully explained below. In this connection it will be noted that all of the components of the system of the present invention are arranged to operate with tens and units pulses of only one polarity, i. e. positive tens and units pulses, thereby materially simplifying the system and reducing the number of conductors between the various units of the system.

As controlled by the positive units pulses derived from the units pulse ring circuit 20 and the commutator drive pulses derived from the commutator drive circuit 25, the channel pulse commutator 22 functions successively to develop very narrow channel pulses on the channel pulse conductors 34*a*, 34*b*–34*j* forming the cable 34, which are fed to the gate circuits of the multiplexer 11. These channel pulses occur at the same frequency as the units pulses, but are much narrower in width. For example, the channel pulses appearing on the conductor 34*a* are much narrower than the units pulses appearing on the positive units pulse lead 31*a* and are preferably so phased relative to the units pulses that each channel pulse occurs well within the limits of the coincident positive units pulse. Commutator drive pulses as derived from the commutator drive circuit 25 are also transmitted directly over a commutator drive pulse conductor 35 to the out gate circuits 224 and 226 of each of the connectors 12*b*, 13*b* and 14*b*.

In order to provide facilities for effecting party line ringing of the called substation on either a fully selective or a semi-selective harmonic ringing basis, the common equipment 17 further includes a harmonic ringing oscillator 97, which operates independently of the other components of the system, and is designed to operate at an audio frequency (preferably 1200 cycles) which is suitable for subdivision into a group of harmonically related ringing frequencies. The oscillator 97 is connected over the conductor 102 to a harmonic ringing frequency generator 98 which operates under the control of the 1200 cycle signal from the oscillator 97 to develop five continuous wave ringing signals of different frequencies which are suitable for exciting the ringing facilities of five different substations connected to one of the lines of the system. In the illustrated embodiment the ringing frequencies developed by the generator 98 correspond to the frequencies of the conventional harmonic ringing series so that conventional frequency sensitive ringers may be employed in the substations of the system. Thus, continuous wave signals having the frequencies 16⅔ C. P. S., 25 C. P. S., 33⅓ C. P. S., 50 C. P. S., and 66⅔ C. P. S. are respectively impressed upon the conductors 103–107, inclusive. However, it will be understood that either of the two other series of ringing frequencies, in the synchromonic and the decimonic series may be developed in substantially the same manner as will be described in more detail hereinafter.

The common equipment 17 further comprises the harmonic ringing code forming circuit 99 which operates independently of the other components of the system to develop two different party line code ringing signals during each of five successive ringing periods which recur during repetitive ringing cycles established by the circuit 99. In the illustrated embodiment each ringing period lasts for approximately 1½ seconds and is separated from the adjacent ringing periods by a short guard interval, the over-all ringing cycle being approximately 7½ seconds long. During each of the five ringing periods the code forming circuit 99 produces both a long ringing pulse, which lasts for 1½ seconds, and two short ringing pulses each of ½ second duration separated by a ½ second silent period. The series of ten coded ringing pulses formed by the circuit 99 are used to control a harmonic ringing modulator circuit 100 wherein the 1½ second ringing pulses are used as gating pulses sequentially to gate to a common output conductor 108 the different ringing frequencies impressed on the conductors 103–107, inclusive, by the generator 98, and the multiplexed ringing frequencies thus impressed on the conductor 108 are transmitted to a harmonic ringing amplifier and supply circuit 101.

The common equipment 17 also includes a ringback tone generator 29c which performs the function of developing a continuous audible ringback tone signal (preferably 200 C. P. S.) which is supplied over the conductor 27b to the harmonic ringing modulator circuit 100. Each one of the ten codes formed by the circuit 99 is used to develop corresponding pulses of ringback tone on the ten ringback tone conductors 48a–48j, inclusive, which form the illustrated ringback tone cable 48. These ringback tone pulses are transmitted over the cable 48 to the party digit registers 265 of the connectors 12b, 13b, and 14b. The harmonic ringing amplifier and supply circuit 101 filters and amplifies the multiplexed ringing frequencies transmitted thereto over the conductor 108, and includes a combined bias voltage and multiplex ringing current source which is connected to each of the line circuits 10, 16, etc. over the common multiple conductors 61a and 61b forming the illustrated cable 61. In addition, the common equipment 17 includes a ringing carrier generator 29f which develops a ringing carrier wave which is supplied to the ringing carrier modulator circuits 300 in each of the connectors of the system.

In order to mark certain consecutively numbered groups of the lines of the system as private branch exchange trunks, the common equipment 17 includes the trunk marking pulse generator 56 which is jointly controlled by the positive units pulses transmitted thereto over the cable 31 and the positive tens pulses transmitted thereto over the cable 32 and develops on the common output conductor 56a thereof trunk marking pulses which appear in the time positions assigned to each of the lines in each trunk group with the exception of the last line in each group which is unmarked. The trunk marking pulses produced on the conductor 56a are impressed upon the trunk hunting control circuits 283 in each of the connectors 12b, 13b and 14b of the system.

To provide a trunk hunting arrangement wherein the tens and units digit registers are successively driven to different settings to hunt for an idle line, there is provided in the common equipment 17 a trunk hunting drive pulse generator 55 which operates independently of the other components of the system to develop positive trunk hunting drive pulses of relatively short duration which recur at a relatively low rate (preferably in the order of 100 pulses per second) which are impressed on the common conductor 55a and are connected by way of this conductor to the units register advancers 281 in each of the connectors 12b, 13b, and 14b.

In order to provide facilities for timing the conversation period and for warning the calling and called line subscribers when the call is about to be terminated, the common equipment 17 includes a conversation timing pulse generator 57 and a conversation timing warning tone generator 58. The timing pulse generator 57 operates independently of the other components of the system to develop relatively narrow positive conversation timing pulses which preferably have a repetition rate of about one every 40 seconds and are connected by way of the common conductor 57a to the party register advancers 282 in each of the connectors 12b, 13b, and 14b. The conversation timing warning tone generator 58 also operates independently of the other components of the system to develop a continuous wave warning tone signal (preferably 400 C. P. S.) which is connected by way of the common conductor 58a to the conversation timing warning tone circuits 284 in each of the connectors 12b, 13b, and 14b.

The common equipment also includes a busy tone generator 29a and a dial tone generator 29b which are respectively connected by way of the common conductors 46 and 47 to the supervisory tone gate circuits 225 in each of the connectors 12b, 13b, and 14b. The common equipment 17 further comprises the link coupling circuits 24 which include a busy pulse drive channel for repeating busy pulses supplied thereto over the common busy pulse out conductor 52a to the busy pulse in conductor 52b which is multipled to the finders and connectors of all the links of the system, and a supervisory carrier drive channel for repeating the 100 kc. supervisory carrier supplied thereto over the conductor 37 from the supervisory carrier supply circuit 26 to the self-allotting circuit 206 of the finder 12a over the conductor 36a to permit the finder 12a to handle the first incoming call.

In order to render the mode of operation of the system more readily understandable, a pulse chart has been illustrated in Figs. 11 to 14, inclusive, to show the relative widths of the pulses developed by the common equipment components 19, 20, 21 and 22 during two successive pulse frames, as well as the time or phase relationship between the pulses. As there shown, the units pulse ring drive pulses 95a, appearing on the conductor 40 are produced by the phase shifter and pulse former circuit 19 along the zero potential reference line 95 at a frequency rate of one megacycle and are of positive polarity. Similarly, the channel pulse commutator drive pulses 96a appearing on the conductors 41 and 35 are produced by the phase shifter and pulse former network 19 along the zero potential reference line 96 at the same frequency of one megacycle and are of positive polarity. It will be noted that both the units pulse ring drive pulses 95a and the commutator drive pulses 96a are very narrow, i. e., persist for very short time intervals, and that the pulses 96a are so displaced in time relative to the pulses 95a that each commutator drive pulse 96a occurs approximately at the middle of the period separating the preceding and succeeding units pulse ring drive pulses 95a. The positive units pulses appearing respectively on the units pulse conductors 31a, 31b–31j are produced along the zero potential reference lines 62, 63–71. It will be noted that the units pulses are produced by the units pulse ring circuit 20 at the fundamental frequency rate of one megacycle. However, due to diversion of the pulses successively to different ones of the units pulse conductors a, b–j, the pulses along any particular zero potential reference line, such, for example, as the line 62, recur only at a frequency rate of one hundred kilocycles. It will also be noted that the units pulses are successively produced on the units pulse conductors 3a to 3j, inclusive, in the order of alphabetical designation of these conductors. Thus, successive positive units pulses produced along any particular zero potential reference line, as, for example, those occurring during the units pulse periods 62a, 62b, 62c, etc., along the potential reference line 62, are separated by a time interval equaling the sum of nine units pulse time positions and during which units pulses are produced successively along each of the nine other zero potential reference lines.

The positive tens pulses successively produced by the tens pulse ring circuit 21 on the tens pulse conductors 32a, 32b–32j are illustrated as appearing along the ten zero potential reference lines 72 to 81, inclusive. It will be noted that each tens pulse persists for a time interval exactly equaling the time required to produce ten units pulses. Thus, the tens pulse period 72*a* persists for the duration of the interval in which the ten units pulses 62*a*–71*a* are successively produced by the units pulse ring circuit 20. It will also be noted that the starting point of each tens pulse period 72*a*, 73*a*, 74*a*, etc., is exactly coincident with the starting points of the units pulses 62*a*, 62*b*, 62*c*, etc., appearing along the zero potential reference line 62 and impressed upon the units pulse conductor 31*a*, by the units pulse ring circuit 20. Further, each tens pulse period terminates at the exact instant of termination of the units pulses 71*a*, 71*b*, 71*c*, etc., appearing along the zero potential reference line 71 and produced by the units pulse ring circuit 20 on the conductor.

The channel pulses which are successively produced on the ten channel pulse conductors 34*a*, 34*b*–34*j* by the channel pulse commutator 22 and are transmitted to the multiplexer 11 for signal bearing purposes in the manner indicated above, are of positive polarity, are produced along the zero potential reference lines 82 to 91, inclusive, and occur in time coincidence with the commutator drive pulses 96*a* appearing along the zero potential reference line 96. Like the units pulses, the channel pulses are produced at the fundamental frequency rate of one megacycle, but due to the action of the commutator 22 in diverting these pulses successively to the conductors 34*a*, 34*b*–34*j* recur only on each of these conductors at a rate of one hundred kilocycles. Thus the channel pulses 82*a*, 82*b*, 82*c*, etc., appearing along the reference line 82 and impressed on the conductor 34*a* are spaced apart timewise by like intervals each of which exactly equals the sum of ten units pulse time periods. During this spacing interval, nine additional channel pulses are successively produced along the reference lines 83, 84–91 to appear on the conductors 34*b*, 34*c*–34*j*. It will also be noted that the channel pulses are very narrow in width, having a persistence interval of the order of one-fifth the persistence interval of the units pulse time period. Moreover, each channel pulse occurs well within the limits and preferably within the first half of each units pulse. This is accomplished by utilizing the channel pulse commutator drive pulses developed on the conductor 35 and appearing along the zero potential reference line 96, which are displaced timewise relative to the units pulse ring drive pulses 95*a*, to open the gating circuits of the channel pulse commutator 22. The purpose of thus positioning the signal bearing pulses in the units pulse time positions is that of insuring transmission of these pulses through the units gate circuits of the signal handling components of the system while these gate circuits are open despite slight variations in relative positions of the units pulses and the signal bearing pulses occasioned by circuit delays.

With the above general description of the pulse chart illustrated in Figs. 11 to 14, inclusive, in mind, it will readily be understood that each pulse frame is divided into one hundred readily identifiable pulse time positions. Thus, the first ten pulse time positions of each pulse frame, which are respectively assigned to the lines of the system having the directory number designations 11, 12, 13–10, are defined by the first tens pulse period 72*a* of the frame within which the ten units pulse periods 62*a*, 63*a*, 64*a*–71*a* occur. Similarly, the second ten pulse time positions, which are respectively assigned to the lines of the system having the directory number designations 21, 22, 23–20, are defined by the second tens pulse period 73*a* during which the tens units pulse period 62*b*, 63*b*, 64*b*–71*b* occur. Again, the third ten pulse time positions, which are respectively assigned to the lines of the system having the directory number designations 31, 32, 33–30, are marked out by the third tens pulse time period 74*a* during which the ten units pulse periods 62*c*, 63*c*, 64*c*–71*c* occur. Thus, it will be understood that the pulse time position of each pulse frame which is assigned to the illustrated line 23 occurs during the second tens pulse interval 73*a* of each pulse frame and is coincident with the units pulse period 64*b* of each pulse frame. It will also be apparent that the corresponding channel pulse 84*b* occurs well within the limits of this pulse time position. Similarly, the pulse time position assigned to the illustrated line 32 occurs during the third tens pulse time interval 74*a* of each pulse frame and is coincident with the second units pulse period 63*c* of each pulse frame. Here again, each channel pulse 83*c* corresponding to the line 32 occurs well within the limits of the particular pulse time position assigned to the line 32 in each pulse frame.

In order further to render the mode of operation of the disclosed fully selective or semi-selective harmonic ringing system more readily understandable, a harmonic code sequence chart has been illustrated in Fig. 15 to show the time and phase relationship of the signals developed by the harmonic ringing code forming circuit 99 and the harmonic ringing modulator circuit 100 in the common equipment 17 during one harmonic ringing cycle. As there shown, the code forming circuit 99 develops a series of long ringing pulses 165, 166, 167, 168, and 169 on five different output code buses thereof which recur in succession during successive harmonic ringing cycles of approximately 7½ seconds' duration. The long ringing pulses 165–169, inclusive, define a succession of five ringing periods which are separated by guard intervals 186 of relatively short duration. The code forming circuit 99 also operates to produce on five other code buses thereof a pair of short ringing pulses during each ringing period. Thus, the circuit 99 develops the short ringing pulses 170 and 171 during the first ringing period, the pulses 172 and 173 during the second ringing period, the pulses 174 and 175 during the third ringing period, etc. In addition, the code forming circuit 99 develops the positive code start pulses 180 (Fig. 15 (11)) which occur substantially at the end of each of the guard intervals 186. The code start pulses 180 are transmitted over the common conductor 5 to each of the connectors 12*b*, 13*b*, and 14*b* to delay the selection of a particular party line ringing signal until the end of a particular ringing period.

The long ringing pulses 165 are employed in the harmonic ringing modulator circuit 100 successively to gate different ringing frequencies to the common output conductor 108 and the composite or multiplexed ringing frequency signal is filtered in the harmonic ringing amplifier and supply circuit 101 so as to provide a ringing voltage waveform substantially as shown in Fig. 15 (12). Thus, during the first ringing period the ringing pulse 165 is used to gate a 66⅔ C. P. S. ringing voltage to the common conductor 108. After the guard interval 186, the ringing pulse 166 is employed to gate a 50 C. P. S. ringing voltage to the conductor 108 during the second ringing period. Likewise, the successive ringing pulses 167, 168, and 169 are employed successively to gate to the common output conductor 108 ringing voltages having frequencies of 33⅓ C. P. S., 25 C. P. S., and 16⅔ C. P. S.

In order to produce ringing control signals which may be used to control the application of ringing current to the called line during the particular ringing period and in accordance with the particular ringing code assigned to the called substation connected thereto, and also to produce concurrently therewith corresponding ringback tone signals which may be used to advise the calling line subscriber that the called line is being rung in a particular code sequence, the long and short ringing pulses (Figs. 15 (1)–(10), inclusive) developed by the harmonic ringing code forming circuit 99 are used individually to gate to the output conductors 48*a*–48*j*, inclusive, a ringback tone signal for the duration of the ringing pulse. Thus, the ringing pulse 165 developed in the code forming circuit 99 is used to develop a ringback tone signal 165*a* which persists for the duration of the first ringing period. Likewise, the short ringing pulses 170 and 171 are employed to produce the ringback tone signals 170*a* and 171*a* which have a duration of one-half second and are separated by a one-half second interval, the signals 170*a* and 171*a* also occurring during the first ringing period. In the same manner the pulses 166, 172, and 173 are employed to develop the corresponding ringback tone signals shown in Figs. 15 (15) and (16) during the second ringing period. In a similar manner the long and short ringing pulses which are produced during the third, fourth, and fifth ringing periods are employed to produce the ringback tone signals shown in Figs. 15 (17)–(22), inclusive.

With the above general description of the harmonic code sequence chart illustrated in Fig. 15 in mind, it will readily be understood that each harmonic ringing cycle is divided into five successive ringing periods and during each ringing period there is produced a first party line ringing signal consisting of one long ringing pulse, and a second party line ringing signal consisting of two short pulses, each party line ringing signal being repeated at approximately 7½ second intervals. In the event that a maximum of five substations are associated with any one line of the system, only the long ringing pulses 165–169, inclusive, need be employed and under these conditions the first substation would be provided with ringing facilities which are responsive to a 66⅔ C. P. S. ringing current, the second substation would be provided with ringing facilities which are responsive to 50 C. P. S. ringing current, the third substation would be provided with ringing facilities responsive to 33⅓ C. P. S. ringing current, the fourth substation would be provided with ringing facilities responsive to 25 C. P. S. ringing current, and the fifth substation would be provided with ringing facilities responsive to 16⅔ C. P. S. ringing current. The five substations would be assigned different third digit directory number designations and one of the ringback tones 165*a*–169*a*, inclusive, would be selected in the connector in response to the dialing of a third digit at the calling substation. If, for example, a substation having ringing facilities responsive to 66⅔ C. P. S. ringing current is selected in the connector, the ringback tone signal 165*a* is selected and is used to control the application of ringing current so that only the 66⅔ C. P. S. signal 181 (Fig. 15 (12)) is applied to the called line and only the substation having ringing facilities which respond to this ringing frequency will be rung.

In the event that more than five substations up to a maximum of ten are associated with one of the lines of the system, the group of substations is divided into pairs and each pair of substations is provided with ringing facilities responsive to the same ringing frequency. Thus, the substations A′ and B′ associated with the line 32 and assigned the directory number designations 321 and 322 would both be provided with ringing facilities responsive to the same ringing current, for example a 66⅔ C. P. S. ringing current. If the calling subscriber wishes to call substation A′ he dials 321 and the connector responds to the third digit of "1" by selecting the ringback tone signal 165*a* so that a 66⅔ C. P. S. ringing current is transmitted over the called line 32 during the entire first ringing period. Only the ringers at the substations A′ and B′ will then be rung for a period of approximately 1½ seconds and the subscriber at the substation A′ will know that the call is intended for him. On the other hand, if the calling subscriber wishes to call the substation B′ associated with the line 32, he dials the number 322 and the connector responds to the third digit of "2" by selecting the ringback tone signal consisting of the short pulses 170*a* and 171*a* which control the application of 66⅔ C. P. S. ringing current to the line 32 so that the ringing facilities at both the substations A′ and B′ are rung in two short rings. The subscriber at the substation B′ is then notified that his substation is being rung.

In a similar manner the substations C′ and D′ are provided with ringing facilities responsive to 50 C. P. S. ringing current, the substations E′ and F′ are provided with ringing facilities responsive to 33⅓ C. P. S. ringing current, etc. However, it will be understood that certain ones of the lines of the system may be adapted for private service, in which case the private line will, of course, have only one substation associated therewith. Thus, in the illustrated embodiment the line 23 is adapted for private service and is associated therewith only the one substation A to which is assigned the directory number designation 231. When the line 23 is called by dialing the number 231, the connector responds to the third digit of "1" by transmitting a 66⅔ C. P. S. ringing current over the line 23 and the substation A is provided with ringing facilities responsive to this ringing current so that the substation A is rung during the first ringing period of each harmonic ringing cycle.

In order to render the mode of operation of the disclosed trunk hunting facilities more readily understandable, a trunk marking pulse chart has been illustrated in Fig. 16 to show the time and phase relationship of the trunk marking pulses developed by the trunk marking pulse generator 56 in the common equipment 17. Referring to this figure, the one hundred time positions which comprise one pulse frame are illustrated as a series of ten horizontal strings of blocks corresponding to the ten tens digit levels of the lines of the system. In each of the blocks there is shown the directory number designation of the line which is assigned corresponding units time position. Thus, the first units time position 62*a* in each time position frame is assigned to the line having the directory number designation "11," the second units time position 63*a* in each time position frame is assigned to the line having the directory number designation "12," the third units time position 64*a* in each time position frame is assigned to the line having the directory number designation "13," and the tenth units time position 71*a* is assigned to the line having the directory number designation "10." In the second tens digit level the eleventh units time position 62*b* in each time position frame is assigned to the line having the directory number designation "21," and the twentieth units time position 71*b* in each time position frame is assigned to the line having the directory number designation "20." Likewise, in the tenth tens digit level the ninety-first units time position 62*j* in each time position frame is assigned to the line having the directory number designation "01" and the one-hundredth units time position 71*j* is assigned to the line having the directory number designation "00".

In order to mark certain lines of the system as private branch exchange trunks, the trunk marking pulse generator 56 selects certain ones of the units pulses supplied thereto over the multiple conductor cable 31 and gates the selected units pulses by means of appropriate tens pulses supplied thereto over the multiple conductor cable 32 to rovide trunk marking pulses which occur once in each time position frame in particular units pulse time positions. As will be described in more detail hereinafter, the last line in each trunk group is unmarked.

In the trunk marking pulse chart of Fig. 16 there are shown nine different private branch exchange trunk groups. One of these trunk groups is comprised of the lines having the directory number designations 32–42, inclusive, and the trunk marking pulse generator 56 operates to develop trunk marking pulses during each of the time positions assigned to these lines except the last line 42. It will be evident from Fig. 16 that this trunk group includes lines which are positioned in different tens digit levels. Thus, the lines 32–39, inclusive, and 30 are located in the third tens digit level, whereas the lines 41 and 42 are located in the fourth tens digit level. Since the line 42 is the last line in this trunk group no trunk marking pulse is produced in the time position 63*d* assigned thereto. A second trunk group is shown as comprising a group of thirty-two lines starting with the line 45 and ending with the line 76. Accordingly, trunk marking pulses are produced in all of the consecutive time positions assigned to these lines except the last line 76. It will be noted that this trunk marking group of thirty-five lines includes lines having four different tens digit directory number designations. A third trunk group is illustrated as comprising the lines 91, 92, and 93, the lines 91 and 92 being marked by trunk marking pulses. In a similar manner the lines 94, 95, and 96 comprise a fourth trunk group, and the lines 97, 98, and 99 comprise a fifth trunk group. The lines 90, 01, and 02 comprise a sixth trunk group, only the lines 90 and 01 being marked by corresponding trunk marking pulses produced in their respective time positions. A two-line trunk group is shown as comprising the lines 03 and 04 constituting the seventh trunk group. The eighth trunk group includes a plurality of lines in the tenth tens digit level and also a plurality of lines in the first tens digit level. Thus, the eighth trunk group comprises the lines 05–09, inclusive, 00, and 11–15, inclusive. It will be noted that the eighth trunk group includes lines in the last tens digit level as well as the first tens digit level so that the trunk hunting facilities of the system are capable of hunting not only through different tens digit levels but from the last time position to the first time position, i. e., from the time position **71*j* to the time position 62*a*. A ninth trunk group is illustrated as comprising the three lines 26, 27 and 28, the lines 26 and 27** being marked by corresponding trunk marking pulses.

OPERATION OF THE SYSTEM AS A WHOLE

Briefly to consider the general mode of operation of the system, it may be assumed that the party line substation B′ is called from the private substation A during a period when the finder-connector link 12 is idle. When the receiver or hand set at the substation A is lifted from its supporting hook or cradle to initiate the call, a loop circuit including the conductors of the line 23 is closed to the line circuit 10, with the result that this line circuit immediately operates to change the magnitude of the bias potential which it delivers over the conductor **53*b* to the gating circuit of the multiplexer 11 which individually corresponds to the line 23. The multiplexer 11 responds to this change in magnitude of the controlling bias potential supplied thereto from the line circuit 10 by opening this gate circuit. Accordingly, only the signal pulses 84*b* occurring during the pulse time positions 64*b* of successive pulse frames, are permitted to pass over the common conductor 50 to the pulse input circuits 200 of the finders 12*a*, 13*a*, and 14*a* and the in gate circuits 207 and 223 of the connectors 12*b*, 13*b*, and 14*b* in parallel. At this point the pulses transmitted from the multiplexer 11 over the common conductor in the pulse time position 64*b* may be regarded as multiplexer pulses 84*b***.

In the illustrated embodiment, the finder-connector links of the system are arranged in a predetermined sequence and are allotted one at a time to successive calling lines of the system by means of the self-allotting circuits 206 contained in each of the finders **12*a*, 13*a*, and 14*a*. Initially, only the link 12 is conditioned by means of the self-allotting circuit 206 in the finder 12*a* to handle a call placed on a calling line of the system. However, when the link 12 is taken into use, the self-allotting circuit 206 in the finder 12*a* diverts a supervisory carrier signal to the finder 13*a* of the link 13 to condition this link to handle the next succeeding call. Accordingly, only the link 12 is conditioned to handle the first call and the connector 12*b* of this link is as yet inoperative so that only the finder 12*a* initially responds to the multiplexer pulses 84*b* delivered thereto from the multiplexer 11 over the conductor 50 in the described pulse time position 64*b***.

In the finder **12*a* the multiplexer pulses 84*b* are repeated by the pulse input circuit 200 to effect substantially immediate operation of the +B switching circuit 201 embodied in this finder, whereby operating anode potentials are delivered to the tubes of the circuits 209, 211, 212, 215, 216, 218, 219, 264, 265 and 285 of the connector 12*b* over the +B switch conductor 12*c* with the result that the connector 12*b* is conditioned for operation, i. e., condition to respond to signal carrying multiplexer pulses delivered thereto from the multiplexer 11 over the conductor 50. Operation of the +B switching circuit in the finder 12*a* also has the effect of conditioning the tens and units coincidence tube circuits 203 and 204 of this finder for operation under the joint control of the multiplexer pulses 84*b* repeated by the input circuit 200, the positive tens pulses developed by the tens pulse ring circuit 21 and the positive units pulses developed by the units pulse ring circuit 20**.

In responding to the tens and units pulses impressed thereon coincidentally with the multiplexer pulses **84*b*, the tens and units coincidence tube circuits 203 and 204 of the finder 12*a* cooperate with the finder pulse forming circuit 205 and the combining circuit 202 of this finder to produce finder gate pulses which are transmitted over the conductor 12*d* to the circuits 207, 208, and 226 of the connector 12*b* and have the effect of initially limiting the response of the connector only to multiplexer pulses 84*b* appearing in the pulse time position 64*b*. The combining circuit 202 of the finder 12*a* also gates busy pulses in the pulse time position 64*b* which are fed over the common busy pulse out conductor 52*a* to the link coupling circuits 24 wherein the busy pulses are amplified and supplied over the common busy pulse in conductor 52*b* to all of the finders and connectors of the system to prevent these finders from responding to multiplexer pulses occurring in this time position. Thus, the line 23 is guarded against intrusion on an incoming call. In addition, the pulses gated by the circuit 202 to the conductor 12*d* are impressed upon the pulse input circuit 200, thereby to render the finder 12*a* responsive only to multiplexer pulses 84*b* appearing in the pulse time position 64*b***.

Operation of the +B switching circuit in the finder **12*a* has the further effect of causing the self-allotting circuit 206 of the finder 12*a* to divert the supervisory carrier control signal, normally supplied thereto over the conductor 36*a*, to the self-allotting circuit in the finder 13*a* of the next succeeding link 13 over the conductor 36*b* to condition the link 13 to handle the next incoming call. In an entirely similar manner, operation of the +B switching circuit in the finder 13*a* of the link 13 when this link is operatively associated with the next calling line has the effect of diverting the supervisory carrier control signal to the finder of the next succeeding finder-connector link 14 so that as one link is taken into use the seized link automatically allots the next succeeding link in the sequence to handle the next incoming call. After the finder 12*a* has operated to perform the described functions, continued holding of the finder 12*a* is dependent upon continued acceptance and transmission of multiplexer pulses 84*b* by the pulse input circuit 200, which of course means that the finder will remain associated with the calling line 23 only so long as a calling condition persists on this line. Holding of the finder 12*a* is also dependent upon the conversation timing control circuit 285 in the connector 12*b*** as will be described in more detail hereinafter.

As indicated above, when the +B switching circuit 201 of the finder **12*a* operates to apply operating anode potential to the conductor 12*c*, the circuits 210, 211, 212, 215, 216, 218, 219, 264, 265 and 285 of the connector 12*b* are conditioned for operation. The tens digit register 211 in turn supplies a bias potential to the dial tone gate tube of the network 225 and this network then functions to transmit a dial tone signal, derived from the dial tone generator 29*b* over the conductor 47, to the calling line out gate circuit 226 over the conductor 244. This circuit in responding to the dial tone signal and also to the finder gate pulses delivered thereto over the conductor 12*d* and the commutator drive pulses 96*a* delivered thereto over the conductor 35, functions to repeat over the channel conductor 51 to the distributor 15** connector signal pulses modulated in accordance with the dial tone signal in the pulse time position *64b* assigned to the calling line. The distributor 15 responds to the connector signal pulses thus transmitted thereto by repeating the same through the gate circuit thereof associated with the line circuit 10, reconstructing the dial tone and transmitting the reconstructed dial tone over the conductor 44 to the line circuit 10. In the line circuit 10, the dial tone signal is transmitted over the line 23 to signal the calling subscriber that the dialing operation may be initiated.

Two digits of dial impulses must be dialed in the connector 12b in order to effect selection in the connector of the pulse time position *63c* assigned to the called line 32 and a third successive digit, called a party line digit, must be dialed into the connector 12b in order to effect selection on a decimal basis of the particular party line ringing signal assigned to the called substation B' having the directory number designation "322." More specifically, the directory number digits "3," "2" and "2" must be dialed successively into the connector 12b to effect selection of the pulse time position *63c* and the code #2 party line ringing signal assigned to the called substation B'. During the open circuit period of each dial impulse, the control bias supplied by the line circuit 10 to the gate circuit of the multiplexer 11 which corresponds to the calling line 23 is returned to its on hook value to interrupt the transmission of multiplexer pulses *84b* over the conductor 50 to the pulse input circuit 200 of the finder 12a and to the in gate circuits 223 and 207 of the connector 12b.

During the make period of each impulse dialed at the calling substation A, multiplexer signal pulse transmission from the multiplexer 11 to the finder 12a and the connector 12b in the pulse time position *64b* is resumed. As controlled by the finder gating pulses delivered to the circuits 207 and 208 from the circuit 202 over the conductor 12d, the circuits 207 and 208 function to repeat any intelligence or control signals derived from the calling line 23 to the dial impulse integrator circuit 209. This circuit differentiates between intelligence modulated multiplexer pulses and dial impulse modulated multiplexer pulses in such manner that only the latter appear at the output terminals of this circuit. More specifically, during each dial impulse generated at the calling substation A, the impulse integrator circuit 209 develops coincident impulses which are impressed upon the tens, units and party inverter circuits 260, 261 and 262 over the conductor 227.

Pending operation of the tens sequence timing circuit 212, the units inverter circuit 261, which also performs the function of a units digit start gate, and the party inverter circuit 262, which also performs the function of a party digit start gate, are held non-responsive to the three impulses transmitted thereto by the dial impulse integrator circuit 209 during dialing of the first digit "3" at the calling substation. However, the tens register pulser 210 responds to these three impulses repeated thereto by the tens inverter circuit 260 over the conductor 231 by developing three coincident register drive pulses of uniform amplitude and duration which are supplied to the tens digit register circuit 211 and the tens sequence timing circuit 212 over the conductor 230. In responding to the three register drive pulses thus transmitted thereto, the tens digit register 211 is driven to a setting wherein tens pulses appearing on the positive tens pulse conductor 32c in the third tens pulse time position *74a* of each pulse frame may be transmitted through the third tens gate of this register and over the conductor 232 to the connector pulse forming circuit 217. Transmission of the three register drive pulses individually corresponding to the three break periods of the first digit dialed at the calling substation over the conductor 230 to the tens sequence timing circuit 212 has the effect of conditioning this circuit to block the tens register pulser 210 from developing register drive pulses during dialing of the second and third digits and to render the units inverter circuit 261 operative to repeat the pulses delivered thereto by the dial impulse integrator circuit 209 during dialing of the second digit at the calling substation. Immediately the first register drive pulse is repeated to the tens digit register 211 to drive this register off normal, a control potential is developed on the conductor 233 which biases the dial tone gate tube of the network 225 beyond cutoff, such that dial tone transmission through this gate tube to the calling line out gate circuit 226 over the conductor 244 is terminated. Thus, transmission of the dial tone signal to the calling substation A is arrested.

During the interdigit pause which separates dialing of the first and second digits at the calling substation, the tens sequence timing circuit 212 assumes a stable operating condition wherein a controlling potential is impressed upon the conductor 234 to bias the tens register pulser 210 against developing further register drive pulses in response to impulses transmitted thereto through the tens inverter circuit 260 from the dial impulse integrator circuit 209. The above-described control potential is also supplied over the conductor 234 to the units inverter circuit 261 to render this circuit operative to repeat impulses delivered thereto from the dial impulse integrator circuit 209 to the units register pulser 214 and the units sequence timing circuit 216 over the conductor 238.

During dialing of the second digit "2" at the calling substation A, the dial impulse integrator circuit 209 responds by transmitting two impulses to each of the inverter circuits 260, 261 and 262. As noted above, however, the party inverter circuit 262 is still held non-responsive to these impulses and the tens register pulser 210 is now blocked against responding to these impulses. Thus, only the units inverter circuit 261 repeats the two impulses to the units register pulser 214 over the conductor 238 and the latter circuit responds to these impulses by developing corresponding register drive pulses of uniform amplitude and duration which are supplied to the units digit register 215 and the units sequence timing circuit 216 over the conductor 236. As a consequence, the units digit register 215 is operated or driven to open the second units gate circuit therein, thereby to establish a path for the transmission of units pulses appearing in the time positions *63a*, *63b*, *63c*, etc., to the connector pulse forming circuit 217 over the conductor 245. The two pulses repeated to the units sequence timing circuit 216 over the conductor 236 serve to condition this circuit for operation at the end of the second digit.

During the interdigit pause which separates dialing of the second and third digits at the calling substation, the units sequence timing circuit 216 assumes a stable operating condition wherein a controlling potential is impressed upon the conductor 235 to bias the units register pulser 214 against development of register drive pulses in response to further impulses repeated thereto through the units inverter circuit 261 from the dial impulse integrator circuit 209. This controlling potential is also supplied over the conductor 235 to the party inverter circuit 262 to render this circuit operative to repeat impulses delivered thereto from the dial impulse integrator circuit 209 during a third digit to the party register pulser 263 and the party sequence timing circuit 264 over the conductor 237. The potential impressed upon the conductor 235 is also supplied to the tens register advancer 280, the trunk hunting control circuit 283, the busy test circuit 218 and the busy lock circuit 219 to render these circuits operative to perform their respective functions as described below.

The connector pulse forming circuit 217 operates to mix the tens and units pulses respectively transmitted thereto from the registers 211 and 215 over the conductors 232 and 245 to produce a resultant connector pulse which appears on the conductors 239, 239b and 239c.

More specifically, the tens pulses 74a appearing on the positive tens pulse conductor 32c and gated by the tens digit register 211 are transmitted to the connector pulse forming circuit 217 over the conductor 232 where they are mixed with the positive units pulses appearing in the time position 63c which are gated by the units register 215 and transmitted to the circuit 217 over the conductor 245. Mixing of these pulses in the circuit 217 results in the production of a connector pulse which occurs during each pulse frame in the pulse time position 63c assigned to the called line. These pulses are transmitted over the conductor 239 to the connector components 222, 223, 224 and 283, and over the conductor 239b to the connector component 220. The connector pulse forming circuit 217 also operates to select one of the commutator drive pulses 96a which occurs in the time position 63c assigned to the called line and the selected narrow commutator drive pulses are transmitted to the busy test circuit 218 over the conductor 239a.

Effectively, the busy test circuit 218 and the busy lock circuit 219 cooperate to perform the busy test operation in the connector 12b. More specifically, if the called line is busy, i. e., occupied with a call, busy pulses are present on the common busy pulse in conductor 52b in the pulse time position 63c assigned to the called line. The manner in which such busy pulses are repeated to the conductor 52b from another link occupied with the call involving the called line 32 will be apparent from the foregoing explanation. These busy pulses are impressed upon the busy test circuit 218 simultaneously with commutator drive pulses 96a appearing in the time position 63c assigned to the called line, which, as stated above, are developed by the connector pulse forming circuit 217 and impressed upon the busy test circuit 218 over the conductor 239a. Coincidence between the selected commutator drive pulses and the busy pulses has the effect of preventing the busy test circuit from operating. Thus, the busy condition of the called line is indicated.

In the event the called line is busy, the busy lock circuit 219 as controlled over the conductor 235 from the units sequence timing circuit 216 measures a predetermined time interval, i. e., a busy test interval, following which it operates to feed a bias potential back over the conductor 248 which has the effect of positively blocking the busy test circuit 218 against subsequent operation. In operating, the busy lock circuit 219 also controls the busy tone gate of the network 225 over the conductor 250 to permit the usual busy tone signal to be repeated from the busy tone generator 29a by way of the conductor 46, the busy gate circuit in the network 225, the conductor 244, the calling line out gate circuit 226, the channel conductor 51, the distributor 15 and the line circuit 10 to the calling line 23. Thus, the calling subscriber is advised of the busy condition of the called line.

Assuming that the called line 32 is idle at the time the pulse time position 63c assigned thereto is selected in the connector in the manner explained above, such busy pulses as may be present on the common busy pulse in conductor 52b do not occur coincidentally with the selected commutator drive pulses generated by the connector pulse forming circuit 217 in the pulse time position 63c assigned to the called line. When coincidence between the selected commutator drive pulses and the busy pulses is lacking, the busy test circuit operates immediately the first commutator drive pulse appearing in the time position 63c is impressed thereon from the connector pulse forming circuit 217 over the conductor 239a. In operating, the circuit 218 impresses a positive potential upon the cut-through conductor 251a which is applied to the busy lock circuit 219 to prevent the latter circuit from operating at the end of the busy test interval. The positive potential applied to the cut-through conductor 251a in the busy test circuit 218 when this circuit operates is also applied to the units register advancer 281 over the conductor 289 to prevent this unit from responding to trunk hunting drive pulses as will be described in more detail hereinafter. When the busy test circuit 218 operates, it also impresses a positive potential upon another cut-through conductor 251 which is applied to the called line out gate circuit 224 to condition the latter circuit to repeat connector signal pulses in the time position 63c to the distributor 15, and is also applied to the busy gate circuit 220 so that connector pulses are released to the common busy pulse out conductor 52a. The positive potential developed on the cut-through conductor 251 is also applied to the called line in gate circuit 223 and the called line reconstructor circuit 222 thereby to condition these circuits to accept signals derived from the calling line. This feature of making operation of the circuits 223 and 222 dependent upon operation of the busy test circuit to indicate that the called line is idle, is necessary in order to prevent the calling subscriber from listening in on a conversation being held on the called line when the called line is busy.

In the event the called line 32 tests busy and the called line is a member of one of the private branch exchange trunk groups discussed generally heretofore, the trunk hunting facilities in the connector 12b operate to hunt for an idle trunk within the remaining lines in the called trunk group. Effectively, the trunk hunting control circuit 283, the tens register advancer 280, and the units register advancer 281 cooperate to perform the trunk hunting operation in the connector 12b. More specifically, if the called line 32 is busy, i. e., occupied with a call, busy pulses are present on the common busy pulse in conductor 52b in the time position 63c assigned to the called line, and these busy pulses are impressed upon the trunk hunting control circuit together with connector pulses which also appear in the time position 63c assigned to the called line, the connector pulses being impressed upon the trunk hunting control circuit 283 over the conductor 239. Simultaneously with the transmission of busy pulses and connector pulses to the trunk hunting control circuit 283, the trunk marking pulses produced in the manner described generally above in connection with Fig. 33 are also impressed upon the trunk hunting control circuit 283 over the conductor 56a. Coincidence of the connector pulses, the busy pulses, and the trunk marking pulses indicates that the called line is busy and is a member of a trunk group. The trunk hunting control circuit 283 responds to the coincidence between the connector pulses, the busy pulses, and the trunk marking pulses by developing a control potential which is transmitted over the conductor 288 to the units register advancer 281 to enable the advancer 281 to respond to trunk hunting drive pulses which are developed by the trunk hunting drive pulse generator 55 in the common equipment 17 and are transmitted to the units register advancer 281 over the conductor 55a. The units register advancer 281, once it is enabled, produces register drive pulses of uniform amplitude and duration in response to each trunk hunting drive pulse transmitted thereto over the conductor 55a, and each register drive pulse is transmitted to the units digit register 215 over the conductor 290. Each register drive pulse produced by the units register advancer 281 operates to advance the setting of the units digit register 215 by one time position so that the time position of the connector pulses produced on the conductor 239 by the connector pulse forming circuit 217 is advanced one units time position for each trunk hunting drive pulse impressed upon the enabled units register advancer 281. Each time the time position of the connector pulses is advanced by the units register advancer in the manner described above, the busy test circuit 218 compares the new time position of the connector pulses with the busy pulses which are impressed upon the busy test circuit 218 over the conductor 52b. If the new position of the connector pulses coincides again with busy pulses impressed upon the conductor 52b, thereby indicating that the next line in a called trunk group is busy, the busy test circuit is prevented from operating and the units register advancer 281 continues to advance the setting of the units digit register under the control of the trunk hunting drive pulses until the connector pulses are shifted to a time position in which they do not coincide with busy pulses impressed on the common busy pulse in conductor 52 or until the time position assigned to the last line in a called trunk group is reached, in which case no trunk marking pulse is present. Under these conditions, coincidence between the connector pulses, the busy pulses, and the trunk marking pulses ceases so that the trunk hunting control circuit 283 removes the control potential from the conductor 288 thus preventing the units register advancer from responding to further trunk hunting drive pulses and terminating further increase in the setting of the units digit register 215. In the event the last line in the called trunk group is busy, the busy lock circuit 219 functions in the manner described above at the end of the busy test interval to feed a bias potential back over the conductor 248 which has the effect of positively blocking the busy test circuit 218 from subsequent operation. However, the busy test interval is of sufficient duration to permit the trunk hunting facilities to advance the time position of the connector pulses in the manner described above through substantially the entire pulse time position frame, if necessary, before the busy lock circuit 219 operates to lock up the connector and advise the calling subscriber of the busy condition of all of the lines of the called trunk group.

In order to provide for trunk hunting through a group of consecutive time positions which are positioned in different tens digit levels, facilities are provided in the units digit register 215 for recycling this register each time the register is driven beyond a setting of 10. Simultaneously therewith there is produced a control pulse in the units digit register 215 which is transmitted over the conductor 286 to the tens register advancer 280. The tens register advancer 280 responds to the pulses impressed thereon over the conductor 286 by advancing the setting of the tens digit register 211 by one tens pulse interval each time the units digit register 215 is recycled.

In order to provide for trunk hunting through a group of lines such as the eighth trunk group illustrated in Fig. 16, i. e., wherein some of the lines occur in the last tens digit level and other succeeding lines occur in the first tens digit level, the tens digit register 211 is also provided with facilities for recycling this register after it has been advanced to a setting of 10.

Considering, for example, the operation of the trunk hunting facilities during the above-described call to the line 32, this line is a member of the trunk group including the lines 32–39, inclusive, 30, 41, and 42. The lines 32–39 and 30 are included in the third tens digit level, whereas the lines 41 and 42 are included in the fourth tens digit level. When the two digits "3" and "2" are successively dialed into the connector 12*b*, connector pulses are produced in the time position 63*c* assigned to the line 32 in the manner described above. Trunk marking pulses are produced by the trunk marking pulse generator 56 in this same time position and if busy pulses are also impressed upon the common busy pulse in conductor 52*b* in the time position 63*c*, the coincidence of the connector pulses, busy pulses, and trunk marking pulses causes the units register advancer to advance the setting of the units digit register 215 by one time position so that the connector pulses are shifted to the time position 64*c*, i. e., the time position assigned to the line 33. Since the line 33 is also marked by trunk marking pulses appearing in the time position 64*c*, the above-described coincidence may still occur if busy pulses are impressed on the conductor 52 in the time position 64*c*, thus indicating that the line 33 is also busy. Continued coincidence of the connector pulses, busy pulses, and trunk marking pulses permits the units register advancer to respond to successive trunk hunting drive pulses so that the connector pulses are advanced to the time position 71*c*, i. e., the time position assigned to the line 30. If the line 30 is also busy the coincidence between the trunk marking pulses, connector pulses, and busy pulses continues and the units register advancer continues to respond to trunk hunting drive pulses. The next trunk hunting drive pulse operates to recycle the units digit register 215 and simultaneously therewith the tens digit register 211 is advanced one setting to the tens pulse time position 75*a* so that the connector pulses are shifted from the thirtieth time position in each pulse frame to the thirty-first time position, i. e., the time position 62*d* assigned to the line 41. If the line 41 also tests busy, the connector pulses are again shifted to the time position 64*d*, i. e., the time position assigned to the line 42. However, since the line 42 is not marked by a trunk marking pulse, the units register advancer is prevented from responding to further trunk hunting drive pulses and the connector pulses remain in the time position assigned to the line 42 regardless of the idle or busy condition of this line. If the line 42 is idle, the busy test circuit 218 functions in the manner described above to impress a positive potential upon the cut-through conductors 251, 251*a* and 289 whereupon the connector continues with the placement of the call. On the other hand, if the line 42 also tests busy, the busy test circuit is prevented from operating and the busy lock circuit 219 operates at the end of the busy test interval to block the busy test circuit 218 against subsequent operation and advise the calling subscriber of the busy condition of all of the lines of the called trunk group.

Assuming that the line 32 is idle when called, when the called line out gate 224 is conditioned for operation through application of the described positive potential to the cut-through conductor 251, it responds to the connector pulses impressed upon the connector pulse conductor 239 by the connector pulse forming circuit 217 by gating certain commutator drive pulses derived from the commutator drive circuit 25 over the conductor 35. More specifically, the commutator drive pulses transmitted over the conductor 35 by the commutator drive circuit 25 are gated by the connector pulses produced on the conductor 239 in the pulse time position 63*c* assigned to the called line 32, whereby very narrow connector signal pulses are released over the conductor 51 to the distributor 15 which are well within the limits of the pulse time position 63*c* assigned to the called line. However, it will be understood that until ringing of the called line is effected, the above described connector signal pulses supplied to the distributor 15 in the pulse time position 63*c* are ineffective to establish talking communication with any of the substations associated with the called line. The positive potential applied to the cut-through conductor 251 is also impressed upon the ring trip circuit 221 to enable this circuit to terminate ringing at the proper time and is applied to the code start circuit 268.

The above described busy test and trunk hunting operations are initiated during the interdigit pause which separates the second and third digits and are performed independently of the selection of a party line ringing signal. During dialing of the third digit "2" at the calling substation A, the dial impulse integrator circuit 209 responds by transmitting two impulses to each of the inverter circuits 260, 261 and 262. As noted above, however, the tens and units register pulsers 210 and 214 are now prevented from responding to these impulses. Thus, only the party inverter circuit 262 repeats the two impulses to the party register pulser 263 over the conductor 237 and the latter circuit responds to these impulses by developing corresponding register drive pulses which are supplied over the conductor 240 to the party digit register 265 and the party sequence timing circuit 264. As a consequence, the party digit register is operated or driven to open the second party gate circuit therein, thereby to establish a path for the transmission of the interrupted ringback tone signal (Fig. 15 (14)) which corresponds to the code #2 party line ringing signal assigned to the called substation B, over the conductor 275 to the ringback tone gate tube to the network 225.

At the end of the third digit dialed into the connector **12*b* the party sequence timing circuit 264 operates to change the potential level on the conductor 242 to a value such that the party register pulser 263 is prevented from responding to further impulses. Concurrently, the change in potential level on the conductor 242 has the effect of rendering the code start circuit 268 operative to develop a control potential in response to the next occurring code start pulse transmitted thereto from the harmonic ringing code forming circuit 99 over the conductor 5, which control potential is impressed upon the ringback tone gate tube of the network 225 by way of the conductor 241. When this control potential is impressed upon the ringback tone gate circuit of the network 225 this circuit is rendered operative to gate the interrupted ringback tone signal corresponding to the code #2 party line ringing signal selected by the party digit register 265 to the calling line out gate circuit 226 over the conductor 244. The interrupted ringback tone signal is modulated on the signal pulses developed by the calling line out gate circuit 226 and thus is transmitted by way of the conductor 51 to the distributor 15 wherein the interrupted ringback tone is reconstructed and supplied to the line circuit 10. In the line circuit 10, the ringback tone signal, which it will be recalled consists of the two short ringing pulses 170 and 171 (Fig. 15 (2)), is transmitted over the calling line 23 to the calling substation A. Thus, the calling subscriber is informed that the called substations A′ and B′, associated with the called line 32 are being rung during the ringing intervals of the code #2 party line ringing signal assigned to the called substation B′. This feature of making operation of the ringback tone gate circuit dependent upon operation of the code start circuit 268** to develop a control potential is necessary in order to prevent the ringback tone gate circuit from opening in the middle of any one ringing period and gating only a portion of a given ringing signal which would result in an erroneous party line ring.

The ringback tone signal which is interrupted or keyed in accordance with the ringing intervals of the code #2 ringing signal assigned to the called substation B′, and which is gated by the ringback tone gate circuit in the manner described above, is concurrently used to control the ringing operation at the line circuit 16 and the transmission of ringing current over the called line 32. Thus, the interrupted ringback tone signal gated by the ringback tone gate circuit is rectified to reproduce the code #2 party line ringing signal originally developed in the harmonic ringing code forming circuit 99 and consisting of two short ringing pulses. These ringing pulses are superimposed on a suitable bias potential and are transmitted over the conductor 301 to the ringing carrier modulator circuit 300. A continuous wave ringing carrier developed by the generator **29*f*, which is preferably non-synchronous with respect to the other generators of the system and has a frequency of 4900 cycles, for reasons to be described in more detail hereinafter, is also supplied to the ringing carrier modulator circuit 300 over the common conductor 47*a*. In the circuit 300 the ringing carrier wave is modulated by these ringing pulses and the modulated ringing carrier wave is transmitted over the conductor 295 to the called line out gate circuit 224. Effectively, the interrupted ringback tone signal gated by the ringback tone gate circuit in the network 225** is converted into an interrupted ringing carrier wave, the interrupted portions of which correspond to the off intervals of the selected code #2 party line ringing signal.

In the circuit 224 the modulated ringing carrier wave is itself modulated on the connector signal pulses released by the circuit 224 in the time position assigned to the called line 32 and these modulated ringing carrier modulated connector signal pulses are transmitted over the common conductor 51 to the distributor 15. In the distributor 15 the modulated ringing carrier wave is reconstructed or detected from the samples thereof carried by the connector signal pulse and the detected modulated carrier wave is diverted by the distributor 15 to the line circuit 16. In the line circuit 16, certain modulation components of the modulated carrier wave are selected by means of a frequency selective network and these selected modulation components are detected a second time to derive the original ringing pulse signal (Fig. 15 (2)) assigned to the called substation B′. The line ringing circuit in the line circuit 16 responds to these derived ringing pulses by transmitting ringing current over the called line 32 during the on intervals of the ringing signal. Since the ringing pulses 170 and 171 (Fig. 15 (2)) occur during the first ringing period when a 66⅔ C. P. S. ringing current is impressed upon the common ringing cable 61, the frequency of the ringing current transmitted to the called line 32 during these two short ringing intervals is 66⅔ C. P. S. As discussed generally above, the substations A′ and B′ associated with the called line 32 are both provided with ringing facilities which respond to 66⅔ C. P. S. ringing current so that both ringers at these substations are rung for two short pulses during the first ringing period of each harmonic ringing cycle.

Ringing of both the party line substations A′ and B′ persists until the call is answered at the called party line substation B′ or until the call is abandoned at the calling substation A.

Assuming that the call is answered at the substation B′, the line circuit 16 functions to change the magnitude of the control potential supplied over the conductor **45*b* to the multiplexer 11 with the result that the gate circuit assigned to the line circuit 16 in the multiplexer 11 is opened to permit multiplexer pulses 83*c* occurring in the pulse time position 63*c* of each pulse frame to be transmitted through the multiplexer 11 and over the conductor 50** to the multiplexer input terminals of each of the finders and connectors of the system.

The multiplexer pulses **83*c* are impressed upon the calling and called line in gate circuits 207 and 223 in the connector 12*b*. In the calling line in gate circuit 207, the repeated multiplexer pulses 83*c* are not in coincidence with the finder gate pulses impressed upon the circuit 207 over the conductor 12*d* and hence are not repeated to the reconstructor circuit 208. However, in the called line in gate circuit 223 the multiplexer pulses 83*c* occur in time coincidence with the connector pulses impressed upon the circuit 223 over the connector pulse conductor 239 from the connector pulse forming circuit 217. As a consequence, the call answering signal carried thereby is gated to the reconstructor circuit 222 where it is detected to produce a potential on the conductor 252 which has the effect of tripping the ring trip circuit 221**.

In operating, the ring trip circuit 221 functions to develop a positive potential on the ring trip conductor 253 which has the effect of closing the ringback tone gate circuit in the network 225 with the result that transmission of the interrupted or coded ringback tone signal to the calling substation is arrested. The ringing carrier modulator circuit 300 also responds to closure of the ringback tone gate circuit by ceasing transmission of a ringing carrier wave to the called line out gate circuit 224. The ringing control facilities of the line circuit 16 respond to this cessation of the ringing carrier wave by terminating the transmission of ringing current to the called substation. Thus, the ringing operation is arrested.

The positive potential produced on the ring trip conductor 253 also has the effect of conditioning the conversation timing control circuit 285 for operation at the end of a predetermined conversation timing period. The positive potential on the conductor 253 also has the further effect of supplying anode potential to the conversation timing warning tone gate tube in the conversation timing warning tone circuit 284. This potential also is supplied over the conductor 253 to the party digit register 265 to reset this register to zero, and is further applied to the party register advancer 282 over the conductor 253 to condition this circuit to respond to conversation timing pulses which are developed in the conversation timing pulse generator 57 and supplied over the common conductor 57*a* to the party register advancers 282 in each of the connector 12*b*, 13*b*, and 14*b*.

Following the described operations in the connector 12*b*, a two-way talking or communication circuit is fully established between the calling substation A and the party line called substation B′. Thus, voice or other signals developed at the substation A and transmitted over the line 23 to the line circuit 10 serve to vary directly the bias voltage impressed upon the gate circuit of the multiplexer 11 over the conductor 53*a* in accordance with the instantaneous amplitude of such signals. As a consequence, the multiplexer pulses 84*b* released by the multiplexer 11 over the conductor 50 to the finders and connectors of the system in the pulse time position 64*b* are modulated in accordance with the voice or other signals developed at the calling substation A. These signal modulated multiplexer pulses cannot be accepted by any finder of the system other than the finder 12*a* or any connector of the system other than the connector 12*b* because of the busy pulses fed to the busy pulse out conductor 52*a* from the circuit 202. In the finder 12*a*, the multiplexer pulses 84*b* maintain the +B switching circuit 201 operated to hold the link 12 associated with the line circuit 10. The signal modulated multiplexer pulses 84*b* are also transmitted through the calling line in gate circuit 207 and over the conductor 255 to the calling line reconstructor circuit 208 where they occur in time coincidence with the finder gating pulses impressed upon the reconstructor circuit over the conductor 12*d* in the pulse time position 64*b*. As a consequence, the voice signal components thereof are detected or reconstructed and stored in the reconstructor circuit 208. This stored signal information is impressed upon the called line out gate circuit 224 over the conductor 256. In the called line out gate circuit, the signals derived from the calling line reconstructor circuit 208 are modulated upon the connector signal pulses developed by the out gate circuit 224 in the pulse time position 63*c* assigned to the called line. These modulated signal pulses are transmitted to the distributor 15 over the conductor 51 wherein the signal components of the connector signal pulses are detected and released by the distributor 15 to the line circuit 16. In the line circuit 16, the detected signals are transmitted over the line 32 to the called substation B′ where they are audibly reproduced by the receiver of the telephone instrument provided at this substation.

Voice signals developed at the called party line substation B′ and transmitted over the line 32 to the line circuit 16 cause the bias potential delivered over the conductor 45*a* to the gate circuit of the multiplexer 11 which corresponds to the line circuit 16 to vary in exact accordance therewith. As a consequence, the voice signals are modulated upon the multiplexer pulses 83*c* occurring within the pulse time position 63*c* and released through the gate circuit of the multiplexer and over the conductor 50 to the finders and connectors of the system. These signal modulated multiplexer pulses cannot be accepted by any finder of the system for the reason that the finder 12*a* is synchronized to accept only multiplexer pulses 84*b* occurring in the time position 64*b* and the busy pulses fed to the busy pulse out conductor 52*b* in the time position 63*c* assigned to the called line by the busy gate circuit 220 of the connector 12*b* prevent the other finders from accepting or responding to the described signal modulated multiplexer pulses 83*c*. In the connector 12*b*, the signal modulated multiplexer pulses 83*c* are impressed upon the calling and called line in gate circuits 207 and 223 and are repeated by the circuit 223 over the conductor 254 to the called line reconstructor circuit 222. Due to lack of coincidence between the signal bearing multiplexer pulses 83*c* and the finder gating pulses impressed upon the calling line in gate circuit 207 over the conductor 12*d*, the circuit 207 does not gate these pulses to the reconstructor circuit 208. By virtue of the coincidence between the signal bearing multiplexer pulses 83*c* and the connector pulses appearing coincidentally on the conductor 239, both of which are impressed upon the called line reconstructor circuit 222, this circuit detects or reconstructs and stores the voice signal components carried by the multiplexer pulses 83*c*. The signals thus detected by the reconstructor circuit 222 are impressed upon the calling line out gate circuit 226 over the conductor 257. In the out gate circuit 226, the voice signals modulate the pulses developed in this circuit through gating of the commutator drive pulses impressed on the circuit over the conductor 35 by the finder gating pulses impressed on the circuit over the conductor 12*d*. The voice signal modulated pulses developed in the calling line out gate circuit 226 are supplied to the distributor 15 over the conductor 51 wherein the signal components thereof are detected and released to the line circuit 10. In the line circuit 10, the detected signals are transmitted over the line 23 to the calling substation A where they are audibly reproduced by the receiver of the telephone instrument provided at this substation.

As will be apparent from the foregoing explanation, a fully complete two-way talking circuit is established between the calling and called substations. Moreover, this circuit effectively comprises two mutually non-interfering channels between the calling line 23 and the called line 32 such that voice signals simultaneously produced at both substantions will be transmitted without interference through the switching equipment of the system to the appropriate destination point or substation. However, it will be understood that each of the calling and called lines may have several party line substations associated therewith which are connected in parallel thereto so that the two-way talking circuits between the calling and called lines may be shared by a number, up to a maximum of ten, party line subscribers.

As stated generally heretofore, the party register advancer 282 is conditioned to respond to conversation timing pulses impressed upon the conductor 57*a* immediately after tripping of the ring trip circuit 221 when the called party answers. Concurrently with the conditioning of the party register advancer 282, the party digit register 265 is reset to zero since this register is no longer required for the gating of a ringback tone signal after the called party answers and a two-way talking circuit is established in the manners described above. The conversation timing pulses are produced at periodic intervals and the party register advancer responds to each conversation timing pulse by producing a register drive pulse which is supplied to the party digit register 265 over the conductor 291 to advance this register one step for each conversation timing pulse. The conversation timing pulses may occur, for example, at 40 second intervals so that the party digit register is advanced one stage for each 40 second interval of the call. When the ninth counting tube of the party digit register 265 is extinguished by the tenth register drive pulse produced by the party register advancer 282, a positive potential is developed on the conductor 292 which is transmitted to the conversation timing warning tone circuit 284.

The conversation timing warning tone circuit 284 is conditioned to respond to the above-described positive potential developed on the conductor 292 when the ninth counting tube 1029 in the party digit register 265 is extinguished, and transmits therethrough a short pulse of the warning tone signal impressed on the circuit 284 from the warning tone generator 58 over the conductor 58*a*. This short pulse of warning tone is transmitted over the conductor 244 to the calling line out gate circuit 226 wherein it is modulated upon pulses gated by this circuit in the time position 64*b* assigned to the line 23 and these warning tone pulse modulated pulses are transmitted over the conductor 51 to the distributor 15 wherein they are detected and supplied to the line circuit 10 to inform the calling subscriber at the substation A that the call will be terminated shortly. This short pulse of warning tone is also transmitted over the conductor 294 to the called line out gate circuit 224 wherein it is modulated on the connector signal pulses gated by the circuit 224 to the output conductor 51 and these modulated connector signal pulses are transmitted to the distributor 15 wherein they are detected and sent to the line circuit 16 so that the called subscriber at the called substation B′ is also informed that the call is about to be terminated.

When the tenth counting tube of the party digit register 265 is extinguished by the eleventh register drive pulse produced by the party register advancer 282, a positive control potential is developed on the conductor 293 which is transmitted to the conversation timing control circuit 285. The circuit 285 responds to the positive potential produced on the conductor 293 by producing a positive pulse on the conductor 12*e* and the potential on the conductor 12*e* is transmitted back to the finder 12*a* and is applied, for example, to the extinguishing tube in the +B switching circuit 201 of the finder 12*a*. As a result, the positive potential produced on the conductor 12*e* fires the extinguishing tube in the +B switching circuit 201 so that the +B switch tube in the circuit 201 is extinguished and operating anode potential is removed from the conductor 12*c* and the finder-connector link is no longer operatively associated with the calling and called lines.

The circuit 285 responds to the positive potential produced on the conductor 293 by producing a positive control pulse on the conductor 12*e*. In one embodiment of the conversation timing facilities the potential pulse on the conductor 12*e* is transmitted back to the finder 12*a* and is applied, for example, to the extinguishing tube in the +B switching circuit 201 of the finder 12*a*. As a result, the positive potential produced on the conductor 12*b* fires the extinguishing tube in the +B switching circuit 201 so that the +B switching tube in the circuit 201 is extinguished and operating anode potential is removed from the conductor 12*c* so that the finder connector link 12 is no longer operatively associated with the calling and called lines. Under these conditions, both the calling and called lines call in new linkage and dial tone is returned to both the calling and called lines subscribers so that they are informed that they should hang up.

In the alternative, the positive control pulse produced on the conductor 12*e* may be applied to the busy test circuit 218 internally of the connector 12*b* so that the connector is made busy and returns a busy tone signal to the calling line subscriber. In this embodiment the called line is no longer busied when the connector is made busy at the end of the conversation timing period so that the called line immediately calls in new linkage and receives dial tone to inform the called line subscriber that the call has been automatically terminated by the conversation timing facilities.

In describing the manner in which the system components 10, 11, 12*a*, 12*b*, 15, and 16 are partially or wholly released upon termination of the call by either party and independently of the above-described conversation timing facilities, it may be assumed first that the called party at the party line substation B′ is the first to hang up. In such case, the bias potential delivered from the line circuit 16 over the conductor 45*b* to the gating circuit of the multiplexer 11 individually assigned to the line circuit 16 is restored to its normal value when the called line loop circuit is opened, with the result that multiplexer pulses 83*c* appearing in the pulse time position 63*c* are no longer transmitted over the conductor 50 to the finders and connectors of the system. Such termination of multiplexer pulse transmission in the time position 63*c* to the finders and connectors of the system has no effect other than inactivation of the connector components 223 and 222 and the removal of modulation components from the connector signal pulses transmitted by way of circuit 226 and the distributor 15 to the line circuit 10. In other words, busy pulses in the time position 63*c* assigned to the called line continue to be fed to the busy pulse out conductor 52*b* from the busy gate circuit 220 of the connector 12*b*, thereby to prevent substations associated with the called line 32 from originating a call or accepting an incoming call. This, of course, means that if the subscriber at any one of the substations associated with the called line picks up his receiver or hand set before the connection is released at the calling substation A, a two-way talking circuit between the calling and called lines is reestablished.

When the calling line subscriber disconnects by replacing the receiver or hand set at the substation A on its supporting hook or cradle, the loop circuit extending by way of the line 23 to the line circuit 10 is opened, with the result that the bias potential applied over the conductor 53*b* to that gate circuit of the multiplexer 11 which individually corresponds to the line circuit 10 is restored to its normal value. As a consequence, this gate circuit is biased to terminate the transmission of multiplexer pulses 84*b* occurring in the pulse time position 64*b* over the conductor 50 to the various finders and connectors of the system. When the transmission of multiplexer pulses 84*b* to pulse input circuit 200 of the finder 12*a* is thus terminated, this circuit is rendered inactive to repeat pulses to the finder circuits, 201, 203, and 204. After a predetermined time interval, measured by the overall time constant of the +B switching circuit 201, this circuit responds to cessation of multiplexer pulse transmission thereto by removing the operating anode potential from the conductor 12*c*. As a consequence, the tens and units coincidence tube circuits 203 and 204 of the finder 12*a* are restored to normal to interrupt the production of finder gate and busy pulses in the pulse time position 64*b* by the finder pulse forming circuit 205. Thus, the application of pulses to the combining circuit 202 and hence to the busy pulse out conductor 52*a* in the pulse time position 64*b* assigned to the calling line 23 is arrested. Removal of the operating anode potential from the conductor 12*c* has the effect of rendering the self-allotting circuit 206 of the finder 12*a* operative to reassociate the link 12 with another calling line to handle another call. Cessation of busy pulse transmission to the busy pulse out conductor 52*a* in the pulse time position 64*b* has the effect of marking the calling line 23 as idle to permit initiation of a second call on this line or seizure of the line on a call incoming thereto.

Removal of operating anode potential from the conductor 12*c* also has the effect of restoring the component circuits 209, 211, 212, 215, 216, 218, 219, 264, 265, and 285 of the connector 12*b* to normal, thereby to condition the connector 12*b* to handle another call. Concurrently therewith, connector pulse production on the conductor 239 in the pulse time position 63*c* assigned to the called line 32 is terminated to arrest the application of busy pulses to the common busy pulse out conductor 52*a* by the busy gate circuit 220 in this pulse time position. Thus, the called line is unguarded to free the same for use in initiating another call or accepting a call incoming thereto. It will be noted that normalizing of the identified circuits of the connector 12*b* has the effect of restoring all components of this connector to the condition which prevailed at the time the link 12 was taken into use to handle the call just described. It will be noted that if the calling subscriber is the first to release the connection, i. e., hang up, the link 12 is immediately released under the control of the +B switching circuit 201 embodied in the finder 12*a*. However, in such case, the line circuit 16 associated with the called line 32 immediately assumes a setting indicating that the line 32 is calling, with the result that the link 12 is reassigned to the called line under the control of the self-allotting circuit 206 of the finder 12*a* and the usual dial tone signal is returned to the called subscriber. This signal has the effect of indicating to the called subscriber that the connection has been released at the calling substation and that he should hang up.

DETAILED DESCRIPTION OF THE SYSTEM

In considering the detailed circuitry of the system components briefly described above, operation of these components will be analyzed insofar as possible in terms of the functions which they perform in establishing the above-described connection between the substation A and the substation B′ in response to the call initiated at the substation A. Before considering the details of the system components, however, it is pointed out generally that corresponding reference characters have been used throughout the drawings to identify corresponding circuit elements of the system. It is also pointed out that all pulse carrying conductors, such, for example, as the signal pulse transmission conductors 50 and 51, are in the form of coaxial cables or transmission lines having low pulse attenuating properties at the pulse frequencies employed. In certain instances, the coaxial cables provided to connect two or more components of the system have been illustrated, but it should also be remembered that all of the other illustrated pulse carrying conductors are of the proper type. On the other hand, all illustrated conductors which function as direct current potential or audio signal carrying conductors are in the form of open or shielded wire.

Throughout the following detailed description of the system, the tube types employed are specifically identified. Moreover, those tubes of the system which are of the gas filled or thyratron type are so identified in the drawings through the use of a small dot within the tube envelope circle and opposite the tube cathode to indicate the gas content of the tube. It is also pointed out that unless necessary to an understanding of the operation of a particular system component, those circuit elements which perform entirely conventional functions in the circuits, namely, functions which will be readily understood by those skilled in the art, have not been identified in the drawings or referred to in the following description of the system components.

As used in this specification, the terms "electronic" and "electronic means" refer to and are intended to define means comprising electron conducting devices, such, for example, as electron tubes, gas tubes, crystal rectifiers, semi-conductors and the like, together with interconnecting circuit components therefor, and to exclude all electromechanical devices embodying moving mechanical parts such, for example, as relays, stepping switches, and the like.

Also, in order to reduce the complexity of this specification, those system components which are substantially identical to the corresponding system components of my co-pending application, Serial No. 301,215, filed July 28, 1952, and assigned to the same assignee as the present invention, will be only briefly described in this specification, reference being had to this co-pending application for a complete and detailed description of these system components. However, in order to facilitate an understanding of all of the system components in the supervisory signalling system of the present invention, these components will be discussed in such detail as necessary to bring out the functions of these units in the present invention.

*Common equipment 17*

The component circuits of the common equipment 17, with the exception of the ringing carrier generator 29*f*, may all be substantially identical to the corresponding component circuits described in detail in my co-pending application, Serial No. 301,215, identified above, and reference may be had to this co-pending application for a complete and detailed description of these circuit components.

*Ringing carrier generator 29f*

As will be recalled from the general description of the system, this generator is provided for the purpose of developing a ringing carrier wave which is transmitted to all of the connectors of the system for use in the ringing signal system of the present invention. In the connector, the ringing carrier wave is modulated with the selected ringing signal, which may be either a conventional private line ringing signal having a timing cycle of four seconds on and one second off, a coded party line ringing signal which is selected according to the code assigned to the called party line substation, or a harmonic ringing signal which is selected in accordance with the harmonic ringing facilities provided at the called party line substation. The modulated ringing carrier wave produced in the ringing carrier modulator circuit 300 is then used to modulate the connector signal pulses produced by the called line out gate circuit 224 in the time position assigned to the called line.

Since the connector signal pulses have a number of frequency components, which in the illustrated embodiment include a fundamental frequency component of 10 kilocycles as well as a number of higher frequency harmonic components, and the modulated ringing carrier wave also includes a number of different frequency components, it will be evident that the modulation of the connector signal pulses by the modulated ringing carrier wave produces a large number of intermodulation components which may interfere with speech transmission through the multiplexed signal transmission channels of the system unless facilities are provided to prevent such interference and cross talk. However, in accordance with the present invention, the frequency of the ringing carrier generator 29*f* and the relationship thereof to the connector signal pulses is so chosen that the modulation components produced by the above-described modulation of the connector signal pulses with the modulated ringing carrier wave do not interfere with either the transmission of speech signal through the system or the transmission of different types of ringing signal to the called line.

While the generator 29*f* may be operated in synchronism with the units and tens pulse ring circuits 20 and 21 in the common equipment 17, such an arrangement would require that the carrier wave be in the form of a square wave having very steep leading and trailing edges so that a usable modulation output would be derived for any one of the one hundred time positions in the basic time position frame of the system. This will be readily understood when it is realized that any one of the lines of the system may be called so that the connector signal pulses developed by the called line out gate circuit 224 may appear in any one of the time positions within the ten kilocycle time position frame. If the ringing carrier wave is in synchronism with the time position frame and this carrier wave is in the form of a sinusoidal wave, a situation may occur in which the time position assigned to the called line occurs at the cross-over point of the sinusoidal wave so that no modulation of the connector signal pulses in this time position is obtained. This situation is illustrated in Fig. 17 of the drawings wherein the modulation output obtained with different types of synchronous ringing carrier waveforms is shown. Thus, in Fig. 17(*a*) the duration of one pulse frame is indicated and connector signal pulses may appear at any position within each of these time position frames. For example, a line may be called which has assigned thereto one of the first time positions in each frame, in which case, the called line pulses or connector signal pulses 1700 will be produced. On the other hand, a line may be called which has assigned thereto a time position in the middle of the time position frame, in which case, the pulses 1701 may be produced. Finally, a line may be called which has assigned thereto one of the last time positions in each time position frame, in which case, the called line pulses 1702 would be produced. In Fig. 17(*b*) there is illustrated a ringing carrier wave 1703, which has a frequency of 5 kilocycles, is in synchronism with the time position frames of Fig. 17(*a*) and is sinusoidal in waveform. When the called line pulses 1700 are modulated by the ringing carrier wave 1703, the composite signal appears substantially as shown in Fig. 17(*c*) and it will be evident from a consideration of Fig. 17(*c*) that the ringing carrier wave 1703 is modulated on the called line pulses 1700 so that a usable modulation component appears in this composite signal. On the other hand, if the called line pulses 1701 are modulated with the ringing carrier wave 1703, the composite signal appears substantially as shown in Fig. 17(*d*) and it will be noted that the called line pulses 1701 are not modulated since the time positions of the called line pulses 1701 occur at the cross-over points 1704 of the ringing carrier wave 1703. Accordingly, no usable modulation component is produced for those lines which have assigned thereto time positions in the middle of the time position frame when a synchronous sinusoidal ringing carrier wave is employed. If a square wave 1705 (Fig. 17(*e*)) is employed as a ringing carrier wave and this square wave is synchronous with the time position frames, a usable modulation component may be derived from the composite signal if the leading edge 1706 and the trailing edge 1707 of the square wave 1705 are sufficiently steep that they occur within a small fraction of one time position. Thus, if the square wave 1705 is employed as a ringing carrier wave, the composite signal produced with the called line pulses 1701 is substantally as shown in Fig. 17(*f*) wherein it is evident that a usable modulation component is provided. Likewise, if the square wave 1705 is modulated on the called line pulses 1702 which occur at the end of each frame, the composite signal is substantially as shown in Fig. 17(*g*) wherein a usable modulation component is likewise provided.

Accordingly, if synchronous operation is employed, the ringing carrier wave should be in the form of a square wave, preferably having a frequency of 5 kilocycles, i. e., one-half the frequency of the time position frame so that a maximum amount of modulation is provided, and the leading and trailing edges of this square wave should be sufficiently steep that they occur within a small fraction of the duration of one time position so that connector signal pulses which are produced in any one of the time positions may be modulated by the square wave carrier wave. When such a steep sided square wave is employed to modulate the connector signal pulses, care must be taken in impressing this square wave upon the called line out gate circuit 224 and modulating the connector signal pulses produced therein since the high frequency components of this steep sided square wave may be attenuated so that the amplitude of the square wave at the corners thereof is substantially reduced and insufficient modulation in the time positions which occur during these corner portions is provided. Furthermore, when a steep sided square wave is provided for modulating the connector signal pulses, the reconstruction of signals from the modulated connector signal pulses and resampling of these signals in a new time position, such as is required for ringing through the system, in situations such as delayed toll ringing and the like, the band pass filters incorporated in the reconstructor and resampling means tend to remove the high frequency components of the square wave so that ringing through the system is unsatisfactory.

In order to provide a ringing carrier system wherein the above difficulties are avoided while providing a usable amount of modulation output, the ringing carrier generator **29*f* is preferably not operated synchronously with respect to the basic time position frame of the system, but instead is operated non-synchronously and at a frequency somewhat removed from one-half the frequency of the connector signal pulses, i. e., the recurrence rate of the time position frames, for reasons to be described in more detail hereinafter. With this arrangement, the output carrier wave of the generator 29*f* may comprise a sinusoidal wave which drifts through the time position frame at a rate equal to the offset frequency from one-half the frequency of the connector signal pulses, i. e., 5 kilocycles. Specifically, the output carrier wave of the generator 29*f*** preferably comprises a non-synchronous sinusoidal wave having a frequency in the order of 4900 cycles in the illustrated embodiment wherein the connector signal pulses are produced at a 10 kilocycle rate. With this arrangement, the sinusoidal ringing carrier wave may be transmitted through the reconstructor and resampling means of the connector, and any other switching apparatus such as a line group selector, for example, without serious distortion or attenuation. However, it will be understood that a square wave which is operated nonsynchronously with respect to the connector signal pulses at a frequency offset slightly from one-half the pulse repetition rate thereof, i. e., at a repetition rate of 4900 cycles, for example, may also be employed, although such a square wave is not readily passed through band pass filters and the like without distortion or attenuation. With a non-synchronous sinusoidal carrier the useable frequency components are only 3 db smaller than with synchronous operation.

Figure 10:
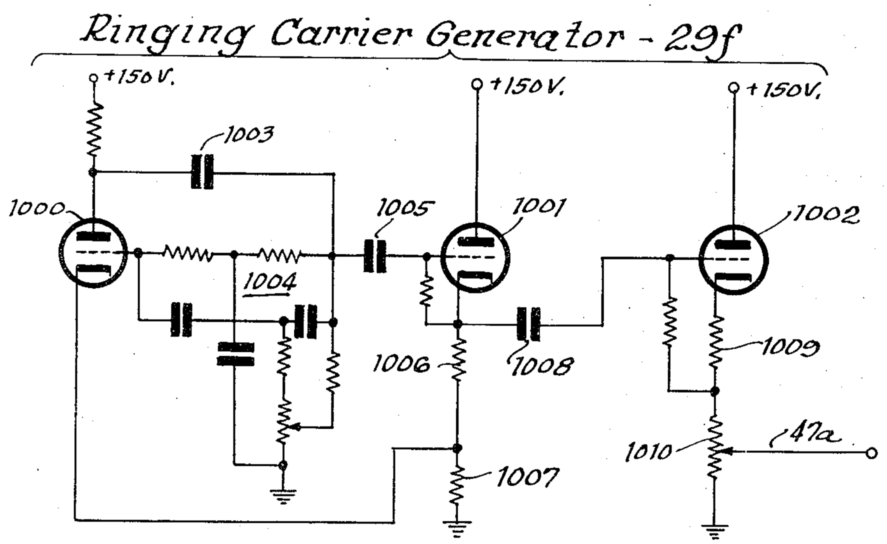
Fig. 10 is a schematic diagram of a portion of the common equipment used in the supervisory signalling system of the present invention.

Considering now the details of the ringing carrier generator **29*f* shown in Fig. 10 of the drawings, the generator therein illustrated is of the type adapted to produce a sinusoidal output wave for the reasons discussed in detail above. More specifically, the generator 29*f* includes an oscillator circuit comprising the tubes 1000 and 1001 and a cathode follower output tube 1002. Preferably, the tubes 1000, 1001, and 1002** are all of the commercial type 6C4.

The anode of the tube 1000 is degeneratively connected back to the control grid of this tube by means of the network which includes the condenser 1003 and a parallel T-network indicated generally at 1004. The network 1004 is of the conventional type which provides a null point at a particular frequency at which no signal transmission through the network 1004 is permitted at the null point. Signals produced at the anode of the tube 1000 are also coupled through the condenser 1003 and the condenser 1005 to the control grid of the tube 1001, which latter tube is operated as a cathode follower so that these signals are repeated across the cathode resistors 1006 and 1007 thereof. A portion of the output voltage produced across the resistors 1006 and 1007, determined by the relative values of these resistors, is regeneratively connected to the tube 1000 by connecting the cathode of this tube to the junction point of the resistors 1006 and 1007. At the particular null frequency of the network 1004, no degneration is provided so that the loop circuit from the output of the tube 1001 to the input of the tube 1000 is so phased that oscillations are set up in the circuit at the frequency of the null point of the network 1004. As stated above, the network 1004 preferably has a null point of 4900 cycles so that the oscillatory signal produced at the cathode of the tube 1001 comprises a 4900 cycle sinusoidal wave. This wave is coupled through the condenser 1008 to the control grid of the tube 1002 and repeated in like fashion across the cathode resistor 1009 and potentiometer 1010 of this tube. A variable portion of this valtage may be selected at the arm of the potentiometer 1010 and is transmitted over the conductor 47a to the ring carrier modulator circuit 300 in each of the connectors of the system.

*Substation B′*

The substations respectively terminating the various lines of the system, including party line substations as well as private line substations are substantially identical in arrangement. Accordingly, only the details of the party line substation B′ have been illustrated in Fig. 7 of the drawings, the other party line substations of the system being indentical thereto. The substation B′ is identical to the corresponding system component shown and described in detail in my co-pending application, Serial No. 301,215, identified above, and reference may be had to this co-pending application for a detailed description thereof. However, insofar as is required to explain the mode of operation of the line circuit 16 terminating the line 23, the operation of the substation B′ is explained below in the following detailed description of the line circuit 16.

*Line circuits 10 and 16*

Figure 7:
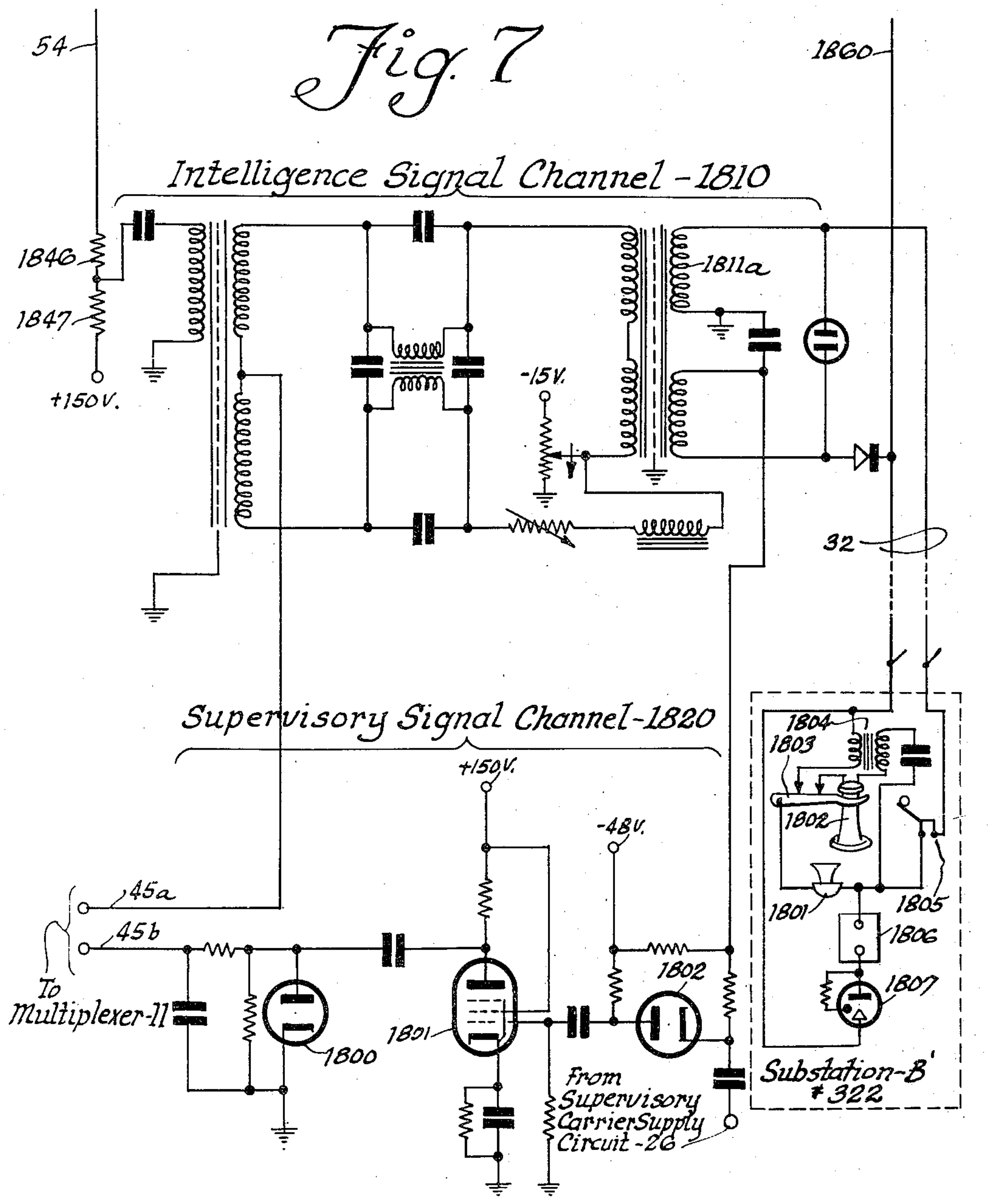
Figure 8:
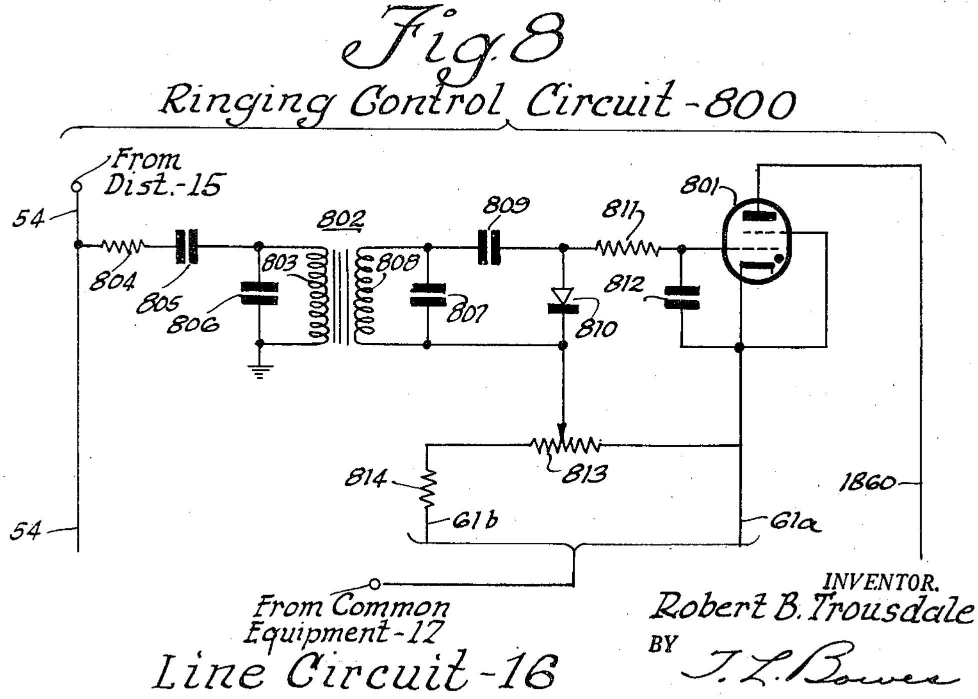

As previously indicated, the two identified line circuits are respectively utilized to terminate the private line 23 and the party line 32 at the exchange end of the system. These two line circuits, as well as the line circuits terminating the other lines of the system, are identical in circuitry and mode of operation. Accordingly, only the line circuit 16 which is illustrated in Figs. 7 and 8 of the drawings, is described in detail below. It will be understood, however, that this description accurately applies to the other line circuits of the system.

From the foregoing general description of the system it will be recalled that each line circuit performs the function of repeating intelligence and control signal from its associated substation or substations to a corresponding one of the gate circuits in the multiplexer 11 and repeating intelligence signals derived from a particular gate circuit of the distributor 15 to its associated substation or substations. In addition, the line circuit of the present invention is provided with ringing control facilities which respond to the carrier wave ringing system of the present invention to transmit a ringing current signal to the associated substation or substations on a call incoming thereto.

Briefly considered, the line circuit 16 comprises an intelligence signal channel 1810, a supervisory signal channel 1820 and a ringing control circuit 800. The intelligence signal channel 1810 is identical to the corresponding system components shown and described in detail in my co-pending application, Serial No. 301,215, identified above, and is utilized in transmitting intelligence signals which are developed on the line 32 to the corresponding gate circuit of the multiplexer 11 over the conductor 45a in such manner that these signals are not coupled to the distributor 15. Furthermore, the intelligence signal channel 1810 is utilized in transmitting intelligence signals from the distributor 15 to the line 32 and over this line to the substations connected thereto in such manner that the signals are not revertively transmitted back to the multiplexer 11.

The supervisory signal channel 1820 may be identical with the corresponding system component shown and described in detail in my co-pending application, Serial No. 301,215, and is employed to convert the 100 kilocycle supervisory carrier voltage developed by the supervisory carrier supply circuit 26 into a bias voltage of constant amplitude which is utilized normally to bias to a non-conductive state that particular gate tube of the multiplexer 11 which individually corresponds to the line 32. Supervisory control signals developed on the line 32 are impressed upon the supervisory signal channel 1820 and this channel functions to remove and reapply the above-described bias potential to the conductor 45b in accordance with these control signals.

In order to transmit a ringing current signal over the called line 32 in accordance with the modulated ringing carrier wave which is superimposed upon the connector signal pulses developed by the connector 12b and transmitted to the distributor 15, there is provided the ringing control circuit 800 which includes a four-electrode ringing control tube 801, preferably of the gas filled commercial type 2D21. The anode of the tube 801 is connected by way of the conductor 1860 to one side of the line 32 and the cathode of this tube is connected by way of the conductor 61a to the harmonic ringing amplifier and supply circuit 101 in the common equipment 17.

The connector signal pulses, which occur in the time position assigned to the line 32 and carry the modulated ringing carrier wave, are separated from the other connector signal pulses of the system in the gate circuit of the distributor 15 corresponding to the line circuit 16 and the modulation components of the modulated ringing carrier wave are detected in the distributor 15 and are transmitted over the conductor 54 to the line circuit 16. In the line circuit 16, there is provided facilities for separating these modulation components of the detected ringing carrier wave from other signals of the system, such as intelligence signals which are to be transmitted over the line 32. More specifically, there is provided a frequency selective network which includes the tuned transformer 802. One side of the primary winding 803 of the transformer 802 is connected to the conductor 54 through the series combination of a resistor 804 and a condenser 805, the other end of the winding 803 being connected to ground. A tuning condenser 806 is connected across the primary winding 803 and a tuning condenser 807 is connected across the secondary winding 808 of the transformer 802. In the illustrated embodiment, each of the windings 803 and 805 is tuned to 5000 cycles, by means of the condensers 806 and 807 and other circuit capacities, and these windings are slightly overcoupled so that a double humped response curve is obtained which has maximum response at 4700 cycles and 5500 cycles. Accordingly, the frequency selective network acts substantially as a band pass filter for frequencies between 4500 and 5800 cycles.

The modulation components, which are passed by the frequency selective network described above, and which are modulated with the desired ringing pulse signal selected in the connector 12b in accordance with the identity of the called party line substation, are coupled through a condenser 809 to a rectifier 810 wherein the ringing signal is detected and this detected ringing pulse signal is coupled through the resistor 811 to the control grid of the ringing control tube 801. A condenser 812 is connected between the control grid and cathode of the tube 801. The anode of the rectifier 810 is connected to the arm of a potentiometer 813, which potentiometer is connected in series with the resistor 814 between the conductors 61b and 61a.

Before considering the operation of the above-described ringing control circuit 800, it is important to realize the frequency and relative spacing of the modulation components which are produced when the connector signal pulses are modulated with the above described modulated ringing carrier wave. This can best be done mathematically and it can be shown that the connector signal pulse wavetrain $E_c$ can be represented mathematically by the following equation:

(1)

$$E_c=\frac{Ea}{2\pi}+\frac{Ea}{\pi}\cos\omega_c t+\frac{Ea}{2\pi}\cos 2\omega_c t+\frac{Ea}{3\pi}\cos 3\omega_c t\ldots$$

wherein "E" is the amplitude of the connector signal pulses, "*a*" is the duration of a connector signal pulse in radians and $\omega_c$ is the repetition rate of the connector signal pulses in radians per second. The assmuption is also made in Equation 1 that the connector signal pulses are very short as compared to the repetition rate thereof. This assumption does not materially affect the equation for the first few harmonics in which we are interested, although the error increases with the order of the harmonic.

When the connector signal pulse wavetrain $E_c$ is modulated by a sinusoidal ringing carrier wave having a frequency of $\omega_m$ radians per second, the multiplying factor applied to the wavetrain $E_c$ is:

$$(2)\qquad (1+M\cos\omega_m t)$$

wherein "M" is the modulation factor which may vary between zero and 1.

Applying the multiplying factor (2) to the pulse wavetrain $E_c$, we have, as the modulated signal $E_m$:

$$(3)\qquad E_m=(1+M\cos\omega_m t)\left(\frac{Ea}{2\pi}+\frac{Ea}{\pi}\cos\omega_c t+\frac{Ea}{2\pi}\cos 2\omega_c t+\frac{Ea}{3\pi}\cos 3\omega_c t+\ldots\right)$$

To simplify Equation 3 before expansion let us assume that:

$$(4)\qquad M=1\ (100\%\ \text{modulation})$$

$$(5)\qquad \frac{Ea}{\pi}=E_0\ (\text{amplitude of pulse wavetrain fundamental})$$

Substituting Equations 4 and 5 in Equation 3 we have:

$$(6)\qquad E_m=(1+\cos\omega_m t)\left(\frac{E_0}{2}+\frac{E_0}{1}\cos\omega_c t+\frac{E_0}{2}\cos 2\omega_c t+\frac{E_0}{3}\cos 3\omega_c t+\ldots\right)$$

Expanding Equation 6, we have:

$$(7)\qquad E_m=\frac{E_0}{2}+E_0\cos\omega_c t+\frac{E_0}{2}\cos 2\omega_c t+\frac{E_0}{3}\cos 3\omega_c t+\ldots\ \text{(original pulse wavetrain)}$$
$$+\frac{E_0}{2}\cos\omega_m t\ \text{(modulating ringing carrier signal)}$$
$$+E_0\cos\omega_m t\cos\omega_c t\ \text{(modulated pulse fundamental)}$$
$$+\frac{E_0}{2}\cos\omega_m t\cos 2\omega_c t\ \text{(modulated pulse 2nd harmonic)}$$
$$+\frac{E_0}{3}\cos\omega_m t\cos 3\omega_c t\ \text{(modulated pulse 3rd harmonic)}$$

Since it is well known that, $$(8)\qquad \cos A\cos B=\tfrac{1}{2}\cos(A+B)+\tfrac{1}{2}\cos(A-B)$$

we have, upon applying Equation 8 to Equation 7:

$$(9)\qquad E_m=\frac{E_0}{2}+E_0\cos\omega_c t+\frac{E_0}{2}\cos 2\omega_c t+\frac{E_0}{3}\cos 3\omega_c t+\ldots\ \text{(original pulse wavetrain)}$$
$$+\frac{E_0}{2}\cos\omega_m t\ \text{(modulating ringing carrier signal)}$$
$$+\frac{E_0}{2}\cos(\omega_c+\omega_m)t\ \text{(upper sideband of modulated pulse fundamental)}$$
$$+\frac{E_0}{2}\cos(\omega_c-\omega_m)t\ \text{(lower sideband of modulated pulse fundamental)}$$
$$+\frac{E_0}{4}\cos(2\omega_c+\omega_m)t\ \text{(upper sideband of modulated pulse second harmonic)}$$
$$+\frac{E_0}{4}\cos(2\omega_c-\omega_m)t\ \text{(lower sideband of modulated pulse second harmonic)}$$
$$+\frac{E_0}{6}\cos(3\omega_c+\omega_m)t\ \text{(upper sideband of modulated pulse third harmonic)}$$
$$+\frac{E_0}{6}\cos(3\omega_c-\omega_m)t\ \text{(lower sideband of modulated pulse third harmonic)}$$

Considering now the specific modulation components which are produced when the repetition rate of the connector signal pulse wavetrain is 10,000 cycles per second, the ringing carrier wave is 4900 cycles per second and the amplitude $E_0$ of the fundamental component of the pulse wavetrain is 1 volt, we have, upon substitution in Equation 9, the following voltage components in the composite signal:

0.5 volt D. C. (steady component of original pulse wavetrain)
0.5 volt at 4900 C. P. S. (modulating ringing carrier signal)
0.5 volt at 5100 C. P. S. (lower sideband of modulated pulse fundamental)
1.0 volt at 10 kc. (fundamental of pulse wavetrain)
0.5 volt at 14,900 C. P. S. (upper sideband of modulated pulse fundamental)
0.25 volt at 15,100 C. P. S. (lower sideband of modulated pulse second harmonic)
0.5 volt at 20,000 C. P. S. (second harmonic of pulse wavetrain)
0.25 volt at 24,900 C. P. S. (upper sideband of modulated pulse second harmonic)
0.167 volt at 25,100 C. P. S. (lower sideband of modulated pulse third harmonic)
0.333 volt at 30,000 C. P. S. (third harmonic of pulse wavetrain)
0.167 at 34,900 C. P. S. (upper sideband of modulated pulse third harmonic)

It is thus evident from the foregoing mathematical analysis that when a 4900 cycle ringing carrier wave is employed, modulation components of 4900 cycles per second and 5100 cycles per second are both produced when the 10 kilocycle connector signal pulse wavetrain is modulated with a 4900 cycle ringing carrier wave. In addition, there are certain higher order modulation components. However, these do not interfere with the correct operation of the ringing system and, hence, may be disregarded insofar as the present analysis is concerned.

If we assume that the connector signal pulse wavetrain is modulated with a ringing carrier wave having a frequency of 4500 cycles per second, then it can readily be determined upon substitution in Equation 9 that modulation components of 4500 cycles per second and 5500 cycles per second are produced in the modulation process. On the other hand, if the ringing carrier wave is 4975 cycles per second, these modulation components become 4975 cycles per second and 5025 cycles per second.

It will be evident from the foregoing assumptions of ringing carrier waves of different frequencies that the two modulation components described above are spaced apart by an amount equal to twice the difference frequency between the ringing carrier wave and one-half the repetition rate of the connector signal pulse wavetrain. Thus, if a 4900 cycle ringing carrier wave is employed, the two modulation components are spaced apart by 200 cycles per second which is twice the difference frequency between the ringing carrier frequency of 4900 cycles and one-half the pulse repetition rate of the connector signal pulses, i. e., 5000 cycles per second.

From a consideration of Equation 9 in the illustrated example wherein the pulse repetition rate is 10,000 cycles per second and the ringing carrier wave is 4900 cycles per second, it will be evident that none of the modulation components appearing in this equation are within the usable audio range of the conventional telephone system wherein speech transmission is usually limited to the frequency band of from 250 cycles per second to 3500 cycles per second so that the modulation components which are produced as a direct result of the modulation of the connector signal pulses by the ringing carrier wave do not in themselves interfere with speech transmission through the system. However, whenever these modulation components are transmitted through a non-linear element of the system, they are cross modulated so as to give rise to sum and difference frequencies which may interfere with speech transmission. Thus, in the illustrated example wherein modulation components of 4900 cycles per second and 5100 cycles per second are produced, when these components are transmitted through a non-linear element a summation frequency of 10 kilocycles and a difference frequency of 200 cycles per second are produced. It will also be evident that the difference frequency increases as the frequency of the ringing carrier wave is moved away from one-half the frequency of the pulses. Thus, if a 4500 cycle per second ringing carrier wave is employed, a difference frequency of 1000 cycles per second would be produced when the modulation components are cross modulated in a non-linear element of the system and this difference frequency of 1000 cycles per second would fall squarely within the speech transmission band and seriously interfere with speech transmission.

With the above mathematical analysis in mind, it will be evident that when the ringing carrier wave is demodulated in the distributor 15, modulation components of 4900 cycles per second and 5100 cycles per second are transmitted over the conductor 54 to the ringing control circuit 800 in the line circuit 16. These modulation components are coupled through the resistor 804 and the condenser 805 to the primary winding of the transformer 802. Since the transformer 802 is tuned so that it has a band width which is broad enough to accept both of these modulation components, these components are transmitted through the transformer 802 and are coupled through the condenser 809 to the rectifier 810 wherein they are rectified to derive a ringing signal which may be used to control the operation of the ringing control tube 801. However, the rectifier 810 is a non-linear element and when the modulation components of 4900 cycles per second and 5100 cycles per second are impressed upon this rectifier, a difference frequency of 200 cycles per second is produced in the output thereof. In this connection, it will be understood that the desired output of the rectifier 810 is a very low frequency ringing pulse signal which varies in accordance with the on and off intervals of a particular ringing signal. For example, if a private line is being rung, a conventional ringing cycle of four seconds on and one second off may be employed, in which case, the desired output of the rectifier 810 would have a relatively positive value for four seconds and a relatively negative value for one second. On the other hand, if code ringing, or harmonic ringing, either fully selective or semi-selective, is employed, the desired output of the rectifier 810 will vary in accordance with the on and off intervals of the selected code, as described in detail heretofore in connection with the general description of the system.

In order to prevent the 200 cycle difference frequency component which is produced in the output of the rectifier 810 from interfering with control of the ringing control tube 801 in accordance with the desired ringing cycle, there is provided means in the output circuit of the rectifier 810 for removing this difference frequency component. More specifically, there is provided the series resistor 811 and shunt condenser 812 which act as a low pass filter to remove the 200 cycle difference frequency component from the output of the rectifier 810. The resultant essentially D. C. ringing pulse signal is impressed upon the control grid of the ringing control tube 801 and operates to fire this tube during periods when the ringing pulse signal is positive. The control grid of the tube 801 is biased by means of an undergrounded bias potential source which is connected between the conductors 61a and 61b in the harmonic ringing amplifier and supply circuit 101, this bias potential being impressed upon the series connected resistor 814 and potentiometer 813 so that an adjustable bias potential is produced at the arm of the potentiometer 813 which is connected through the rectifier 810 and the resistor 811 to the control grid of the tube 801.

While the frequency selective network, including the resistor 811 and the condenser 812, should prevent the transmission of the 200 cycle difference frequency component from the output of the rectifier 810 to the control grid of the ringing control tube 801, it must not prevent the transmission to this control grid of the on and off interval changes of the ringing signal. Accordingly, the network 811, 812 is provided with a time constant which is sufficiently long to prevent the transmission of the 200 cycle difference frequency component to the control grid of the tube 801, but this time constant is also short enough to permit the transmission to the control grid of the tube 801 of relatively rapid ringing interruptions which may be caused by coded ringing, the ringing trip operation, and the like. Since these ringing interruptions are relatively abrupt and contain relatively high frequency components, it is desirable to provide a difference frequency component which is as high as possible so that sluggish ringing control is avoided. Preferably, the difference frequency component is so chosen that it falls just below the lower limit of the useable audio range of the telephone system so that there is a substantial frequency separation between the difference frequency component and the higher harmonics of the on and off interval changes of the ringing signal. This relationship may be expressed mathematically as the following:

$$|f_p - 2f_c| < f_x$$

where $f_p$ is the repetition frequency of the connector signal pulses, $f_c$ is the frequency of the ringing carrier and $f_x$ is the lowest speech frequency of the system. In the illustrated embodiment wherein a 250-cycle lower limit for speech transmission is employed, the difference frequency component is preferably chosen to be in the order of 200 cycles per second. However, it will be understood that the exact difference frequency component may vary considerably depending upon the range of audio frequency which is to be transmitted. In this connection, it will be understood that the ringing carrier wave preferably has a frequency which is as far removed from the upper frequency limit of the audio range as possible in order that spurious modulation derived from the calling line will not cause false response of the ringing control circuit 800.

In order to prevent the ringing control circuit 800 from interfering with the transmission of detected speech signals over the called line, there is provided means for isolating the control crcuit 800 from the anode circuit of the corresponding amplifier tube in the distributor 15. In this connection, it will be recalled that the anode circuit of the corersponding amplifier tube includes the resistors 1846 and 1847 across which there is produced both the detected modulation components of the composite ringing carrier wave and the detected speech signals which are transmitted through the intelligence signal channel 1810 to the called line 32. Since this anode circuit constitutes a common source for both speech and ringing signals, it is necessary to prevent interaction between these signals. More specifically, the series resistor 804 and condenser 805 are provided which are connected between the conductor 54 to the primary winding of the transformer 802. The primary circuit of the transformer 802 provides a relatively high impedance at the resonant frequency thereof. However, the impedance of this primary circuit becomes relatively low in the audio frequency band and, if the transformer 802 were directly connected to the anode resistors 1846 and 1847, a substantial reduction in the audio output would be experienced. However, the resistor 804 and condenser 805 are of sufficiently high impedance to isolate the primary circuit of the transformer 802 so that interference in the audio frequency band is prevented. Preferably, the resistor 804 has a value of 4700 ohms and the condenser 805 a value of 1000 mmfds. This arrangement has been found satisfactory in a system wherein the primary and secondary windings 803 and 808 consisted of two equal windings of 2740 turns each of No. 39 Formex wire wound side by side on a quarter-inch diameter powdered iron core, the windings being spaced apart by the correct amount to give the slightly overcoupled band pass characteristic described above. With such a transformer, the condensers 806 and 807 have a value of .01 mfd. to tune the primary and secondary windings of the transformer to 5000 cycles per second. In this connection, it will be understood that any other suitable type of frequency selective network may be employed in place of the illustrated double tuned transformer 802. For example, a simple series or parallel resonant circuit may be employed. However, the illustrated transformer coupling is preferred since such an arrangement provides an extremly high impedance between the control grid of the tube 801 and ground at the frequency of the ringing current transmitted over the called line. This is particularly important because the cathode and control grid of the tube 801 are operated above ground by an amount equal to the composite ringing signal impressed upon the conductor **61*a* and the bias potential produced between the conductors 61*a* and 61*b*, so that if the control grid of the tube 801 has a low impedance to ground the cathode to control grid potential will vary and cause false firing of the ringing control tube 801. However, in the above-described transformer coupling arrangement, the only coupling between the control grid of the tube 801 and ground is due to the stray capacity between the windings 803 and 808 and it has been found that such stray capacity is sufficiently small to prevent false firing of the tube 801. In this connection, it will be noted that the entire secondary circuit of the transformer 802, including the rectifier 810 and the frequency selective network 811 and 812**, is operated above ground potential so that capacity to ground is minimized.

*Multiplexer 11*

As pointed out in the general description of the system, this circuit is provided for the general purpose of sampling control and intelligence signals developed on calling and called lines of the system in the time positions of each time position frame individually assigned to the lines from which the signals are respectively derived and for transmitting multiplexer pulses modulated with the sampled control or intelligense signals over the multiplexer output conductor 50 to the finder-connector links 12, 13 and 14 of the system. The multiplexer 11 is capable of sampling signals appearing on each of the one hundred lines of the system at a sampling repetition rate of 10 kilocycles.

The multiplexer 11 may be identical to the corresponding system component described in the co-pending application, Serial No. 301,215, identified above. In the alternative, the multiplexer 11 may be identical to the corresponding system component described in the co-pending application of Robert B. Trousdale and Frank A. Morris, Serial No. 134,974, filed December 24, 1949, or the co-pending application of Robert Trousdale, Serial No. 205,641, filed January 12, 1951, both of which applications are assigned to the same assignee as the present invention. However, it will be understood that a particular type of multiplexer is designed to operate with the intelligence and supervisory signal channels of a given type of line circuit. Thus, the type of line circuit disclosed in Figs. 7 and 8 is adapted to supply intelligence and control signals over separate paths to separate control grids of the corresponding gate tube in the multiplexer 11. On the other hand, the type of line circuit disclosed in co-pending application, Serial No. 134,974, identified above, is adapted to supply the intelligence and control signals over the same conductor to the corresponding gate tube of the multiplexer 11. It will be understood that either type of line circuit and multiplexer combination may be employed insofar as the ringing carrier system of the present invention is concerned.

*Finder 12a*

This system component may be identical to the corresponding system component shown and described in the co-pending application, Serial No. 301,215, identified above, and reference may be had to this specification for the details of this circuit.

*Connector 12b*

The functions performed by the connector **12*b* have been explained generally heretofore in connection with Figs. 2B and 2C of the drawings. Insofar as the carrier ringing system of the present invention is concerned, all of the component circuits of the connector 12*b*, with the exception of the called line out gate circuit 224, the ringback tone gate circuit 225, the code start circuit 268, the conversation timing control circuit 285 and the ringing carrier modulator circuit 300**, may be identical to the corresponding component circuits shown and described in detail in the co-pending application, Serial No. 301,215, identified above, in which application corresponding reference numerals have been applied.

Figure 6:
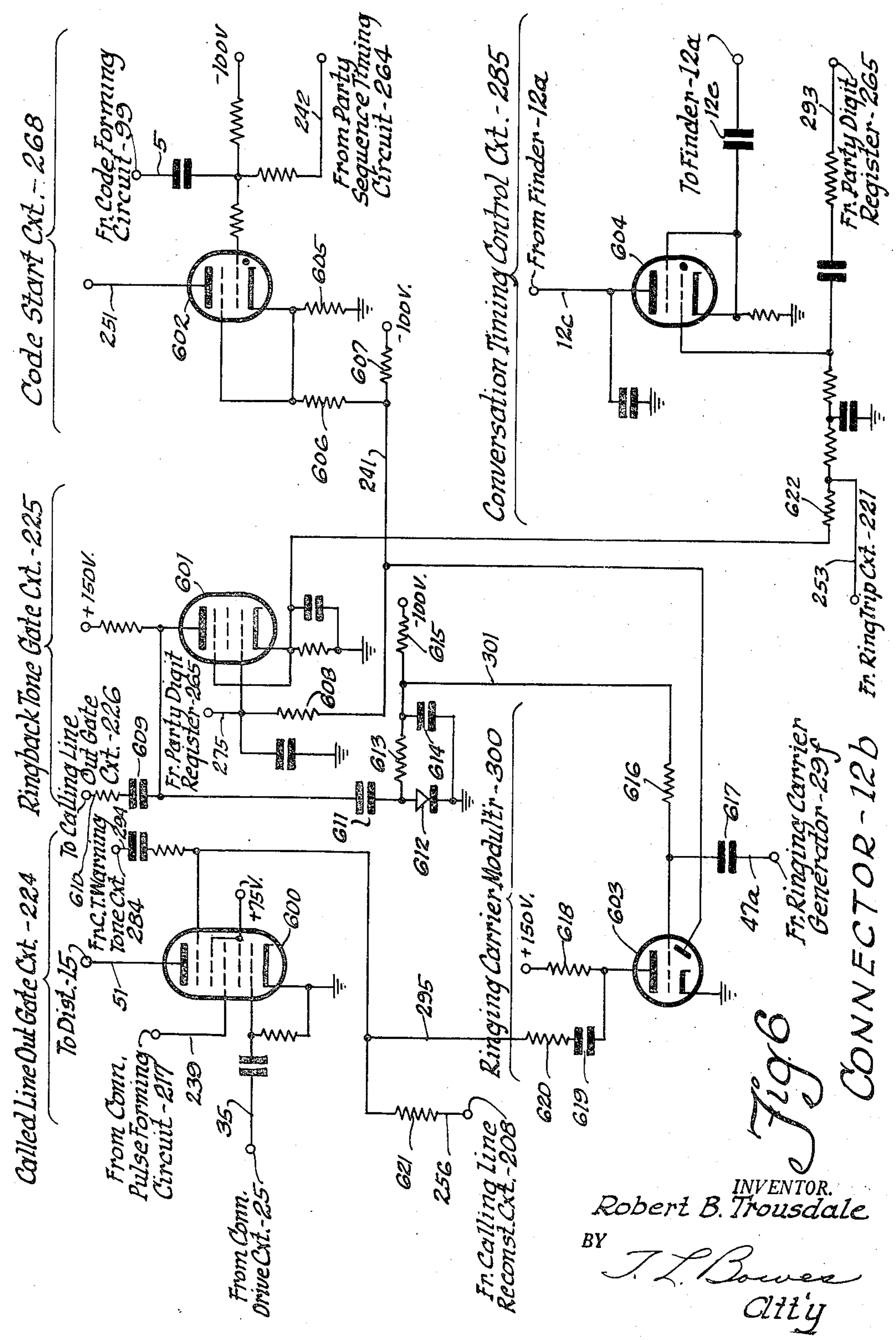

The component circuits of the connector **12*b* which have been modified in accordance with the present invention are shown in detail in Fig. 6 of the drawings wherein the called line out gate circuit 224 is illustrated as comprising the gate tube 600, the ringback tone gate circuit 225 is illustrated as comprising the gate tube 601, the code start circuit 268 is illustrated as comprising the code start tube 602, the ringing carrier modulator circuit 300 is illustrated as comprising the modulator 603 and the conversation timing control circuit 285 is illustrated as comprising the conversation timing control tube 604. The manner in which the identified tubes of the illustrated portion of the connector 12*b* are interconnected is pointed out more fully below with reference to the operation of the individual circuits. Although the identified tubes may be of any desirable commercial types having the required operating characteristics, it is pointed out that preferably the tube 600 is an RCA experimental type A-5727, the tube 601 is a commercial type 6AU6 pentode, the tube 603 is a commercial type 6AQ6 duo-diode triode, and the tubes 602 and 604** are hot cathode gas filled thyratrons of the RCA commercial 5696 type.

In considering the operation of the portion of the connector **12*b* shown in detail in Fig. 6 of the drawings, reference is again made to the above-described call originating at the substation A and routed by way of the link 12 to the called party line substation B'. From the description pertaining to this call, it will be recalled that the connector 12*b* responds to the first two digits of dial impulses transmitted over the calling line by registering the tens and units directory number designations of the called line in the registers 211 and 215 and also responds to a third digit of dial impulses transmitted over the calling line by selecting a particular party line ringing signal in accordance with the identity of the called party line substation, this selection being accomplished in the party digit register 265. When the party line ringing signal is selected in the party digit register 265, this register transmits the selected party line ringing signal over the conductor 275 to the first control grid of the ringback tone gate tube 601. Thus, in the illustrated call the interrupted ringback tone signal, shown in Fig. 15 (14) as comprising the two one-half second pulses of ringback tone 170*a* and 171*a*, is transmitted over the conductor 275 to the first control grid of the tube 601. The ringback tone gate tube 601 is controlled by the code start circuit 268 and the circuit 268 responds to an enabling potential produced on the conductor 242 and a code start pulse produced on the conductor 5 by developing a control voltage across the cathode resistor 605** thereof. The positive potential produced across the resistor 605 is applied to a biasing network including the resistors 606 and 607 connected in series between the cathode of the tube 602 and the negative bias potential source so that the potential on the conductor 241 changes from its normally negative value to ground potential when the code start tube 602 fires. In order to limit the amount by which the potential on the conductor 241 is raised when the code start 602 fires, there is provided a clamping diode which is connected between the conductor 241 and ground potential, this diode being shown as one of the diode sections of the ringing carrier modulator tube 603. With this arrangement, variations in circuit constants and tube characteristics in the code start circuit 268 do not affect the control of the ringback tone gate tube. Bias potential for the control grid of the ringback tone gate tube 601 is derived from the conductor 241 through the grid resistor 608 and after the code start tube 602 has fired, the first control grid of the tube 601 is enabled by means of the above-described potential produced on the conductor 241 to permit transmission through the tube 601 of the selected ringback tone signal appearing on the conductor 275.

The ringback tone signal which is gated through the tube 601 is coupled through the condenser 609 and the resistor 610 to the calling line out gate circuit 226 so that connector signal pulses released by this circuit in the time position assigned to the calling line are modulated with the selected ringback tone signal and the calling subscriber is informed that the called line is being rung in accordance with the selected party line ringing signal.

The gated ringback tone signal produced at the anode of the tube 601 is also coupled through the condenser 611 to the cathode of a crystal rectifier 612, the anode of which is connected to ground. Across the rectifier 612 there is provided the series connected resistor 613 and condenser 614 and a resistor 615 is connected from the junction point of the resistor 613 and the condenser 614 to the negative bias potential source. The rectifier 612 operates to rectify the interrupted ringback tone signal produced at the anode of the tube 601 so that a pulse type ringing signal having on and off intervals corresponding to the selected party line ringing code is produced across the output circuit of the rectifier. The DC potential produced at the junction point of the resistors 613 and 615, together with the detected ringing signal, is employed as a bias potential for the control grid of the ringing carrier modulator tube 603. Thus, a grid resistor 616 is connected from the junction point of the resistors 613 and 615 to the control grid of the tube 603 and the 4900 cycle, non-synchronous, sinusoidal carrier wave which is developed by the ringing carrier generator 29f in the common equipment 17 is transmitted over the conductor 47a and through the condenser 617 to the control grid of the tube 603.

When no ringback tone signal is impressed upon the rectifier 612, i. e., before the ringback tone gate tube is enabled, the negative bias potential produced at the junction point of the resistors 613 and 615 is sufficiently negative to hold the tube 603 beyond cut-off, even during the positive peaks of the carrier wave impressed on this control grid from the conductor 47a. However, when an interrupted ringback tone signal is gated through the tube 601 and is rectified by the rectifier 612, a positive potential is produced across the condenser 614 which acts in opposition to the above-described bias potential so as to increase the potential on the control grid of the tube 603 so that this tube is operated in its normal operating range. Accordingly, the 4900 cycle carrier wave impressed upon the control grid of the tube 603 is gated through this tube and appears across the anode resistor 618 thereof during the on intervals of the selected party line ringing signal. In the illustrated call, the 4900 cycle carrier wave is thus transmitted through the tube 603 during the ringing intervals 170a and 171a of the selected party line ringing signal #2.

The interrupted carrier wave appearing at the anode of the tube 603 is coupled through the condenser 619 and the isolating resistor 620 to the third control grid of the called line out gate tube 600. In addition, the signals reconstructed by the calling line reconstructor circuit 208 are coupled through the resistor 621 to this control grid, as well as a signal derived from the conversation timing warning tone circuit 284. However, it will be understood that signals from the circuits 208 and 294 do not occur at the same time as the ringing carrier wave, as described heretofore in connection with the general description of the system. The ringing carrier wave impressed upon the third control grid of the tube 600 operates to modulate the connector signal pulses appearing at the anode of this tube so that a composite signal is produced on the conductor 51 and is transmitted to the distributor 15. This composite signal is somewhat similar to the signal shown in Fig. 17(c) of the drawings, although it will be understood that in the preferred embodiment the carrier wave has a frequency of 4900 cycles instead of 5000 cycles and is non-synchronously related to the connector signal pulses.

The composite signal produced on the conductor 51 is transmitted to distributor 15 wherein the connector signal pulses are selected in the gate circuit corresponding to the line circuit 16 and the modulation components of this composite signal are detected and amplified in the distributor 15 and are transmitted over the conductor 54 to the line circuit 16. In this line circuit, the two modulation components of 4900 cycles and 5100 cycles are selectively transmitted through the transformer 802 and are rectified in the rectifier 810 so as to reproduce the pulse type ringing signal developed by the rectifier 612 in the ringback tone gate circuit 225. This ringing signal is employed to control conduction of the ringing control tube 801 so that ringing current is transmitted over the called line 32 during the on intervals of the selected party line ringing signal.

When the call is answered at the substation B', a positive potential is produced on the conductor 253 by the ring trip circuit 221 and this potential is coupled through the resistor 622 to the cathode of the ringback tone gate tube so that this tube is driven beyond cut-off and transmission therethrough of the ringback tone signal ceases. When this occurs, the ringback tone signal is no longer transmitted to the rectifier 612 and the control grid of the ringing carrier modulator tube 603 remains beyond cut-off so that no ringing carrier signal is transmitted through the tube 603 and operation of the ringing control facilities at the line circuit 16 ceases. With the above-described arrangement wherein the ringback tone gate tube 601 is enabled by means of a positive potential applied to its control grid and is disabled by means of a positive potential applied to its cathode, the positive transmission of the selected ringback tone signal through the tube 601 is insured. Also, by controlling the first control grid and cathode of the tube 601 a more positive and reliable control of the transmission of signals through this tube is obtained.

While the ringing carrier wave system of the invention has been illustrated in conjunction with a party line ringing system of the semi-selective harmonic ringing type, it will be understood that any other type of ringing may be employed. For example, a private line ringing system of the type shown and described in detail in the co-pending application Serial No. 134,974, filed December 24, 1949, may be employed wherein a conventional ringing cycle of one second on and four seconds off is provided. In such case the ringback tone signal gated by the ringback tone gate tube would be rectified and employed as bias potential for the ringing carrier modulator circuit in a manner identical to that described above in connection with the illustrated system. In the alternative, a code ringing system of the type disclosed in my co-pending application, Serial No. 257,712, filed on November 23, 1951, and assigned to the same assignee as the present invention, may be employed. In such a code ringing system all of the party line substations on the called line are rung in accordance with the selected code assigned to the called substation, and the rectified ringback tone signal may be employed to control the ringing carrier modulator circuit in a manner identical to that described above.

*Distributor 15*

Figure 9:
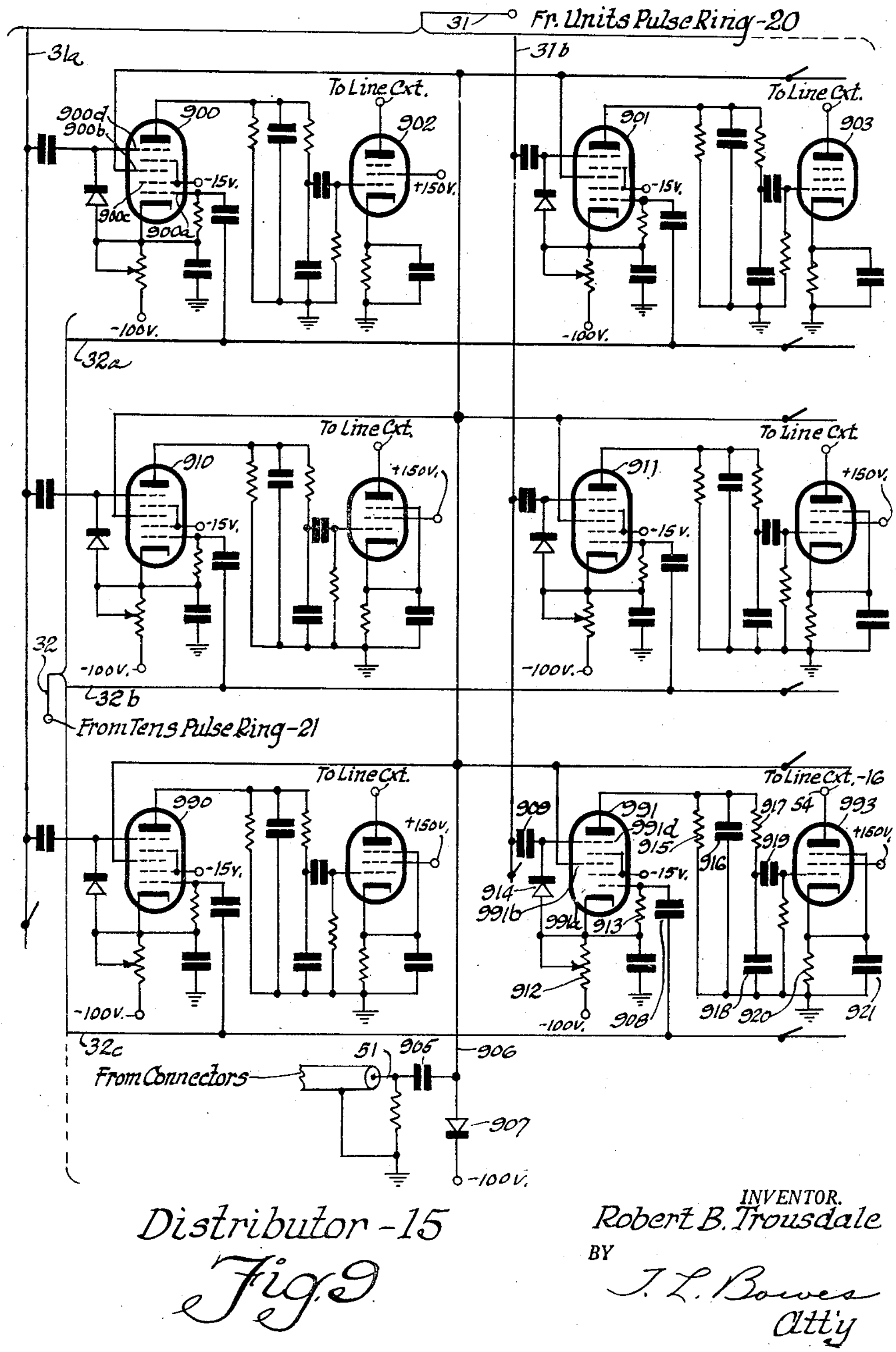
Fig. 9 is a schematic diagram illustrating the details of the distributor of the system shown in Figs. 1 to 4, inclusive.
Figure 11:
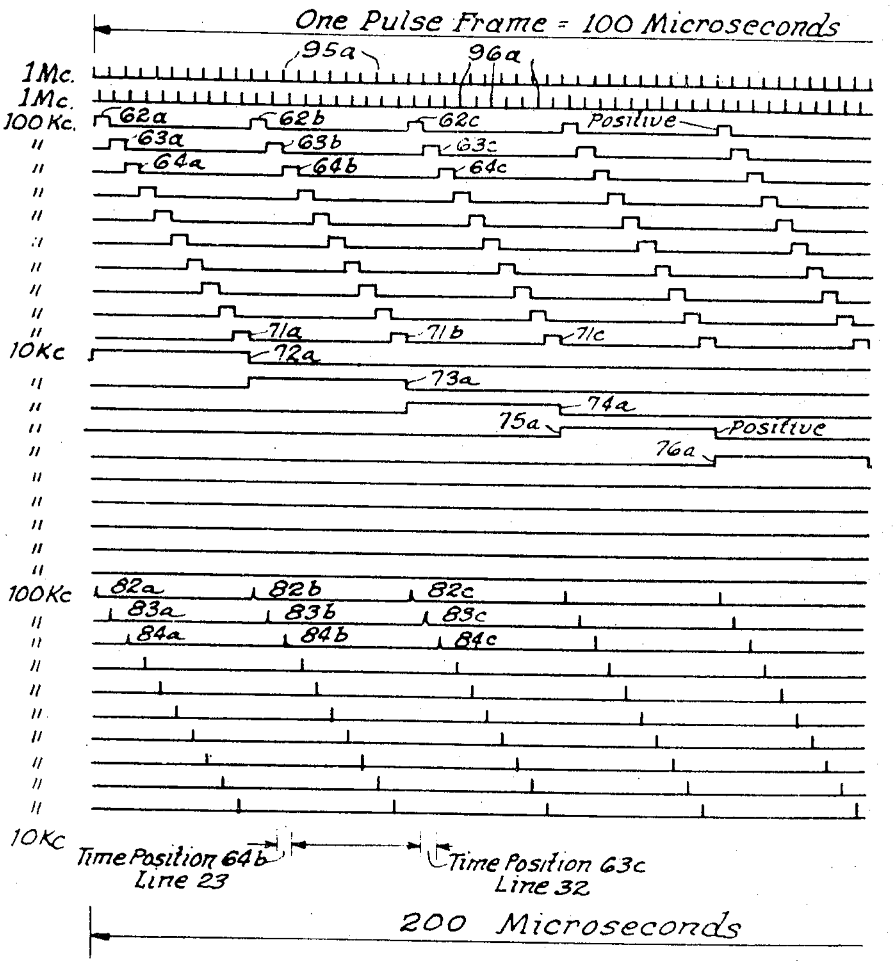
Figure 12:
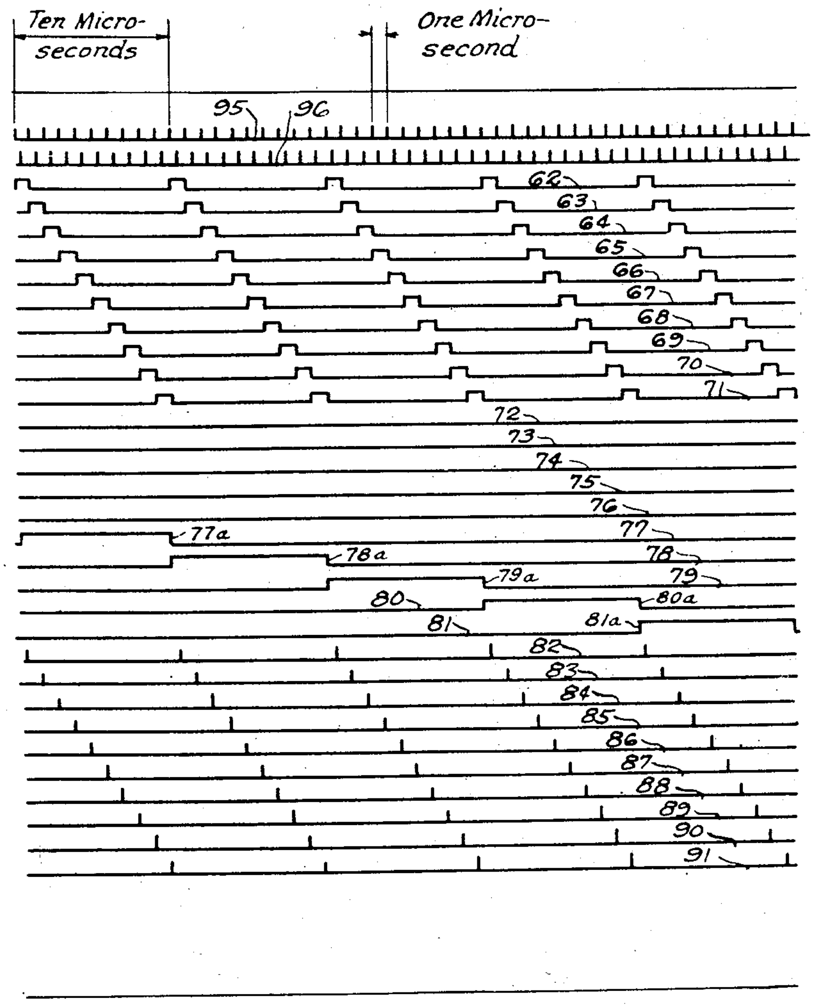
Figure 13:
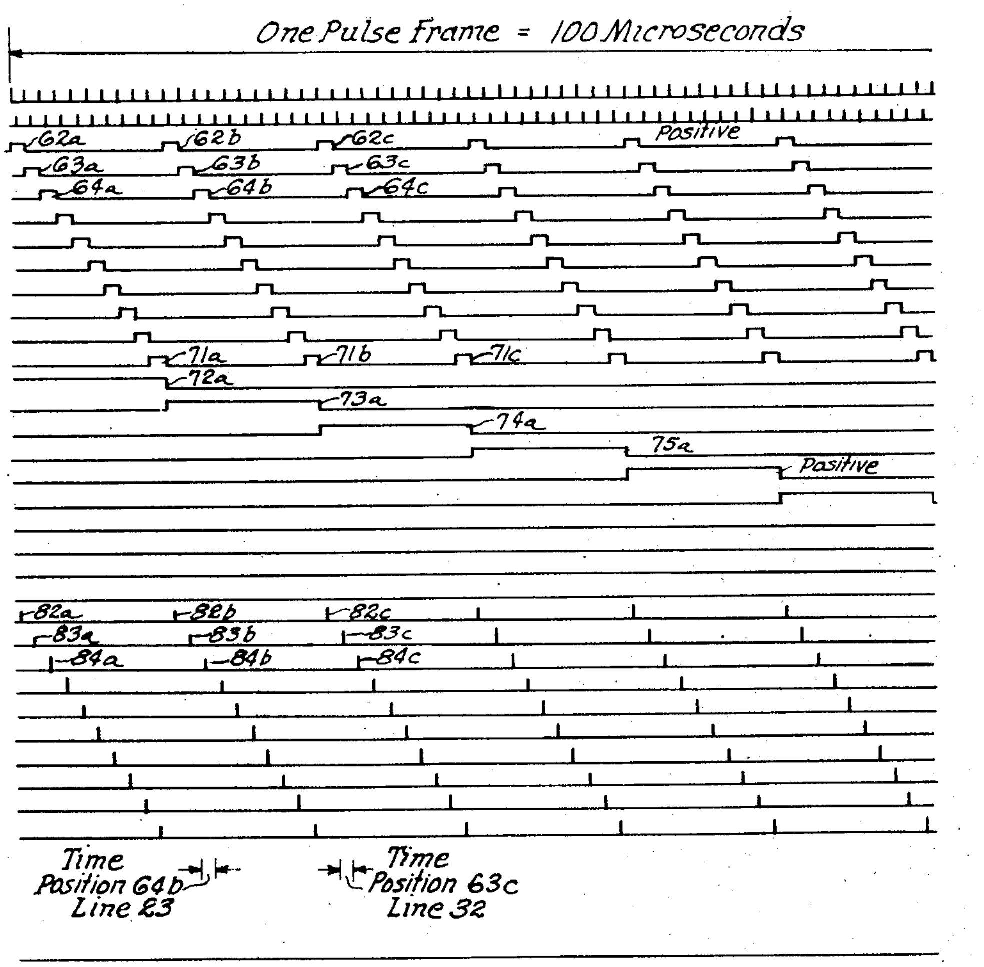
Figure 14:
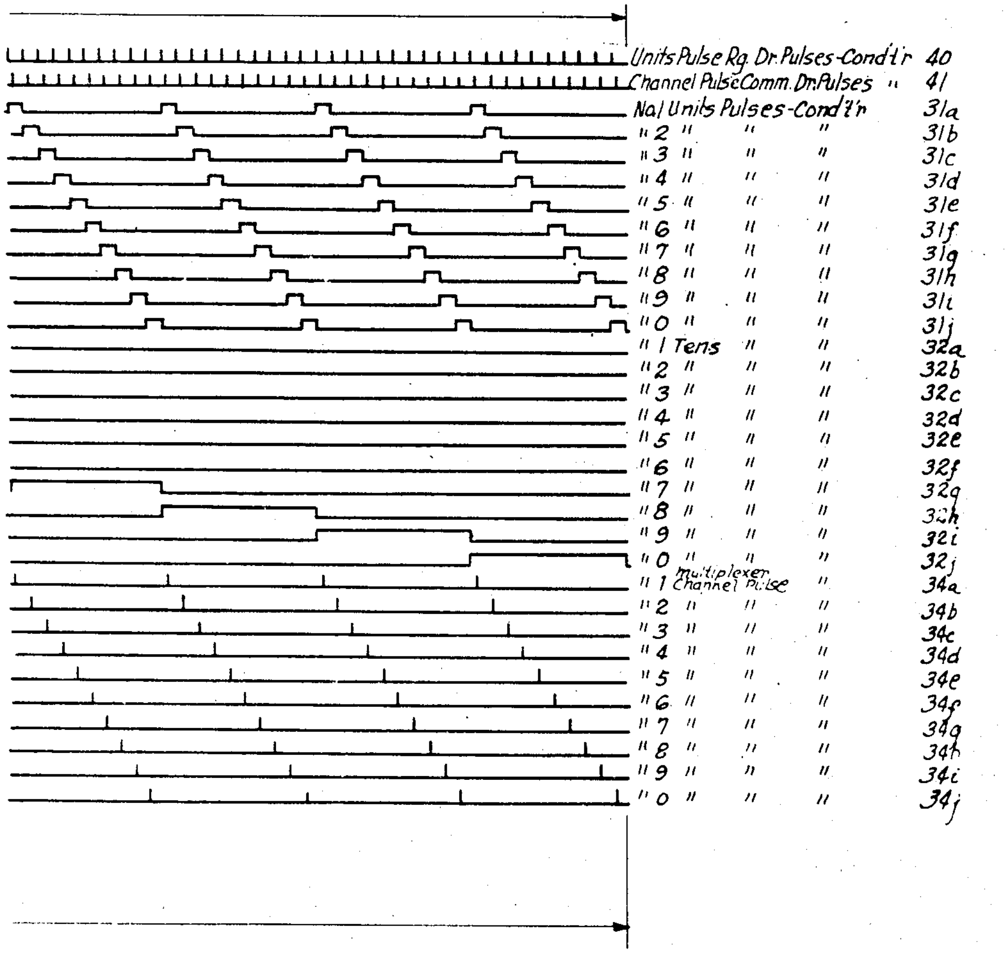

As pointed out in the general description of the system, the improved distributor 15 of the present invention, the details of which are illustrated in Fig. 9 of the drawings, is provided for the general purpose of separating the signal sample modulated connector pulses developed in the connectors of the system in the time positions of each pulse frame respectively assigned to the calling and called lines of the system, detecting the separated or gated connector signal pulses to derive the signal sample modulation components thereof, and transmitting the detected modulation components to the line circuits respectively terminating the calling and called lines of the system. Thus, the distributor 15 is capable of separating or demultiplexing connector pulses which may appear in any one of the one hundred time positions of the time position frame on the common input conductor 51 and of disrtibuting signals derived from the demultiplexed connector pulses to the respective line circuits under the directive control of the connectors **12*b*, 13*b*, 14*b*** of the system.

Generally considered, the distributor 15 comprises one hundred gate circuits which are individually associated with the lines of the system and which are connected to perform a combined tens and units gating function. Specifically, the gate circuits individually associated with the lines assigned the directory number designations 11, 12, 13–10, inclusive, respectively comprise ten gate tubes, the first two of which are illustrated in Fig. 9 as the gate tubes 900 and 901. Similarly, the gate circuits respectively associated with the lines of the system having the directory number designations 21, 22, 23–20, inclusive, respectively comprise ten gate tubes, of which the first two are illustrated in Fig. 9 as the gate tubes 910 and 911. In a similar manner, gating tubes are assigned to the remaining lines of the system, the ten lines having the directory number designations 31, 32, 33–30, inclusive, respectively comprising a third horizontal row of gating tubes, of which the first two tubes 990 and 991 are shown in Fig. 9.

In order to combine in a single tube the tens and units gating functions, the gate tubes 900, 901, etc., preferably comprise a pentagrid tube having three separate and distinct control electrodes. While any suitable tube of the pentagrid type may be employed wherein three separate control electrodes are provided each having a substantial controlling effect upon the flow of electrons from the cathode to the anode when these electrodes are operated at approximately the cathode potential, preferably a pentagrid tube of the RCA experimental type A-5727 is employed. In the type A–5727 tube, the first two controlling grids are shielded from the anode and from each other by means of a shield grid and also by physical spacing of the electrodes so as to prevent mutual coupling between these electrodes. Also, each of the three control grids possesses a substantial transconductance of the anode of the tube when operated at potentials at or below the cathode potential. Thus, considering the gate tube 900, the first control grid **900*a* and the second control grid 900*b* are shielded from the anode and from each other by the shield grid 900*c* and by physical spacing of these electrodes. Also, the third control grid 900*d*, as well as the control grids 900*a* and 900*b***, have a substantial control over the electron beam when operated at potentials at or below the cathode potential.

Operation of the distributor 15 is under the joint control of the tens and units pulse ring circuits 20 and 21 and the signal sample modulated connector pulses impressed upon the conductor 51 by the various connectors of the system. Thus, the positive tens pulses, which are sequentially impressed upon the conductors **32*a*, 32*b*–32*j*, inclusive, in the tens pulse ring 21 are respectively supplied to the ten horizontal strings of gating tubes in the distributor 15. For example, the tens pulses 72*a* (Figs. 11–14, inclusive) which appear on the conductor 32a are impressed upon the first control grids of the gating tubes 900, 901, etc., the tens pulses 73a which appear on the conductor 32*b* are impressed upon the first control grids of the gating tubes 910, 911, etc., and the tens pulses 74*a* which appear on the conductor 32*c* are impressed upon the first control grids of the gating tubes 990, 991**, etc.

Units pulses sequentially developed on the conductors **31*a*, 32*b*–32*j*, inclusive, are respectively impressed upon the third control grids of the ten vertical strings of gating tubes in the distributor 15. Thus, the units pulses 62*a*, 62*b*–62*j*, inclusive, which appear on the conductor 31a are impressed upon the third control grids of the gating tubes 900, 910, 990, etc. Likewise, the units pulses 63*a*, 63*b*–63*j*, inclusive, which appear on the conductor 31*b* are impressed upon the third control grids of the gating tubes 901, 911, 991, etc. The connector pulses which appear on the conductor 51 are coupled through the common condenser 905 to the conductor 906 which is connected to the second control grids 901*b* of all of the one hundred gating tubes in the distributor 15 in parallel, and a common clamping rectifier 907 is connected between the conductor 906** and the minus 100 volt potential source.

Associaed with each of the gating tubes in the distributor 15 there is provided an amplifier tube of the pentode type, preferably of the 6AK6 commercial type. Thus, an amplifier tube 902 is connected to the output of the gating tube 900, an amplifier tube 903 is connected to the output of the gating tube 901, etc., the gating tube 993 being connected to the output of the gating tube 991. Each of the gating tubes in the distributor 15 separates or demultiplexes the connector signal pulses appearing in a particular one of the time positions in each time position frame and the separated connector signal pulses appearing at the anode of the gating tube are demodulated or detected so as to reconstruct the modulation components carried by these connector pulses. The detected modulation components are then impressed upon the associated amplifier tube and the anode of the amplifier tube is connected to the associated line circuit serving the line having the corresponding time position assigned thereto.

Thus, considering the gating tube 991 and the amplifier tube 993 which serve the line circuit 16 connected to the called line 32, the tens pulses **74*a* appearing on the conductor 32*c* are coupled through the condenser 908 to the first control grid 991*a* of the tube 991, the units pulses 63*a*, 63*b*–63*j*, inclusive, which appear on the conductor 31*b* are coupled through the condenser 909 to the third control grid 991*d* of the tube 991 and connector signal pulses appearing on the conductor 906 are directly connected to the second control grid 991*b* of the tube 991. In order that the number of clamping rectifiers may be reduced, the conductor 906** is operated at substantially the potential of the negative bias source and the second control grids of the gating tubes are directly connected to this conductor.

In order to provide proper operating bias for each second control grid of the gating tubes, the cathode of each gating tube is made positive with respect to the −100 volt supply. Thus, considering the tube 991, the cathode of this tube is made positive with respect to the −100 volt supply by means of the cathode potentiometer 912 and the associated bypass capacitor.

The pulses impressed upon the first and third control grids of each gating tube should vary between saturation and cut-off, i. e., between cathode potential and a value negative with respect to the cathode potential of the gating tube. Therefore, each first and third control grid of the gating tubes is returned to the cathode. For example, in the tube 991 the third control grid 991*d* is returned to the cathode through the rectifier 914 and the first control grid 991*a* is returned to the cathode through the resistor 913.

The tens pulses, impressed upon the first control grid, completely control the amount of total cathode current since the other grids of the tube are shielded and have no effect on the cathode current. Since the tens pulses are fixed in amplitude and duty cycle, average cathode current is constant regardless of the presence or absence of connector signal pulses on the second grid. By adjusting the potentiometer 912 the cathode voltage can be so adjusted as to establish the proper class-A operating point for the second control grid. However, due to the connection of the first and third control grids to the cathode, the bias on these control grids remains zero except as modified by self-biasing from grid conduction, so that the second control grid potential may be adjusted independently of the first and third control grid potentials.

The anode of the tube 991 is connected to ground through the anode resistor 915, and a condenser 916 is connected across the resistor 915 so as to reconstruct or detect the modulation components of the demultiplexed connector signal pulses appearing at the anode of the tube 991. These modulation components are further detected in an integration network including the series resistor 917 and the shunt condenser 918 so that the modulation components are separated from the other signal components of the system including the fundamental and higher harmonic frequencies of the connector signal pulses themselves. The detected modulation components produced across the condenser 918 are then coupled through the condenser 919 to the control grid of the maplifier tube 993. The tube 993 is self biased by means of the cathode resistor 920 and bypass condenser 921 which are connected between the cathode of the tube 993 and ground. The anode of the tube 993 is connected over the conductor 54 to the line circuit 16 wherein the resistors 1846 and 1847 form the anode load circuit for the tube 993.

In accordance with an important feature of the present invention, the amplifier tube 993 is self biased by means of the above-described biasing network 920 and 921 and the coupling condenser 919, so that the exact operating potential of the amplifier tube is not critical. With this arrangement, a separate bias control potentiometer for each amplifier tube is not required. This self biasing arrangement of the amplifier tubes of the distributor 15 is permissible because in the present invention the ringing pulse signal is carried on a ringing carrier wave and frequency discrimination is employed in the line circuits to detect the modulated ringing carrier wave. If, on the other hand, amplitude variation in the connector signal pulses is employed to control the ringing facilities in the line circuits of the system, it is necessary to direct couple the gating tube to the amplifier tube and, with such an arrangement, a separate bias potentiometer is required for each amplifier tube in the distributor 15. It will thus be evident that with the modulated ringing carrier wave of the present invention each of the gating and amplifying channels in the distributor 15 is substantially simplified and rendered less critical to tube characteristics and operating potentials. It will further be noted that in the distributor of the present invention the connector signal pulses are impressed upon the second control grid 991*b* of each gating tube, rather than the third control grid 991*d*, so that a substantially greater output can be derived from each gating tube for the same degree of distortion.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In an automatic telephone system, a plurality of lines having individually assigned thereto different time positions in repetitive time position frames, means for developing line pulses in the time position assigned to one of said lines, means for providing a ringing control signal which is non-synchronous with respect to the repetition rate of said line pulses and has a carrier frequency which is close enough to one-half the frequency of said time position frames that all modulation components produced by modulation of said called line pulses are so related that beat notes between said modulation components do not fall within the audio range of said system, means for modulating said line pulses with said ringing control signal, and means for detecting at least one of said modulation components and transmitting a ringing current over said called line in accordance with said detected modulation component.

2. In an automatic telephone system, a plurality of lines having individually assigned thereto different time positions in repetitive time position frames, means for developing line pulses in the time position assigned to one of said lines, means for providing a supervisory control signal which is non-synchronous with respect to the repetition rate of said line pulses, means for modulating said line pulses with said supervisory control signal to produce a composite signal having different modulation components determined by the frequencies of said pulse frames and said control signal, means for detecting a plurality of said modulation components, said detected modulation components being so related in frequency that beat notes between said components are below the audio range of said system, and means for transmitting a supervisory control current over said one line in accordance with said detected modulation components.

3. In an automatic telephone system, a plurality of lines having individually assigned thereto different time positions in repetitive time position frames, means for developing line pulses in the time position assigned to one of said lines, said line pulses having a repetition frequency of $f_p$, means for providing a control signal having a carrier frequency which is nonsynchronous with respect to the repetition rate of said line pulses, means for modulating said line pulses with said supervisory control signal, said line pulse and said control signal being related in accordance with the expression:

$$|f_p - 2f_c| < f_x$$

where $f_x$ equals the lowest speech frequency of said system, and means for detecting said control signal and transmitting a supervisory current over said one line in accordance with said detected control signal.

4. In an automatic telephone system, a plurality of lines having individually assigned thereto different time positions in repetitive time position frames, means for developing pulses in the time position assigned to a called one of means for providing a substantially sinusoidal ringing control signal which is non-synchronous with respect to said time position frames and which has a fundamental frequency which is spaced from the first submultiple of said called line pulses by an amount which is less than one-half the lowest audio frequency of said system, means for modulating said called line pulses with said ringing control signal, and means for detecting said ringing control signal and transmitting a ringing current over said called line in accordance with said detected ringing control signal.

5. In an automatic telephone system, a plurality of lines having individually assigned thereto different time positions in repetitive time position frames, means for developing pulses in the time position assigned to a called one of said lines, means for developing a ringing control signal including a substantially sinusoidal ringing carrier modulated with a relatively low frequency ringing signal, means for modulating said called line pulses with said ringing control signal, said ringing carrier being non-synchronous with respect to said time position frames and having a fundamental frequency which is spaced from the first submultiple of said called line pulses by an amount which is less than one-half the lowest audio frequency of said system and greater than said low frequency ringing signal, and means for detecting said low frequency ringing signal and transmitting a ringing current over said called line in accordance with said detected ringing signal.

6. In an automatic telephone system, a plurality of lines having individually assigned thereto different time positions in repetitive time position frames, means for developing pulses in the time position assigned to a called one of said lines, means for developing a ringing control signal including a substantially sinusoidal ringing carrier modulated with a relatively low frequency ringing signal, means for modulating said called line pulses with said ringing control signal to produce a composite signal having different modulation components determined by the frequencies of said called line pulses and said ringing control signal, detecting means for detecting at least some of the modulation components of said composite signal, a tuned circuit, means including said tuned circuit for selecting at least one of said detected modulation components which is modulated with said ringing signal, means for deriving said ringing signal from said selected detected modulation component, and means for transmitting a ringing current signal over said called line in accordance with said derived ringing signal.

7. In an automatic telephone system, a plurality of lines having individually assigned thereto different time positions in repetitive time position frames, means for developing pulses in the time position assigned to a called one of said lines, means for developing a ringing control signal including a substantially sinusoidal ringing carrier modulated with a relatively low frequency ringing signal, means for modulating said called line pulses with said ringing control signal to produce a composite signal having different modulation components determined by the frequencies of said called line pulses and said ringing control signal, detecting means for detecting at least some of the modulation components of said composite signal, a tuned circuit, means including said tuned circuit for selecting at least one of said detected modulation components which is modulated with said ringing signal, means for deriving said ringing signal from said selected detected modulation components, means for transmitting a ringing current signal over said called line in accordance with said derived ringing signal, means for modulating said called line pulses with speech signals, said speech signals being detected in said detecting means, and means for preventing said tuned circuit from interfering with transmission of said detected speech signals over said called line.

8. In an automatic telephone system, a plurality of lines having individually assigned thereto different time positions in repetitive time position frames, means for developing pulses in the time position assigned to a called one of said lines, means for developing a ringing control signal including a substantially sinusoidal ringing carrier modulated with a relatively low frequency ringing signal, said ringing carrier being non-synchronous with respect to said time position frames and having a fundamental frequency which is spaced from the first submultiple of said called line pulses by an amount which is less than one-half the lowest speech frequency of said system, means for modulating said called line pulses with said ringing control signal to produce a composite signal having different modulation components determined by the frequencies of said called line pulses and said ringing control signal, means for deriving at least two of said modulation components from said modulated called line pulses, tuned circuit means for selecting said two derived modulation components, detector means for deriving said ringing signal from said two selected modulation components, and means controlled by said derived ringing signal for transmitting a ringing current signal over said called line.

9. In an automatic telephone system, a plurality of lines having individually assigned thereto different time positions in repetitive time position frames, means for developing pulses in the time position assigned to a called one of said lines, means for developing a ringing control signal including a substantially sinusoidal ringing carrier modulated with a relatively low frequency ringing signal, means for modulating said called line pulses with said ringing control signal to produce a composite signal having different modulation components determined by the frequencies of said called line pulses and said ringing control signal, detecting means for detecting at least some of the modulation components of said composite signal, a ringing control tube, means for impressing a ringing current signal on the cathode of said control tube, means connecting the anode of said control tube to said called line, means including a double tuned transformer for selecting from said modulated called line pulses the fundamental frequency component of said ringing carrier and the lower sideband component of said modulated called line pulses, a detector circuit connected to the secondary of said transformer for deriving said ringing signal from said selected frequency components, and means for impressing said derived ringing signal on the control grid of said ringing control tube to control conduction thereof and transmission of said ringing current signal over said called line.

10. In an automatic telephone system, a plurality of lines having individually assigned thereto different time positions in repetitive time position frames, means for developing pulses in the time position assigned to a called one of said lines, means for developing a ringing control signal including a square wave ringing carrier modulated with a relatively low frequency ringing signal, said carrier being synchronous with said called line pulses and having a fundamental frequency equal to one-half the frequency of said called line pulses, means for deriving said ringing signal from said modulated called line pulses, and means controlled by said derived ringing signal for transmitting a ringing power signal over said called line.

11. In an automatic telephone system, a plurality of lines having individually assigned thereto different time positions in repetitive time position frames, means for developing pulses in the time position assigned to a called one of said lines, means for developing a ringing control signal including a square wave ringing carrier modulated with a relatively low frequency ringing signal, said carrier being synchronous with said called line pulses and having a fundamental frequency equal to one-half the frequency of said called line pulses, the leading and trailing edges of said square wave carrier each having a duration less than the duration of one of said time positions, means for deriving said ringing signal from said modulated called line pulses, and means controlled by said derived ringing signal for transmitting a ringing current signal over said called line.

12. In an automatic telephone system, a plurality of lines having individually assigned thereto different time positions in repetitive time position frames, means for developing pulses in the time position assigned to a called one of said lines, means for developing a ringing control signal including a ringing carrier modulated with a relatively low frequency ringing signal, means for modulating said called line pulses with said ringing control signal to produce a composite signal having different modulation components determined by the frequencies of said called line pulses and said ringing control signal, means for detecting two of the modulation components of said composite signal, said two detected modulation components being modulated with said ringing signal, means for deriving said ringing signal from said two detected modulation components, means responsive to said derived ringing signal for transmitting a corresponding ringing current signal over said called line, and means for preventing said last named means for responding to the difference frequency between said two detected modulation components.

13. In an automatic telephone system, a plurality of lines having individually assigned thereto different time positions in repetitive time position frames, means for developing pulses in the time position assigned to a called one of said lines, means for developing a ringing control signal including a ringing carrier modulated with a relatively low frequency ringing signal, means for modulating said called line pulses with said ringing control signal to produce a composite signal having different modulation components determined by the frequencies of said called line pulses and said ringing control signal, means for detecting two of the modulation components of said composite signal, said two detected modulation components being modulated with said ringing signal, means for deriving said ringing signal from said two detected modulation components, a ringing current signal source, a ringing control tube connecting said source to said called line, means for impressing said derived ringing signal upon said ringing control tube to control conduction thereof, and filter means for preventing the difference frequency between said two detected modulation components from being impressed upon said ringing control tube.

14. In an automatic telephone system, a plurality of lines having individually assigned thereto different time positions in repetitive time position frames, means for developing pulses in the time position assigned to a called one of said lines, means for developing a ringing control signal including a ringing carrier modulated with a relatively low frequency ringing signal, means for modulating said called line pulses with said ringing control signal to produce a composite signal having different modulation components determined by the frequencies of said called line pulses and said ringing control signal, means for detecting two of the modulation components of said composite signal, said two detected modulation components being modulated with said ringing signal, means for deriving said ringing signal from said two detected modulation components, a ringing current signal source, a ringing control tube connecting said source to said called line, and means including a frequency selective network for impressing said derived ringing signal on a control electrode of said ringing control tube to control conduction thereof, said network attenuating the difference frequency between said two detected modulation components to prevent said ringing control tube from responding thereto.

15. In an automatic telephone system, a plurality of lines having individually assigned thereto different time positions in repetitive time position frames, means for developing pulses in the time position assigned to a called one of said lines, means for developing a ringing control signal including a ringing carrier modulated with a relatively low frequency ringing signal, means for modulating said called line pulses with said ringing control signal to produce a composite signal having different modulation components determined by the frequencies of said called line pulses and said ringing control signal, detecting means for detecting at least some of the modulation components of said composite signal, a ringing current signal source, a ringing control tube connected between said source and said called line, a tuned circuit including a transformer having the secondary thereof connected to said source for selecting at least one of said detected modulation components which is modulated with said ringing signal, rectifier means connected to said secondary winding for deriving said ringing signal from said selected detected modulation component, and means for impressing the output of said rectifier on a control electrode of said ringing control tube to control conduction thereof.

16. In an automatic telephone system, a plurality of lines having individually assigned thereto different time posiitons in repetitive time position frames, means for developing pulses in the time position assigned to a called one of said lines, means for developing a ringing control signal including a ringing carrier modulated with a pulse type ringing signal having on and off intervals corresponding to a desired ringing cycle, means for modulating said called line pulses with said ringing control signal to produce a composite signal having different modulation components determined by the frequencies of said called line pulses and said ringing control signal, means for detecting two of the modulation components of said composite signal, said two detected modulation components being modulated with said ringing signal, a ringing current signal source, a ringing control tube connected between said source and said called line, means for deriving said ringing signal from said two detected modulation components, and means including a frequency selective network for impressing said derived ringing signal on a control electrode of said ringing control tube to control conduction thereof, said network having a time constant which is sufficiently long to prevent transmission of the difference frequency between said two detected modulation components and is short enough to permit transmission of the on and off interval changes in said ringing signal.

References Cited in the file of this patent

UNITED STATES PATENTS

| | | |
|---|---|---|
| Re. 23,418 | Ronson | Oct. 16, 1951 |
| 2,490,833 | Ronson | Dec. 13, 1949 |
| 2,546,974 | Chatterjea | Apr. 3, 1951 |
| 2,547,549 | Wennemer | Apr. 3, 1951 |
| 2,649,505 | Ronson | Aug. 18, 1953 |